US010984112B2

(12) United States Patent
Agarwal

(10) Patent No.: US 10,984,112 B2
(45) Date of Patent: *Apr. 20, 2021

(54) SYSTEMS AND METHODS FOR AUTOMATED THREAT MODELING OF AN EXISTING COMPUTING ENVIRONMENT

(71) Applicant: ThreatModeler Software Inc., Jersey City, NJ (US)

(72) Inventor: Anurag Agarwal, Jersey City, NJ (US)

(73) Assignee: ThreatModeler Software Inc., Jersey City, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/947,798

(22) Filed: Aug. 17, 2020

(65) Prior Publication Data

US 2020/0380138 A1 Dec. 3, 2020

Related U.S. Application Data

(63) Continuation-in-part of application No. 16/664,679, filed on Oct. 25, 2019, now Pat. No. 10,747,876, (Continued)

(51) Int. Cl.
*H04L 29/06* (2006.01)
*G06F 21/57* (2013.01)
(Continued)

(52) U.S. Cl.
CPC ............ *G06F 21/577* (2013.01); *G06F 9/547* (2013.01); *G06F 21/566* (2013.01); *G06N 5/04* (2013.01); *G06F 2221/034* (2013.01)

(58) Field of Classification Search
CPC .... G06F 21/577; G06F 21/552; G06F 21/554; G06F 17/30283; H04L 63/1433; H04L 63/20
See application file for complete search history.

(56) References Cited

U.S. PATENT DOCUMENTS

| 4,959,015 A | 9/1990 | Rasinski et al. |
| 6,952,779 B1 | 10/2005 | Cohen et al. |

(Continued)

OTHER PUBLICATIONS

Threat Risk Modeling, published online at least as early as Feb. 3, 2018 by OWASP, available at https://www.owasp.org/index.php/Threat_Risk_Modeling.

(Continued)

*Primary Examiner* — Hosuk Song
(74) *Attorney, Agent, or Firm* — Law Office of Paul B. Johnson; Paul B. Johnson

(57) ABSTRACT

Automated threat modeling methods include providing one or more servers and one or more data stores communicatively coupled with the server(s). The data store(s) may include a plurality of threat model components stored therein (stored components) and a plurality of threats stored therein (stored threats), each stored threat associated through the data store(s) with at least one of the stored components. Using one or more input fields displayed on one or more computing devices communicatively coupled with at least one of the server(s), one or more inputs are received, the input(s) including access credentials associated with an existing computing environment and one or more inputs configured to initiate, using the server(s) and the access credentials, automatic generation of a relational diagram (diagram) of the existing computing environment and automatic generation of a threat report. Automated modeling systems include systems configured to carry out automated modeling of an existing computing environment.

20 Claims, 30 Drawing Sheets

Related U.S. Application Data which is a continuation-in-part of application No. 16/228,738, filed on Dec. 20, 2018, now Pat. No. 10,699,008, which is a continuation-in-part of application No. 15/922,856, filed on Mar. 15, 2018, now Pat. No. 10,200,399, which is a continuation-in-part of application No. 15/888,021, filed on Feb. 3, 2018, now Pat. No. 1,025,549.

(60) Provisional application No. 62/520,954, filed on Jun. 16, 2017, provisional application No. 62/530,295, filed on Jul. 10, 2017, provisional application No. 62/527,671, filed on Jun. 30, 2017, provisional application No. 62/507,691, filed on May 17, 2017.

(51) Int. Cl.
  *G06F 21/56* (2013.01)
  *G06N 5/04* (2006.01)
  *G06F 9/54* (2006.01)

(56) References Cited

U.S. PATENT DOCUMENTS

| | | | |
|---|---|---|---|
| 7,096,502 B1 | 8/2006 | Fox et al. | |
| 7,260,844 B1 | 8/2007 | Tidwell et al. | |
| 7,433,829 B2 | 10/2008 | Borgia et al. | |
| 7,624,448 B2 | 11/2009 | Coffman | |
| 7,891,003 B2 | 2/2011 | Mir | |
| 7,900,259 B2 | 3/2011 | Jeschke et al. | |
| 8,191,139 B2 | 5/2012 | Heimerdinger et al. | |
| 8,255,995 B2 | 8/2012 | Kraemer et al. | |
| 8,272,061 B1 * | 9/2012 | Lotem | H04L 63/1433 726/25 |
| 8,312,549 B2 * | 11/2012 | Goldberg | G06Q 40/08 726/25 |
| 8,407,801 B2 | 3/2013 | Ikegami et al. | |
| 8,413,237 B2 | 4/2013 | O'Rourke et al. | |
| 8,413,249 B1 | 4/2013 | Chou | |
| 8,607,351 B1 * | 12/2013 | Wang | G06F 21/577 726/25 |
| 8,893,273 B2 * | 11/2014 | Honig | G06F 16/13 726/23 |
| 9,043,924 B2 | 5/2015 | Maor et al. | |
| 9,497,203 B2 | 11/2016 | Honig et al. | |
| 9,774,613 B2 | 9/2017 | Thomas et al. | |
| 10,200,399 B2 * | 2/2019 | Agarwal | H04L 63/20 |
| 10,255,439 B2 * | 4/2019 | Agarwal | G06F 16/904 |
| 10,262,132 B2 * | 4/2019 | Reinecke | G06F 16/90335 |
| 10,699,008 B2 * | 6/2020 | Agarwal | G06F 30/20 |
| 10,747,876 B2 * | 8/2020 | Agarwal | G06F 30/20 |
| 2001/0027388 A1 | 10/2001 | Beverina et al. | |
| 2006/0015941 A1 | 1/2006 | McKenna | |
| 2006/0241991 A1 | 10/2006 | Pudhukottai et al. | |
| 2011/0126111 A1 | 5/2011 | Gill et al. | |
| 2011/0178942 A1 | 6/2011 | Watters et al. | |
| 2014/0137257 A1 | 5/2014 | Martinez et al. | |
| 2016/0162690 A1 | 6/2016 | Reith et al. | |
| 2017/0213037 A1 | 7/2017 | Toledano et al. | |
| 2018/0255084 A1 | 9/2018 | Kotinas et al. | |
| 2018/0324207 A1 | 11/2018 | Reybok, Jr. et al. | |

OTHER PUBLICATIONS

Threat Model, Wikipedia, published online at least as early as Feb. 3, 2018, available at https://en.wikipedia.org/wiki/Threat_model (note that some of the material in this Wikipedia article appears to be posted by one or more inventors of the present application or its parent provisional applications—some of the material appears to be posted by Brian Beyst, for example, who is an inventor on two of the parent provisional applications).

Comparisons of Threat Model Modeling Methodologies, published online by ThreatModeler at least as early as Apr. 15, 2016, available at http://threatmodeler.com/comparison-threat-modeling-methodologies/ (note that this article appears to be affiliated with a business organization of, and may have been published under the direction of, one or more inventors of the present application or its parent provisional applications).

Microsoft Threat Modeling Tool, published online by Microsoft, different sections published at different times from Aug. 22, 2017 to Jan. 24, 2018, available online at https://docs.microsoft.c,om/en-us/azure/opbuildpdf/security/TOC.pdf?branch=live.

A description of an on-sale version of systems and methods, on sale in the U.S. by applicants at least as early as Dec. 31, 2011, which on-sale version disclosed some of the elements disclosed in the present application. The description includes a detailed discussion of which claim elements of the claims as originally filed in the present application were disclosed in the 2011 version and which were not, and includes screenshots of user interfaces used in the system/methods of the 2011 version.

Lockheed Martin Corporation, "Seven Ways to Apply the Cyber Kill Chain with a Threat Intelligence Platform," published at least as early as 2015.

Roy, Maurer. "Top Database Security Threats and How to Mitigate Them." Jul. 30, 2015. Retrieved from "https://www.shrm.org/resouresandtools/hr-topics/risk-management/pages/top-database-security-threats.aspx" (Year: 2015).

A. Amini, N. Jamil, A.R. Ahmad and M.R. Z'aba, 2015. Threat Modeling Approaches for Securing Cloud Computing. Journal of Applied Sciences, 15: 953-967. Retrieved from "https://scialert.net/fulltextmobile/?doi=jas.2015.953.967" (Year 2015).

Lucid-Charts AWS Import details, disclosing the ability to automatically generate a diagram based on an existing computing network, the diagram grouping components together in groups (and apparently allows refreshing to update the diagram based on changes in the cloud computing environment) but which does not apparently allow for automatic linking of components directly to one another (though the linking can be done manually), offered for sale in the U.S. at least as early as Feb. 24, 2020, some of these details are available online at https://www.lucidchart.com/pages/. p. 1-25.

\* cited by examiner

MITIGATIONS

DRAG A COLUMN HEADER AND DROP IT HERE TO GROUP BY THAT COLUMN

| THREAT | SOURCE | RISK | STATUS |
|---|---|---|---|
| FILE MANIPULATION | FILE SYSTEM | MEDIUM | OPEN |
| ACCESSING EXECUTABLE FILES | FILE SYSTEM | VERY HIGH | OPEN |
| CREATE FILES SAME NAME AS... | FILE SYSTEM | VERY HIGH | OPEN |
| MAN IN THE BROWSER | IE 11 | VERY HIGH | OPEN |
| MANIPULATING CONFIG FILE | FILE SYSTEM | VERY HIGH | OPEN |
| FORCE USE OF CORRUPT FILE | FILE SYSTEM | VERY HIGH | OPEN |
| MANIPULATING INPUT TO CALL | FILE SYSTEM | HIGH | OPEN |
| FILE MANIPULATION | FILE SYSTEM | MEDIUM | OPEN |
| ACCOUNT FOOTPRINTING | IE 11 | VERY HIGH | OPEN |
| AUTOMATION ATTACK | IE 11 | VERY HIGH | OPEN |
| PHYSICAL THEFT | LAPTOP | VERY HIGH | OPEN |
| PHYSICAL THEFT | LAPTOP | VERY HIGH | OPEN |
| BLUEJACKING | BLUETOOTH PORT | VERY HIGH | OPEN |
| PHISHING | OUTLOOK 2010 | VERY HIGH | OPEN |
| SPAM | OUTLOOK 2010 | VERY HIGH | OPEN |
| DNS CACHE POISONING | EMAIL SERVER | VERY HIGH | OPEN |

[MITIGATE] [CLOSE]

COMPENSATING CONTROLS

DRAG A COLUMN HEADER AND DROP IT HERE TO GROUP BY THAT COLUMN

| CONTROL | THREAT | SOURCE | RISK | STATUS |
|---|---|---|---|---|
| FIREWALL | TCP WINDOW SCAN | WINDOWS 7 | LOW | MITIGATED |
| FIREWALL | TCY SYN SCAN | TCP | LOW | OPEN |
| FIREWALL | TCP ISN CTR RATE PROBE | TCP | LOW | OPEN |
| FIREEYE | MAN IN THE BROWSER | IE 11 | VERY HIGH | MITIGATED |
| CYLANCE | MALWARE PROP VIA USB | USB PORT | VERY HIGH | MITIGATED |
| AV DLP | FORCE USE CORRUPT FILE | FILE SYSTEM | VERY HIGH | MITIGATED |
| MCAFEE DLP | MAN IN THE MIDDLE ATK | WIFI PORT | VERY HIGH | MITIGATED |
| BIT9 | FILE MANIPULATION | FILE SYSTEM | MEDIUM | MITIGATED |
| BIT9 | ACCOUNT FOOTPRINTING | IE 11 | VERY HIGH | OPEN |
| BIT9 | AUTOMATION ATTACK | IE 11 | VERY HIGH | MITIGATED |
| AV HIPS | PHYSICAL THEFT | LAPTOP | VERY HIGH | MITIGATED |
| BITLOCKER | PHYSICAL THEFT | LAPTOP | VERY HIGH | MITIGATED |
| IPC | BLUEJACKING | BLUETOOTH PORT | VERY HIGH | OPEN |
| IRONPORT | PHISHING | OUTLOOK 2010 | VERY HIGH | MITIGATED |
| IRONPORT | SPAM | OUTLOOK 2010 | VERY HIGH | MITIGATED |
| AKAMAI DNS | DNS CACHE POISONING | EMAIL SERVER | VERY HIGH | OPEN |

| NEW | EDIT | DELETE | DIAGRAM | REPORT | THREAT TREE | | | | |
|---|---|---|---|---|---|---|---|---|---|

| THREAT MODELS [PDF] « | | ENDPOINT SECURITY V.1 | | | | | |
|---|---|---|---|---|---|---|---|
| NAME ▸ | V. ▸ | THREATS 358 | SECURITY REQ'TS 82 | TEST CASES 5 | CODE RVW 3 | | |
| AIR VEHIC SYS | 1.0 | CHANGE RISK ▸ | | CHANGE RISK STATUS ▸ | | | |
| AWS - EC2 | 1.0 | DRAG HEADER HERE TO GROUP BY THAT COLUMN | | | | | |
| BANKING APP | 1.2 | THREAT ▸ | RISK ▸ | STATUS ▸ | SOURCE ▸ | ACTION ▸ | |
| IOT ENVIR. | 1 | ACCT HIJACK | VERY HIGH | OPEN | AWS ELB | D | NOTE |
| WRK COMMUTE | 1 | INSEC. COMM. | VERY HIGH | OPEN | AWS ELB | D | NOTE |
| CRM APP | 2.0 | PWD BRUTE F... | HIGH | OPEN | APP | D | NOTE |
| ECOMM POC | 2.5 | SENS DATA EXP | VERY HIGH | OPEN | APP | D | NOTE |
| END POINT SEC. | 1 | SQL INJECTION | HIGH | MITIGATED | APP | D | NOTE |
| IOT SERVER | 1 | BLIND SQL INJ | HIGH | MITIGATED | APP | D | NOTE |
| MICROWEB SVC | 1.0 | IDENT SPOOF | MEDIUM | OPEN | WEB BR | D | NOTE |
| MOBILE BAKE... | 1 | TARGETED MAL | VERY HIGH | OPEN | WEB BR | D | NOTE |
| SQL DB | 12 | CLICKJACKING | VERY HIGH | OPEN | APP | D | NOTE |
| HEALTH THREAT | 1.0 | X SITE TRACING | VERY HIGH | OPEN | WEB SVR | D | NOTE |
| ONLINE BANK | 1 | IIS SNIFFING | VERY HIGH | OPEN | WCF SVC | D | NOTE |
| FINAN. THREAT | 1 | XML SVC DEN | VERY HIGH | OPEN | WEB SVC | D | NOTE |
| | | BUFFER OVFLW | VERY HIGH | OPEN | MS WORD | D | NOTE |
| | | FILE MANIP | MEDIUM | MITIGATED | FILE SYS | D | NOTE |
| | | PHYS THEFT | VERY HIGH | MITIGATED | LAPTOP | D | NOTE |
| | | BLUEJACKING | VERY HIGH | OPEN | BT PORT | D | NOTE |

AWS ACCELERATOR

| ACCOUNTS | VPCs | THREAT MODELS | OUT OF SYNC THREAT MODELS |
|---|---|---|---|
| 2 | 8 | 62 | 42 |

AWS ORGS

- THREATMODELER AWS
- THREATMODELER DEV

THREATMODELER AWS

| VPC ID | THREAT MODEL | |
|---|---|---|
| VPC-00BFE5BDB46B974CF - (N. VA) | | 1 |
| VPC-04AD8617DD876EB05 - (N. VA) | VPC-04AD8617DD876EB05 - 1.1 | 1 |
| VPC-04AD8617DD876EB05 - (N. VA) | | |
| VPC-04C67913FF054C03F - (N. VA) | | 4 |
| VPC-0A9FF32772149344D - (N. VA) | | 4 |
| VPC-0C804375C25F5A57E - (N. VA) | | 3 |
| VPC-0FDAB76E3BAC7A714 - (N. VA) | | 21 |
| VPC-0FFE841CDEB6A5F29 - (N. VA) | | 28 |

SYSTEMS AND METHODS FOR AUTOMATED THREAT MODELING OF AN EXISTING COMPUTING ENVIRONMENT

CROSS REFERENCE TO RELATED APPLICATIONS

This document is a continuation-in-part application of U.S. patent application Ser. No. 16/664,679 titled "Systems and Methods for Assisted Model Generation," naming as first inventor Anurag Agarwal, filed Oct. 25, 2019, which in turn is a continuation-in-part application of U.S. patent application Ser. No. 16/228,738 titled "Threat Model Chaining and Attack Simulation Systems and Related Methods," naming as first inventor Anurag Agarwal, filed Dec. 20, 2018, which in turn is a continuation-in-part application of U.S. patent application Ser. No. 15/922,856 titled "Threat Model Chaining and Attack Simulation Systems and Methods," naming as first inventor Anurag Agarwal, filed Mar. 15, 2018, issued as U.S. Pat. No. 10,200,399 on Feb. 5, 2019, which in turn is a continuation-in-part application of U.S. patent application Ser. No. 15/888,021 titled "Threat Modeling Systems and Related Methods Including Compensating Controls," naming as first inventor Anurag Agarwal, filed Feb. 3, 2018, issued as U.S. Pat. No. 10,255,439 (hereinafter "the '021 Application") on Apr. 9, 2019, which '021 Application in turn claims the benefit of the filing date of U.S. Provisional Pat. App. Ser. No. 62/507,691 titled "System and Method of Including Compensating Controls in a Threat Modeling Process," naming as first inventor Anurag Agarwal, filed May 17, 2017, and which '021 Application also claims the benefit of the filing date of U.S. Provisional Pat. App. Ser. No. 62/527,671 titled "System and Method for Identifying and Analyzing the Potential Attack Surface of a Complex System," naming as first inventor Anurag Agarwal, filed Jun. 30, 2017, and which '021 Application also claims the benefit of the filing date of U.S. Provisional Pat. App. Ser. No. 62/530,295 titled "Method and Apparatus for Early Implementation of Enterprise DevSecOps," naming as first inventor Anurag Agarwal, filed Jul. 10, 2017, and which '021 Application also claims the benefit of the filing date of U.S. Provisional Pat. App. Ser. No. 62/520,954 titled "System and Method for Identifying Potential Threats to a Complex System," naming as first inventor Anurag Agarwal, filed Jun. 16, 2017, the disclosures of each of which are hereby incorporated entirely herein by reference.

BACKGROUND

1. Technical Field

Aspects of this document relate generally to threat modeling processes and systems.

2. Background Art

Threat modeling is a process by which vulnerabilities of a system or process may be detailed and prioritized. One example of an existing threat modeler is a modeler marketed under the name THREAT MODELING TOOL by Microsoft Corporation of Redmond, Wash. Threat modeling allows a user to analyze potential attack vectors and prioritize vulnerabilities. While some threat modeling involves threats related to computing networks and systems, threat modeling in general encompasses a broader scope and may involve modeling threats in non-computer-related systems and processes. Some commercial threat modeling tools utilize a dynamic question and answer user interface which generally relies on an underlying data flow diagram (DFD) or process flow diagram (PFD) conceptual basis.

With regards to modeling computing networks, traditional threat modeling systems & methods exist for assessing risk from potential cyber threats at an individual application level without fully accounting for application-application interactions, thereby miscalculating organizational risk. Other systems & methods exist for discovering vulnerabilities to applications deployed in cyber environments by surveying applications. These rely on recognizing previously identified and cataloged vulnerability signatures and are not designed to survey non-application items included in an organization's cyber environment, nor can these systems recognize which threats newly introduced to a cyber system are relevant to security, nor can these systems perform "what-if" scenarios as part of an organization's risk management analysis. Existing methodologies also do not provide for communicating the risks associated with identified threats in a way that non-security experts easily appreciate or understand.

Accordingly, traditional threat modeling methodologies have the following weaknesses: (1) they are effective in analyzing only single applications operating in isolation on a predetermined infrastructure; (2) they require security subject-matter experts for their creation, use, and maintenance; (3) they are resource-intensive to build and maintain, and; (4) they cannot be effectively used to scale a threat modeling practice to meet the needs of enterprises generating tens of software applications per year. Traditional threat modeling methodologies also cannot be easily integrated into existing agile software development approaches or with DevOps practices, and so are often rejected by agile developers and operational teams as non-productive.

Existing threat modeling methodologies also do not help organizations understand: (1) the nature of application interactions; (2) the user of shared components; (3) the effect of including third-party elements within the IT ecosystem; (4) the downstream impact should potential threats be realized; (5) the nature of the organization's comprehensive attack surface; (6) the explicit nature of the organization's attacker population; (7) the effectiveness of deployed or contemplated compensating controls; or (8) a means to communicate the potential impact should threats be realized without communicating confidential information or security details which could further expose the organization to risk from potential threats.

SUMMARY

Embodiments of methods for automated threat modeling of an existing computing environment may include: providing one or more servers; providing one or more data stores communicatively coupled with the one or more servers, the one or more data stores including: a plurality of threat model components stored therein (stored components); and a plurality of threats stored therein (stored threats), wherein each stored threat is associated through the one or more data stores with at least one of the stored components; receiving, using one or more input fields displayed on one or more computing devices communicatively coupled with at least one of the one or more servers, one or more inputs, the one or more inputs including: access credentials associated with an existing computing environment; and one or more inputs configured to initiate, using the one or more servers and using the access credentials, automatic generation of a relational diagram (diagram) of the existing computing environment and automatic generation of a threat report; displaying the diagram on one or more user interfaces of the one or more computing devices, using visual representations of one or more of the stored components (diagrammed components) corresponding with components that form the existing computing environment, the diagram defining a threat model; and displaying the threat report on the one or more user interfaces, the threat report displaying each stored threat that is associated through the one or more data stores with one of the diagrammed components.

Embodiments of methods for automated threat modeling of an existing computing environment may include one or more or all of the following. The automatic generation of the diagram may include the one or more servers determining, using an application program interface (API) associated with the existing computing environment, the components that make up the existing computing environment. The automatic generation of the diagram may further include the one or more servers determining relationships between the components that form the existing computing environment. The method may include displaying, on the diagram, for one or more of the diagrammed components, a resource identifier (component identifier) obtained by the one or more servers using an application programming interface (API) associated with the existing computing environment. The method may further include, in response to an alteration of the existing computing environment, automatically updating the diagram and the threat report to reflect an altered state of the existing computing environment. The method may include automatically repeatedly updating the diagram and the threat report on a schedule to reflect a current state of the existing computing environment. The method may further include displaying, on the one or more user interfaces, a list of stored components represented on the diagram that do not exist in the existing computing environment. The method may include displaying, on the one or more user interfaces, a list of components forming the existing computing environment that are not represented in the diagram. The method may further include displaying a sync input field on the one or more user interfaces, the sync input field configured to, in response to receiving a user input, initiate immediate updating of the diagram and the threat report to reflect a current state of the existing computing environment.

Embodiments of automated threat modeling systems may include: one or more servers; one or more data stores communicatively coupled with the one or more servers, the one or more data stores including: a plurality of visual representations of threat model components stored therein (stored visual representations); and a plurality of threats stored therein (stored threats), wherein each stored threat is associated through the one or more data stores with at least one of the stored visual representations; one or more input fields displayed on one or more computing devices communicatively coupled with at least one of the one or more servers, the one or more input fields configured to receive: access credentials associated with an existing computing environment; and one or more inputs configured to initiate, using the one or more servers and using the access credentials, automatic generation of a relational diagram (diagram) of the existing computing environment and automatic generation of a threat report; a diagram interface displayed on the one or more computing devices, the diagram interface displaying the diagram, using a subset of the stored visual representations (diagrammed components) corresponding with components that form the existing computing environment, the diagram defining a threat model; and a threat report interface (threat report) displayed on the one or more computing devices, the threat report displaying each stored threat that is associated through the one or more data stores with one of the diagrammed components included in the threat model.

Embodiments of automated threat modeling systems may include one or more or all of the following. The diagram interface may further display one or more communication lines connecting one or more of the diagrammed components. The system may be configured to, in response to receiving one or more user inputs manually adding a stored visual representation to the diagram interface, automatically redefine the threat model by including in it one or more stored threats associated with the added stored visual representation. The system may be configured to, in response to receiving one or more user inputs manually removing a stored visual representation from the diagram interface, automatically redefine the threat model by removing from it one or more stored threats associated with the removed stored visual representation. The diagram interface may further display, for one or more of the diagrammed components, a resource identifier (component identifier) obtained by the one or more servers using an application programming interface (API) associated with the existing computing environment. The diagram interface may further display a list of stored visual representations represented on the diagram that do not exist in the existing computing environment. The diagram interface may further display a list of components forming the existing computing environment that are not represented in the diagram. A tasks interface may be displayed on the one or more computing devices, the tasks interface recommending one or more edits to the diagram to comport with one or more rules. Embodiments of automated modeling systems may include: one or more servers; one or more data stores communicatively coupled with the one or more servers, the one or more data stores including a plurality of visual representations of computing environment components stored therein (stored visual representations); one or more input fields displayed on one or more computing devices communicatively coupled with at least one of the one or more servers, the one or more input fields configured to receive: access credentials associated with an existing computing environment; and one or more inputs configured to initiate, using the one or more servers and using the access credentials, automatic generation of a relational diagram (diagram) of the existing computing environment; and a diagram interface displayed on the one or more computing devices, the diagram interface displaying the diagram, using a subset of the stored visual representations (diagrammed components) corresponding with components that form the existing computing environment; wherein the diagram as initially displayed includes communication lines diagrammed between the diagrammed components.

Embodiments of automated modeling systems may include one or more or all of the following. The diagram interface may further display, for a plurality of communication lines, a plurality of distinct communication protocols, without requiring manual identification of the communication protocols. The diagram interface may further display, for one or more of the diagrammed components, a resource identifier (component identifier) obtained by the one or more servers using an application programming interface (API) associated with the existing computing environment.

General details of the above-described embodiments, and other embodiments, are given below in the DESCRIPTION, the DRAWINGS, and the CLAIMS.

BRIEF DESCRIPTION OF THE DRAWINGS

Embodiments will be discussed hereafter using reference to the included drawings, briefly described below, wherein like designations refer to like elements:

FIG. 6 is an implementation of an interface of the system of FIG. 1;

FIG. 8 is an implementation of an interface of the system of FIG. 1;

FIG. 9 is an implementation of an interface of the system of FIG. 1;

FIG. 11 is an implementation of an interface of the system of FIG. 1;

FIG. 12 is an implementation of an interface of the system of FIG. 1;

FIG. 13 is an implementation of an interface of the system of FIG. 1;

FIG. 27 is an implementation of an interface of the system of FIG. 1;

DESCRIPTION

Figure 1:
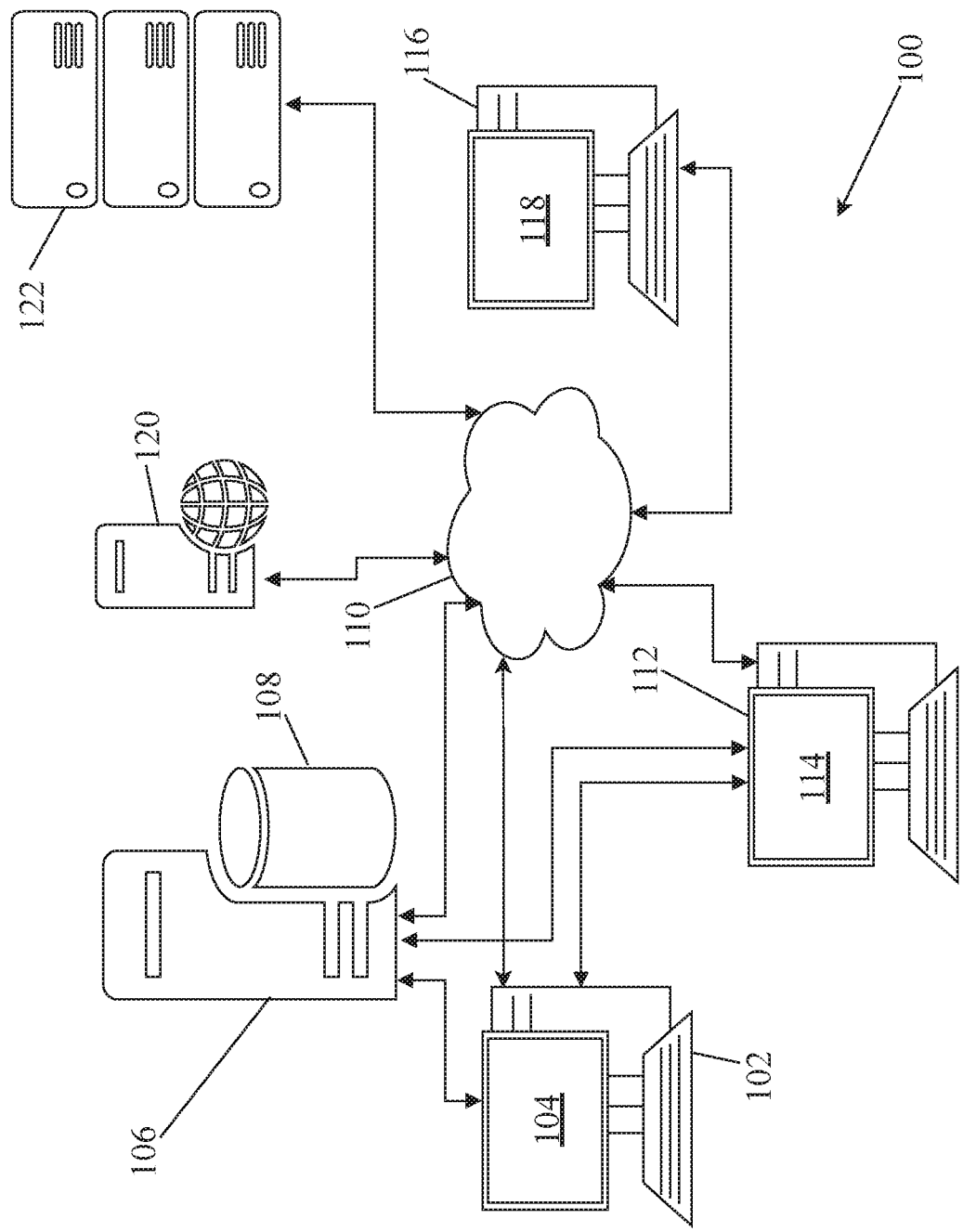
FIG. 1 is a diagram representatively illustrating an implementation of a threat modeling system (hereinafter "threat model chaining system," "attack simulation system," "system for automated threat modeling of an existing computing environment," and "system")

Implementations/embodiments disclosed herein (including those not expressly discussed in detail) are not limited to the particular components or procedures described herein. Additional or alternative components, assembly procedures, and/or methods of use consistent with the intended systems & methods for automated threat modeling of an existing computing environment may be utilized in any implementation. This may include any materials, components, sub-components, methods, sub-methods, steps, and so forth.

As used herein, the term "input field" includes a "selector." For example, a button or space on a user interface in which a user may move a cursor to and click to make a selection, and a checkbox field, and other similar fields, as well as alphanumeric input fields, are all "input fields" as used herein.

The term "compensating control" in implementations herein may be an alternative mechanism to a security requirement or standard issued by a standards-issuing body that is allowed by the standards-issuing body when the security requirement or standard as stated cannot be met by a party due to legitimate technical or documented business constraints.

In the payment card industry (PCI), as a non-limiting example, compensating controls were introduced in Payment Card Industry Data Security Standard (PCI DSS) 1.0 to give organizations an alternative to security requirements that could not be met due to legitimate technological or business constraints. According to the PCI Council, which was the standards-issuing body issuing the standard (jointly created by the four major credit-card companies VISA, MASTERCARD, DISCOVER, and AMERICAN EXPRESS), compensating controls in that industry must: (1) meet the intent and rigor of the original stated requirement; (2) provide a similar level of defense as the original stated requirement; (3) be "above and beyond" other PCI DSS requirements (not simply in compliance with other PCI DSS requirements); and (4) be commensurate with the additional risk imposed by not adhering to the original stated requirement. Examples of compensating controls for information technology may include: using audit trails and logs for payroll management instead of segregation of duties (having two individuals responsible for separate parts of payroll management); the use of database security applications and services, network access control (NAC), data leak prevention strategies, and e-mail encryption in lieu of comprehensive encryption (i.e., in lieu of converting all electronic data into ciphertext and changing cryptographic keys periodically); two-factor authentication with a change of password every 60 days in lieu of long complex passwords; and so forth.

Notwithstanding the above, in implementations herein "compensating control" may have a more general definition. For example, in implementations a "security requirement" may be defined as a mechanism for stopping or closing a threat at the source of the threat, and a "compensating control" may be defined as a mechanism for stopping or closing a threat not at the source, but between the source and some protected component (i.e., preventing a threat emanating from a source from reaching a protected component). In other implementations a "security requirement" may be defined as a hardware solution and a "compensating control" may be defined as a software solution, such as a change in the code or software added to a system. In still other implementations a "security requirement" may be generally defined as any solution which is costlier or more time consuming and a "compensating control" may be defined as a solution which is not as secure or sure-proof as the relevant security requirement but which is less cost-prohibitive or time-prohibitive.

The threat modeling system and related methods discussed herein are implemented using computing devices and/or networks. Referring to FIG. 1, an implementation of a threat modeling system (threat model chaining system) (attack simulation system) (system) 100 is shown. FIG. 1 only shows a representative example, and there are many other contemplated systems that could be used to implement the threat modeling processes. System 100 includes a computing device 102 having a display 104. While the computing device is drawn as a desktop computer it could be a laptop, a mobile phone or tablet, or any other type of computing device. The same goes for all other computing devices shown in the drawings.

Device 102 is shown communicatively coupled with server 106 which is communicatively coupled with a database (DB) 108. The coupling may be direct, such as through a wired connection, or through a local area network (LAN), or remotely through telecommunication network 110 (which may be the Internet). In some systems the server and database could be housed on the same machine as the computing device 102 using virtualization. In implementations device 102 could be accessed by an administrator of the system to choose settings, add or remove users, add or remove items from the database, and so forth. System 100 only shows one computing device 102, though in implementations the number of computing devices 102 may be scaled up to any number. Likewise, only one server and database are shown, but these also may be scaled up to any number as needed.

Other computing devices may be included in system 100. Computing device 112 includes display 114 and is an example of a computing device which is communicatively coupled with device 102 both directly (such as through a hardwired or wireless LAN), and coupled directly with the server (such as through a hardwired or wireless LAN), and also may be coupled with the server and/or the device 102 through telecommunication network 110. System 100 is shown with only one device 112 but in implementations it could be scaled up to any number of devices 112.

Computing device (device) 116 is an example of a computing device that is not directly coupled with either device 102 or the server but is only coupled thereto through the telecommunications network 110. Nevertheless, device 116 may access the server and database through the telecommunications network. Although only one device 116 is shown, this may be scaled up to any number. Device 116 has a display 118, as shown.

Also shown are a web server 120 and a remote server (server) 122, each of which may be included in implementations of system 100. By non-limiting example, device 116 may access the server 106 and database through the web server 120, such as by navigating to a uniform resource locator (URL) and providing login credentials. Computing devices 102 and 112 could do the same. Although only one web server is shown, this may be scaled up to any number as needed.

None of the computing devices shown in FIG. 1 are directly coupled with remote server 122, which may by non-limiting example be a third-party server, or multiple servers (such as a portion of a server rack) or any portion thereof. System 100 could, for example, exclude server 106, and utilize only remote servers 122 which have access to the database 108 (which may be stored on the remote servers), and each of the computing devices may access the database through the remote servers and through one or more described web servers such as through one or more user interfaces displayed on the displays of the computing devices when accessing correlated URLs.

In other implementations one or more application servers could be included in the system, the application server(s) positioned relationship-wise between an end-user device and the database(s) to facilitate operation of the methods that will be later described.

As indicated, these are only examples of how to implement a threat modeling system, and many other layouts are possible. System 100 may also include many other elements which are not shown for brevity. In a small business or organization wherein only one computing device may be needed to do threat modeling, system 100 could be implemented using a single computing device 102 with a database 108 stored thereon, or with one computing device 102 coupled with a server 106 and database 108 through a local connection (wired or hardwired), or using a cloud-stored database that the users access through user interfaces through remote servers 122 and/or web servers 120. In an organization in which multiple computing devices may need to do threat modeling the system 100 could be implemented using a computing device 102 having the database stored thereon, or coupled through a local or Internet connection to a database 108 stored elsewhere within the organization's computing devices such as on a server 106 or remotely on remote servers 122 accessed via a web server 120, with other computing devices 112 and/or 116 coupled either directly with device 102 and/or 106 and/or through the telecommunication network 110. In implementations in which remote servers are utilized these may be scaled up to any needed number.

The threat modeling system and methods include the modeling of threats utilizing software which users access and interact with through a variety of user interfaces, some examples of which will be described hereafter, but a brief description of the processes facilitated by the software will now be discussed.

Figure 2:
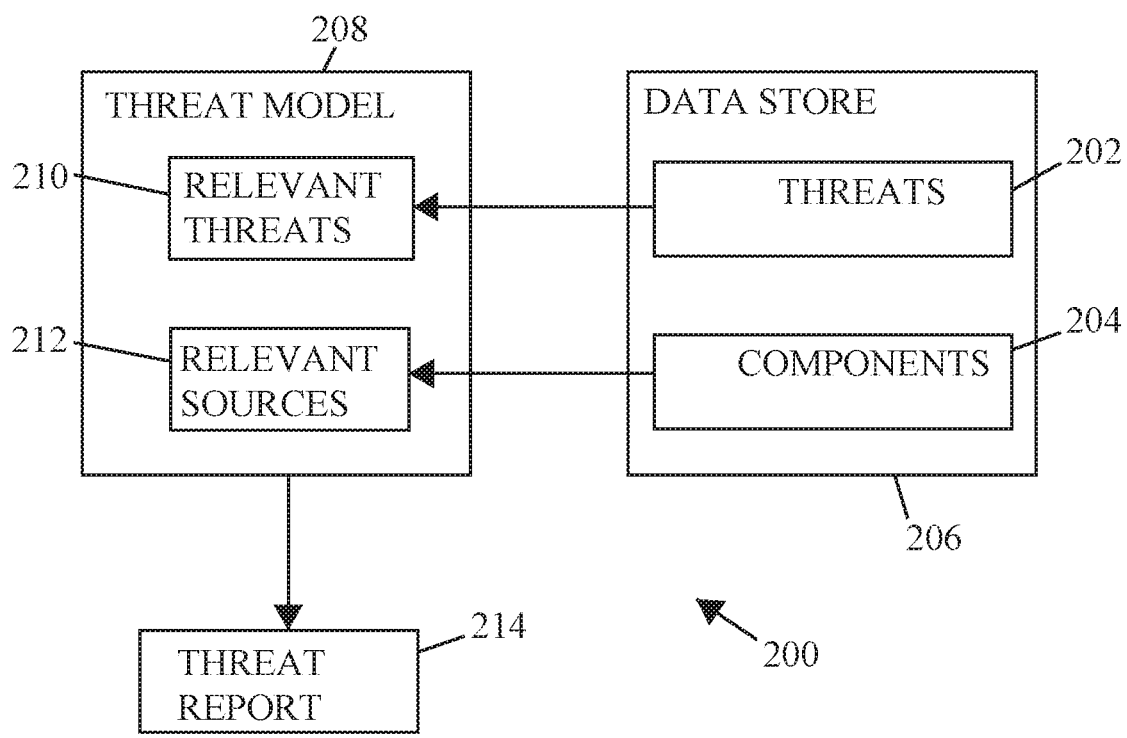
FIG. 2 is a block diagram representatively illustrating an implementation of a threat modeling method.

Referring to FIG. 2, a representative example of a threat modeling process (process) (method) 200 includes generating a threat model (model) 208 for any application, process, or system under consideration. By non-limiting example, this could include modeling the possible threats to commuting to work safely, modeling the possible threats to preventing the spread of an infectious disease, or modeling the possible attacks on a computing environment (cybersecurity). Model 208 is used to generate an original threat report (report) 214 which in implementations includes identified threats, the status of identified threats (threat status), and the source(s) of identified threats, among other things.

As illustrated in FIG. 2, process 200 may include storing a plurality of threats 202 and threat model components (components) 204 in a data store 206. This may include, by non-limiting example, storing titles, definitions or descriptions, and/or associated images in the database 108 for each component and/or threat. The threats and components are used to create threat model 208.

Process 200 in implementations includes a user selecting from among the available components those components which are relevant to any given system, process or application. This is represented by the arrow between "components" and "relevant sources." The relevant sources 212 are relevant sources of threats that are determined by the system 100 either after, or while, the user is selecting the components that are involved in the specific application, system or process and defining relationships between and among the relevant components. The system also retrieves from the database relevant threats 210 that were previously correlated with the chosen components or combinations of components through the database, to form the threat model 208 (this is representatively illustrated by the arrow between "threats" and "relevant threats"). The threat model thus includes relevant threats and the relevant sources of those threats. The threat model is used to generate a threat report 214.

There may be some components with which no threat is associated (and they are therefore not relevant sources of threats), and there may be some threats that are dependent on one or more relationships between components. For example, when modeling a computing network or computing environment some components may communicate with one another using a hypertext transfer protocol secure (HTTPS) protocol or instead with a transmission control protocol (TCP), and this relationship may determine whether there is a relevant threat to include in the model (or which relevant threat to include in the model). Although these relationships between components are communicative couplings and/or protocols in some instances, the relationships themselves may be considered "components" in a broad sense so that, in FIG. 2, the potential relationship types between components would themselves be considered components 204 that are stored in the data store and which the user utilizes to build a diagram of the system, application or process. Communication protocols may use conductive wires (electric signals), optic fibers (optic signals), wireless technologies (electromagnetic signals), and so forth.

FIG. 2 is a simplified diagram. Each component and each plurality of components is a potential relevant source for one or more threats. For example, one threat may be "Bluejacking" and one component, which would be correlated to this threat through the database, could be "BLUETOOTH port." Accordingly, if a user includes a BLUETOOTH port in a diagram of a computing system, the system 100 will identify that port as a relevant source for bluejacking in the associated threat model and threat report. The component in this example is a physical component of a computing device or computing system/network/environment. In other implementations components/sources may not be physical components. For example, if one is modeling the threats involved in commuting to work safely one threat may be "freeway collision" and one component, which would be correlated with this threat through the database, would be "merging onto freeway." Thus, in this latter example "merging onto freeway" would be a relevant source for "freeway collision." In this example the component (and relevant source) is defined as an action or step, and not as a physical component.

Regardless of whether the threats and components/sources are physical elements or steps, actions, etc., the database allows for the correlation of any threat to any number of components and likewise, the correlation of any component to any number of threats. Accordingly, using the above example, the BLUETOOTH port may be defined as a relevant source for a Bluejacking threat, but it may not be the only relevant source (another source may be a BLUETOOTH device wirelessly connected with the system being analyzed). Similarly, Bluejacking may be defined as one threat that may occur due to vulnerabilities of the BLUETOOTH port, but there may be other vulnerabilities or threats that are present in the system due to the BLUETOOTH port.

Figure 3:
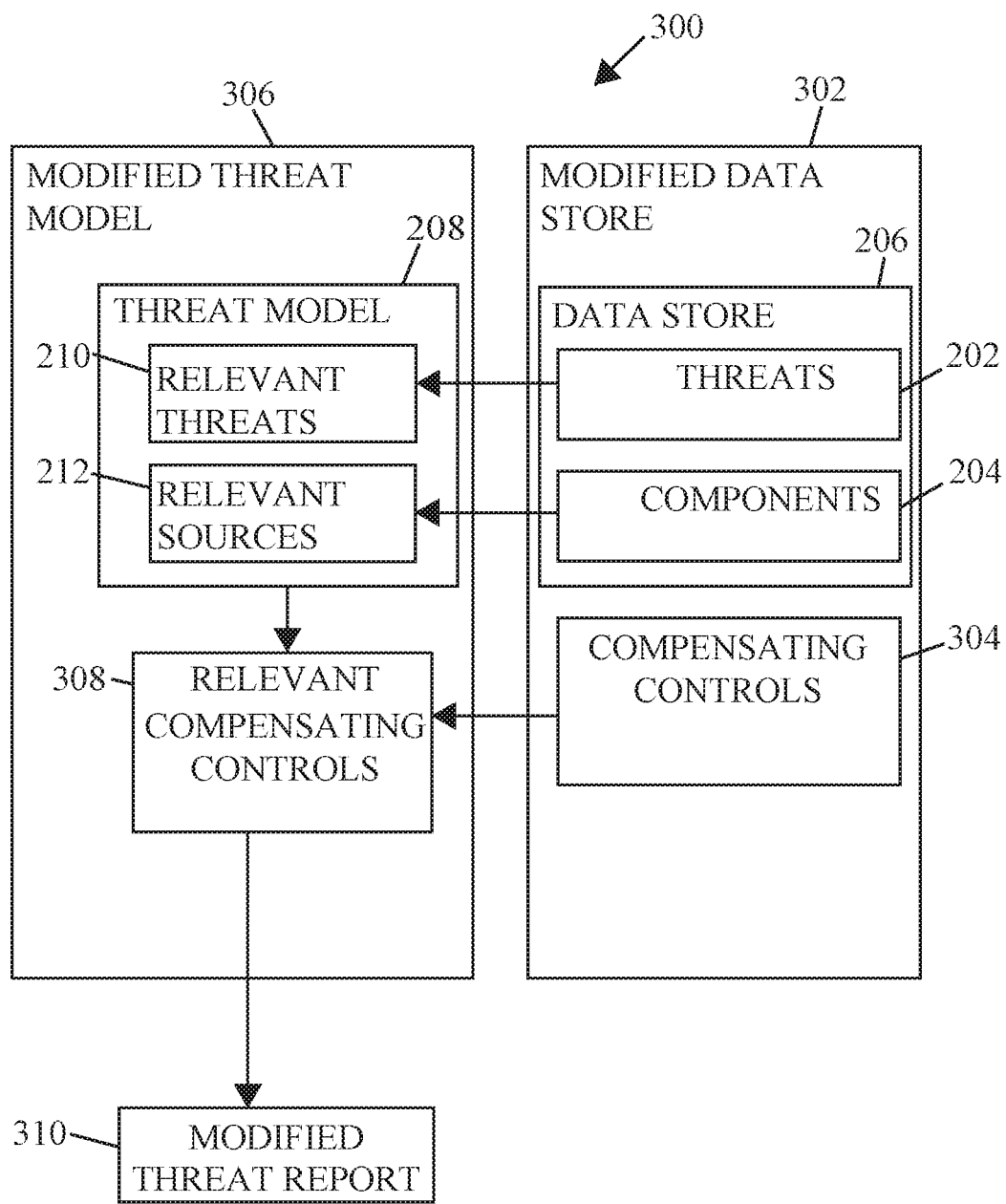
FIG. 3 is a block diagram representatively illustrating an implementation of a threat modeling method.

Referring to FIG. 3, another implementation of a threat modeling process (process) (method) 300 is shown. Method 300 includes the steps described above with respect to FIG. 2 but also includes additional steps. A modified data store 302 includes data store 206 but also includes compensating controls 304 stored in the database. The stored compensating controls include, by non-limiting example, a title, definition, image, and/or other items for each compensating control. Each compensating control may be associated with one or more threats and/or with one or more components and/or with one or more security requirements through the database (security requirements may in turn be associated with one or more components and/or one or more threats through the database). Method 300 includes user selection of one or more compensating controls (relevant compensating controls 308) from among all compensating controls 304 stored in the database, and the relevant compensating controls together with the threat model 208 previously discussed (in other words the relevant threats 210 and relevant sources 212) are included in the modified threat model 306. Modified threat model is used to generate modified threat report 310.

Figure 4:
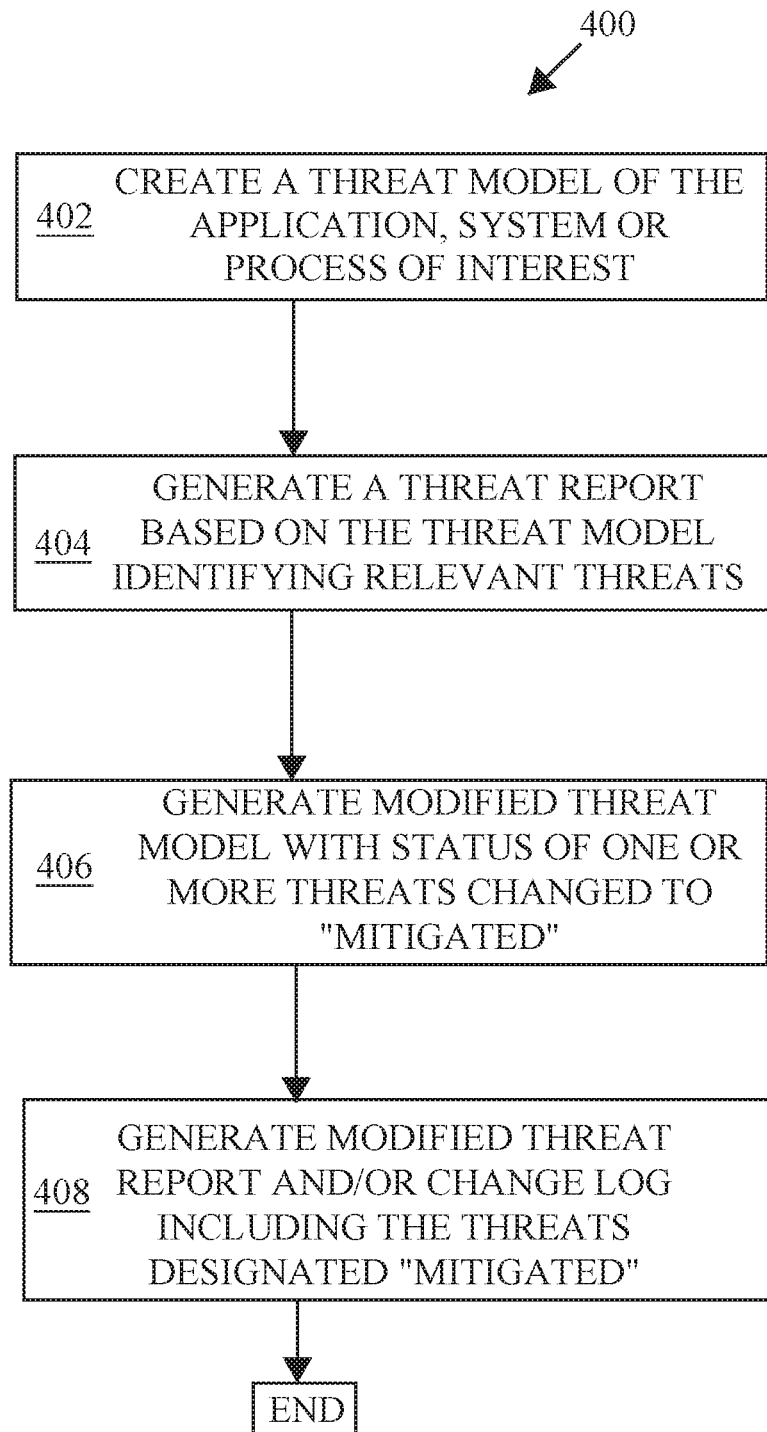
FIG. 4 is a flowchart representatively illustrating an implementation of a threat modeling method.

Referring now to FIG. 4, method 300 may include other steps and may be shown by threat modeling process (process) (method) 400 which includes creating a threat model of the application, system or process of interest (step 402), generating a threat report based on the threat model identifying relevant threats (step 404), generating a modified threat model with the status of one or more threats changed to "mitigated" using one or more of the relevant compensating controls (step 406), and generating a modified threat report and/or a change log including the threats designated as "mitigated" by the one or more relevant compensating controls (step 408).

Figure 5:
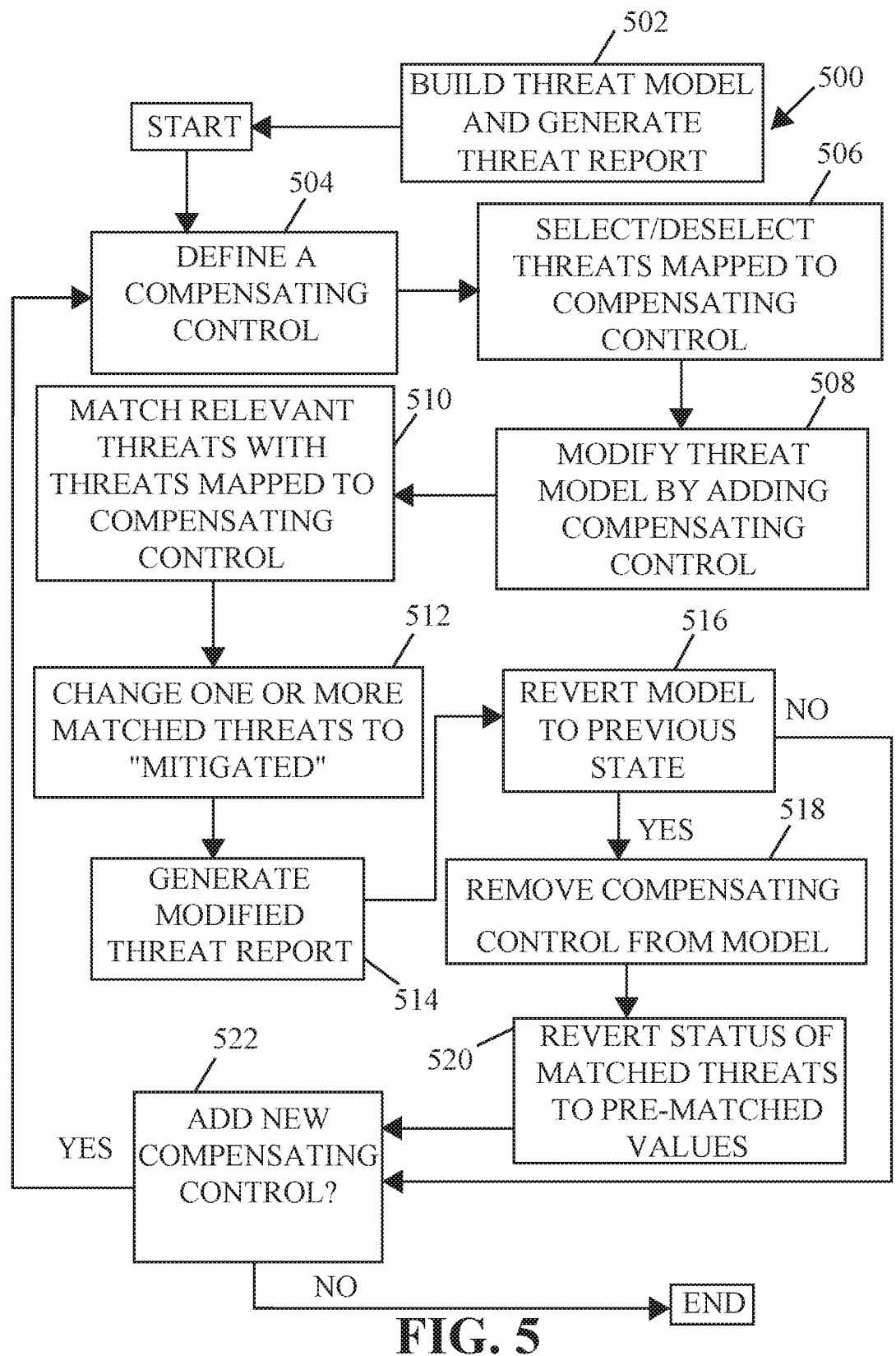
FIG. 5 is a flowchart representatively illustrating an implementation of a threat modeling method.

Referring now to FIG. 5, another implementation of a threat modeling process (process) (method) 500 is representatively illustrated. Method 500 includes cycling through the process of selecting/deselecting a compensating control (i.e., adding it to the threat model, or removing it) as often as the user chooses. After the threat model is initially built and the initial threat report is generated (step 502) the user may define a compensating control (step 504) (this step may also be done before the threat model has been built or the threat report generated). The user may select the threats mapped to the compensating control and/or deselect threats mapped to the compensating control (step 506).

The user may add the compensating control to the threat model and thereby modify the model (step 508). System 100 matches threats identified in the original threat model with those mapped to the selected compensating control (step 510). The user at this point may be able to further modify the threats mapped to the compensating control. The status of every matched threat may be changed to "mitigated" or some other status by the user (step 512). A modified threat report may then be generated (step 514). The user is then brought to a point at which he/she may select whether to revert the model to its previous state (step 516). If the user selects to not revert the model, the process skips to step 522, otherwise the compensating control is removed from the model (step 518) and the status of matched threats are reverted to their pre-matched values (step 520). The user then determines whether to add another compensating control (step 522) and if so the process cycles to step 504 again, otherwise the process ends.

Reference will now be made to several example user interfaces which may be utilized to accomplish the above general processes and other processes as will be described. It should be stressed that these are only examples, and that other user interfaces could be used to accomplish the methods. Similarly, although specific user interfaces are described with respect to specific functionalities (dropdown menus, buttons, fields, tags, text prediction, etc.), the practitioner of ordinary skill in the art will be able to mix and match these functionalities and/or use other functionalities with the user interfaces to make the user experience intuitive and easy. For example, in instances where a dropdown menu is present this could be replaced by a search field, or a radio button selection, and so forth. Nevertheless, the user interface implementations as depicted in the drawings are useful for a variety of reasons, as will be understood.

Figure 6:
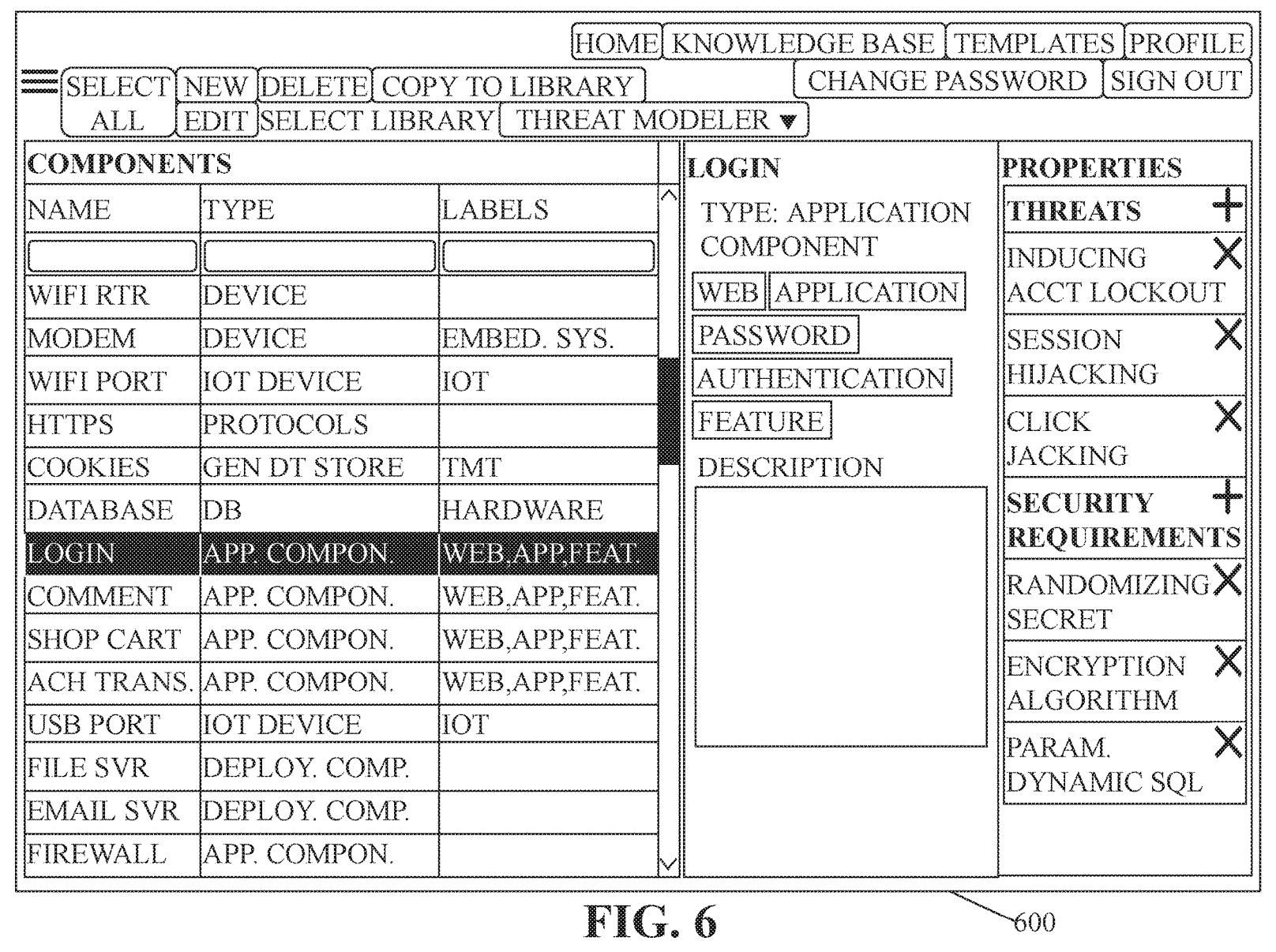

Referring now to FIG. 6, a representative example of a user interface (interface) 600 is shown. This interface is titled the "knowledge base" page and may be displayed on any of the displays of system 100 shown in FIG. 1, depending on the particular system setup. Interface 600 has a number of selectors or menu items near the top of the screen such as, by non-limiting example, a three-bar menu selector, a "select all" selector, a "new" selector, an "edit" selector, a "delete" selector, a "copy to library" selector, a "select library" dropdown selector, a "home" selector, a "knowledge base" selector, a "templates" selector, a "profile" selector, a "change password" selector, and a "sign out" selector. In implementations some of these selectors may be further organized into dropdowns so as to take up less space on the interface. Additionally, in implementations of system 100 some or all of the menu items may be present on other interfaces, such that they are permanent menu items at the top of those other interfaces as the user navigates from one interface/page to another.

This "knowledge base" interface is an interface where the user may view and edit "components" that are stored in the database. The title "components" is thus present at the left near the top of the screen, and below this are three columns for "name," "type," and "labels." Below the column titles are search boxes where a user may begin typing and predictive text will bring up a list of items that begin with the letters typed so far. Each row shows one component type, name, and labels (if any). The list is scrollable as indicated by the scroll bar, and only a small number of components are listed here. For example, the topmost item is a WiFi router (named WIFI RTR in shorthand, and this and any other text used in the system may be in some type of shorthand or may be spelled out in its entirety in various implementations), its type is "Device," and no labels are applied. Shown in FIG. 6 are the following types: device, IoT device (which represents "internet of things" device), communication protocols (such as HTTPS), generic data store, database, application component, and deployment component. Other available types not shown may include, by non-limiting example: cloud, external system, FTP server, generic external interactor, generic process, generic trust boundary, Modbus, perimeter control, third party software, third party library, transaction, WINDOWS application, WINDOWS OS, and so forth. These are only representative examples, and the user may define new types as desired and apply those types to a new component (or existing component), which will associate the type with the component name through the database. The rows may be organized in alphabetical order by any of the columns (name, type, labels) by clicking on the title of the column and may be organized in reverse alphabetical order by again clicking on the same column header (and toggled with continued clicking). The labels column may be useful for, among other things, searching for components that have a label applied. For example, if the user is looking for embedded system components, the user may search in the labels column for "embedded system" (or a shortened version if the system uses a shortened version) to find all components that have the embedded system tag applied.

A user may select any row by clicking anywhere in that row. The selected row will be highlighted, as representatively illustrated in FIG. 6 wherein the "login" row is highlighted. Once a row is highlighted any data associated with the component through the database is shown to the right. For example, in the middle of the screen the component name "login" and its type "application component" are shown. Below this the tags applied to this component are shown, which in this case include: web, application, feature, authentication, password. A description can be associated with the component through the database—in this case no description has been provided. If a user desires to edit the name, type, labels, or description the above "edit" selector may be selected and the user will be able to input new information for any of these fields, which upon pressing a "cancel" button will revert to the prior data or upon pressing a "save" button will write the new data to the database.

Interface 600 also shows a "properties" section to the right, which shows the threats and security requirements associated with this component through the database. The user may press the plus icons to add new threats or security requirements, as desired, or may use the "X" icons to remove threats and/or security requirements associated with the component through the database. In this example the login component has the following threats associated with it: inducing account lockout; session hijacking; and clickjacking. The security requirements associated with the component in this example are: parameterized queries—dynamic SQL; breach—randomizing secrets per request; and encryption algorithm (the first two only show a short description on the interface screen for ease of viewing).

The threats and security requirements associated with the component through the database will at least partially facilitate the later threat modeling when a user is depicting a specific system layout. For example, if a user is depicting a computer system layout and adds the "login" component to the system layout then one or more or all of the associated threats may become "relevant threats" to the overall system as previously described. In some systems 100 all the threats associated with this element would become "relevant threats" to the specific application, process, or system being modeled, and in other systems 100 some of these threats may be automatically dropped from "relevant threats" for the specific application, process or system being modeled if other components added to the system would inherently mitigate those threats (such as an HTTPS protocol instead of HTTP protocol being used between two components).

With regards to the other selectors, a user may select the "select all" option to select all components then listed (if the user has done a search this would limit to selecting all those components populated by the search), and the user may then press the delete selector to delete all of these components and their relationships (associated threats, security requirements, tags, descriptions, etc.) from the database. The user may instead, once all are selected, press the "copy to library" selector to copy the selected items to a default library set up by the user previously through another interface. The user may similarly select only one or a few components to delete or copy to the default library. The "select library" selector allows a user to display various libraries, here the "Threat-Modeler" library is displayed but the user may create his/her own libraries, may view other built-in libraries or third-party libraries accessible through the interface through a web server or other server which communicates with another third-party database, and so forth.

The user may select the "new" icon to bring up a popup interface in which the user may define a new component, giving it a name, selecting the component type from a dropdown menu, adding an image to be displayed to represent the component (such as a lock for a security feature, a USB indicator for a USB device, etc.), labels, and a description, and may then select a "cancel" selector to cancel the new component or may select a "save" selector to write the new component information and relationships to the database, and selecting either save or cancel will also remove the popup interface and revert back to interface 600.

The home menu item at the top right of the screen will navigate the user to a home screen. The knowledge base icon will navigate to interface 600. The templates selector navigates to an interface similar to interface 1000 of FIG. 10 (hereinafter described) but with a blank canvas 1002 for creating a new template which may be used later for creating other relational diagrams (diagrams) 1004 (also described hereafter). The profile selector brings up a popup window which displays the current user's name, email, department, role (admin, etc.), and last login date/time as stored in the database, and a close button to close the window. The change password selector brings up a popup window to change the user's password with a "close" selector to cancel the change and a "save" selector to write the new data to the database. In implementations the home, templates, and knowledge base icons are permanently displayed at the top of all interfaces of system 100 and the profile, change password, and sign out selectors are available from a dropdown icon which is also displayed at the top of all interfaces of system 100. The sign out selector allows the user to log out of the system. Interface 600, as well as other interfaces of the system, may also include a refresh selector to refresh the page and a help icon to bring up a help menu. An icon displaying a title and/or logo of the software may also be displayed at the top of the screen (such as the top left) which when selected may navigate to the home screen.

Figure 7:
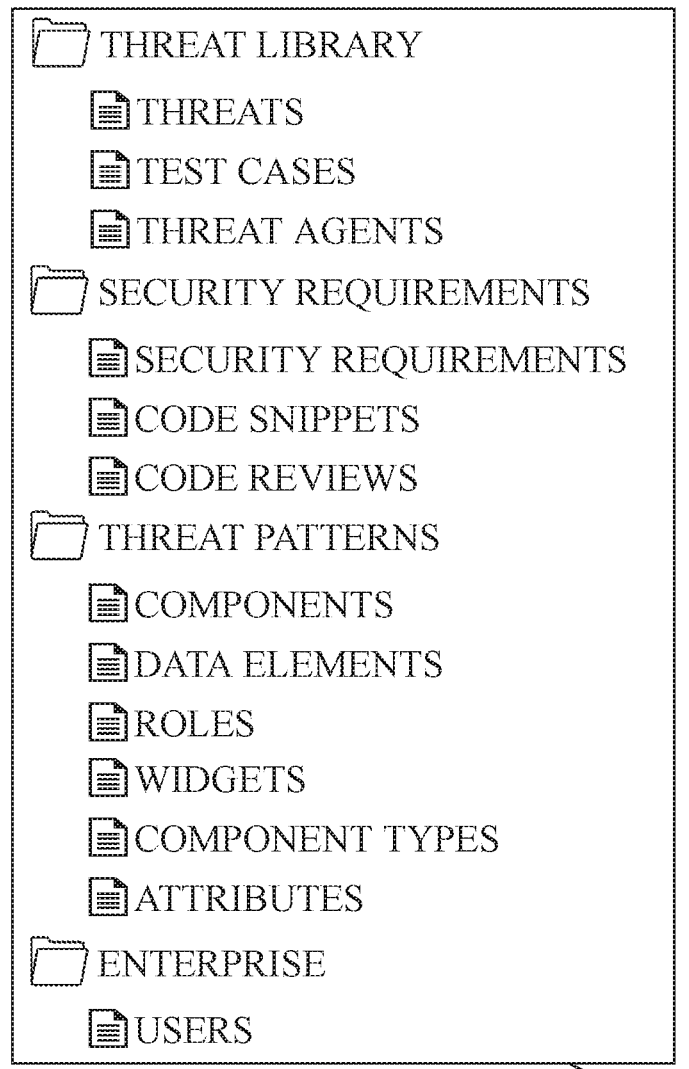
FIG. 7 is an implementation of an interface of the system of FIG. 1.

When the triple-bar menu icon is selected it brings up a popup expandable menu which, when all items are fully expanded, appears as interface 700 of FIG. 7. The "threat library" menu item includes the sub-menu items "threats," "test cases," and "threat agents," the "security requirements" menu item includes the sub-menu items shown, the "threat patterns" menu item includes the sub-menu items shown, and the "enterprise" menu item includes the sub-menu item "users." When any of the sub-menu items are selected an interface very similar to interface 600 is displayed.

Figure 8:
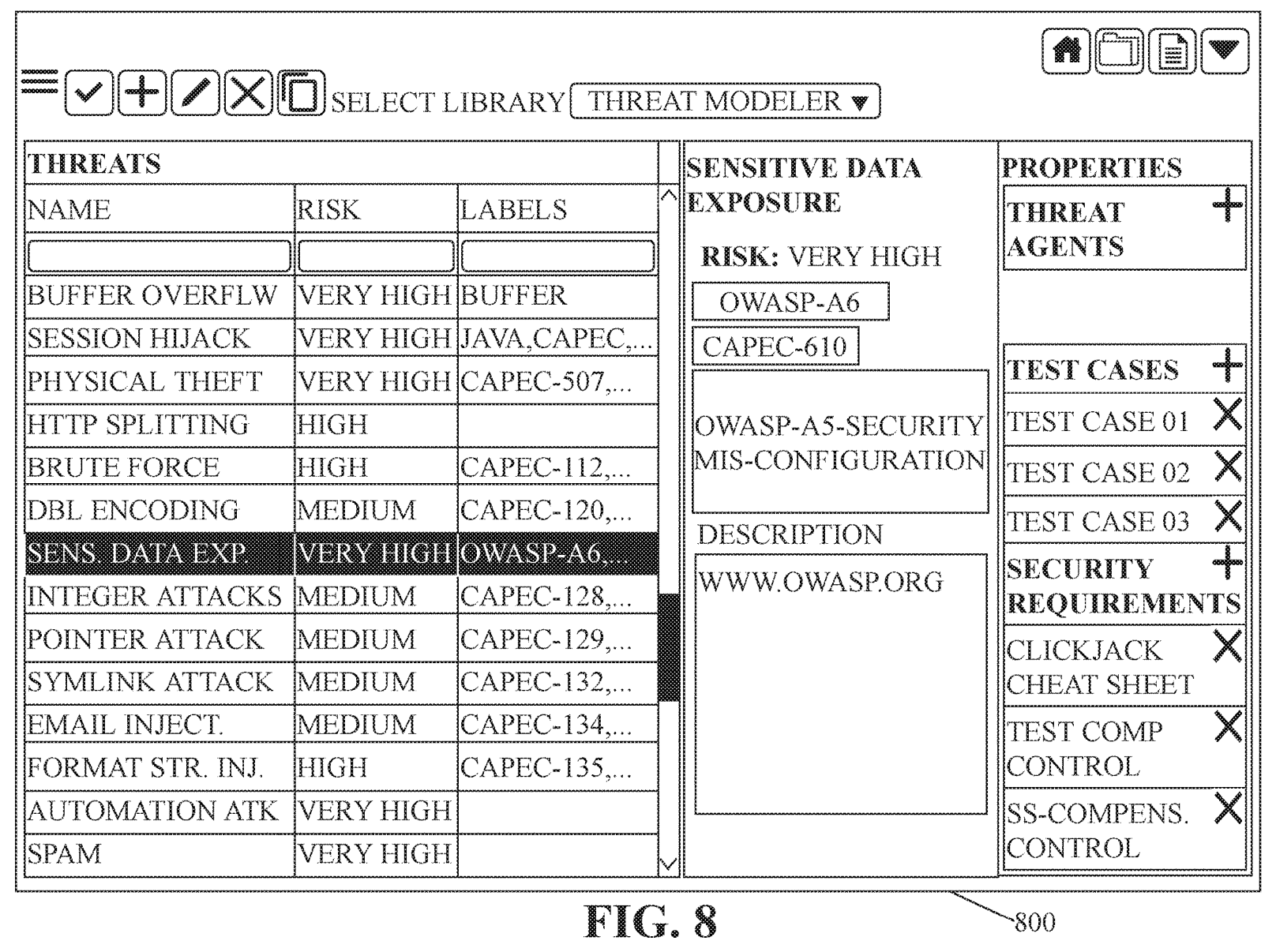

For example, FIG. 8 shows interface 800 which is accessed by selecting the "threats" sub-menu item. The title "threats" is shown near the top of a list of threats which are organized into rows and columns showing each threat's name, risk level, and attached labels. Several threats are shown, and any column may be searched using the search box directly below the name, risk, or labels headers, which behaves similarly as described for FIG. 6, and the data may be organized alphabetically (or reverse alphabetically) by any column as described with respect to interface 600. The selected threat is highlighted, and its information is displayed to the right including the name, risk level, labels, and a description, which in this case includes a URL. The properties section includes threat agents which may be added, though none are added to this threat—but examples include things like "insider," "black hat," "hacktivist," "cyber terrorists," "authorized external user," and so forth which are threat agents that had previously been identified by the user. Threat agents may be added and removed. Test cases may also be added and removed—this threat has three test cases added which were previously entered into the database by the user. Security requirements may also be added by the user and, in this way, compensating controls may be associated with specific threats through the database—this is one of the ways the system facilitates step 506 of FIG. 5. Security requirements may be added to the database originally through another interface, described hereafter, and identified there as a compensating control, then added to a specific threat from interface 800. Such an association through the database facilitates the system displaying various compensating controls in a diagrammed system, method or application and the threats those compensating controls can mitigate.

The menu items at the top of FIG. 8 are the same commands/links as those shown in FIG. 6 but are shown here in icon format to give another representative example, where the select all selector is represented by a checkmark, the new selector is represented by a plus icon, the edit selector is represented by a pencil icon, the delete selector is represented by an "X" icon, the copy to library selector is represented by an icon of two documents, the home selector is represented by a home icon, the knowledge base selector is represented by a file folder icon, the templates selector is represented by a document icon, and the profile, change password, and sign out selectors are available by selecting a dropdown menu represented by a downward facing triangle icon.

Referring back to FIG. 7, if the "test cases" sub-menu item is selected an interface similar to interfaces 600/800 is displayed, but showing test cases, and allowing the user to add, edit, delete, copy, add labels, and so forth, similarly as previously described with respect to the "threats" sub-menu item. The threat agents, security requirements, code snippets, code reviews, components (already described with respect to interface 600 since the components interface is set as the default interface when the "knowledge base" selector is selected), data elements, roles, widgets, component types, attributes, and user sub-menu items all have similar functionality and bring up similar interfaces when selected. Data elements, which represent data elements that may be captured by any diagrammed system, application or process (such as credit card numbers, billing addresses, pins, phone numbers, email addresses, order history, birth date, medical history, insurance history, and so forth) may be associated with specific threats and with specific security requirements in the same way as those associations may be made for components.

Figure 9:
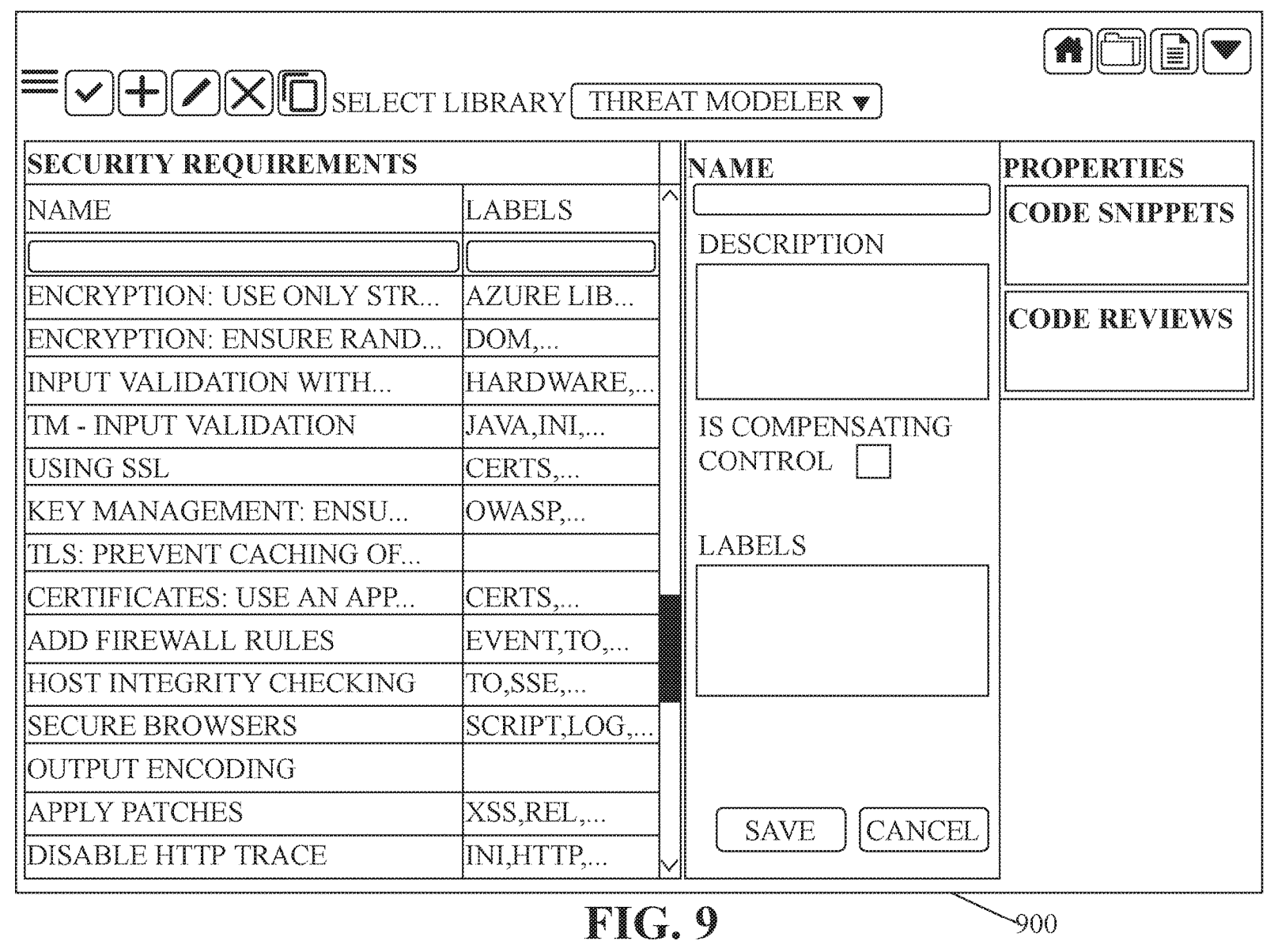

If a user selects the security requirements sub-menu item an interface similar to interfaces 600/800 will be shown similar to interface 900 of FIG. 9, which allows the user to order security requirements alphabetically (or reverse) by name or label and search for specific security requirements. Selecting any security requirement will highlight it and display its name, description, labels, an indicator to indicate whether the security requirement is a compensating control, and any code snippets or code reviews (under a "properties" header) that have been associated with the security requirement (which may be added or removed from that interface similar to what is described with respect to the "properties" elements of interfaces 600/800).

Interface 900 is actually the interface visible when the user selects the "new" selector to create a new security requirement. From this window the user may add a name, add a description, check a box (or leave it blank) to indicate whether the security requirement is a compensating control, add any labels (which are previously input into the database by the user), and press cancel to abort the addition or press save to write the data to the database.

From any of the previously mentioned interfaces, if the user presses the home selector an interface similar to interface 1300 of FIG. 13 will be displayed, which lists all previously stored threat models by name and shows their version. Either column may be organized alphabetically or in reverse, and the PDF button will export the list to PDF. If any specific threat model is selected it will be highlighted and its associated threat report (threat report interface) 1302 will be displayed, which will be discussed hereafter. From the top menu items the user may select the new selector to create a new threat model, the edit selector to edit the name, version, risk level, an "internal" toggle, and labels associated with the selected threat model, a delete selector to delete the selected threat model, a diagram selector to view the diagram for the selected threat model, a report selector to export to PDF the threat report (which shows for each threat the threat name, source, risk level, status, and creation date), a threat tree selector to view a diagrammed threat tree, showing threats of the threat model, and other selectors already described.

If the threat tree selector is selected a threat tree is displayed in which threats are organized as sub-elements of data elements and/or components, and also displayed are mitigating security requirements or compensating controls that may be implemented to mitigate the threats and an indicator of whether each threat has been mitigated. Portions of the tree may be collapsed, expanded, or viewed in vertical tree or horizontal tree format. The interface showing the tree diagram has selectors to zoom in, zoom out, revert to 100% zoom, toggle on/off a thumbnail overview image in a corner of the display, save an image of the tree, open a legends window which shows the colors in which various elements are diagrammed (threat agent, widget, component, role, data element, security requirement, threat, protocol, node, and project), and a filter selector which allows the user to remove and add back in any of the aforementioned items from the tree. The tree may be dragged and moved in any direction for viewing any portion of it easier.

Continuing with FIG. 13, if the new selector is selected (which, as with all other selectors, could be implemented as an icon or logo absent any wording), a popup window appears allowing the user to enter a name, version, toggle an "internal" indicator, select a risk level from a dropdown (from among previously determined risk levels stored in the database), apply labels (which allow the user to type and populate a list of already entered labels stored in the database to select one, or to add a new label by typing a new item and selecting "add new"), or the user may select a "new from template" button to begin a new diagram from an existing diagram template, or a "new from features" button to begin a new diagram from user-selected features, or the user may select "import" to begin a diagram from a previously stored diagram (such as from an older version of the software), or the user may select "empty" to begin a diagram with a blank canvas.

Figure 15:
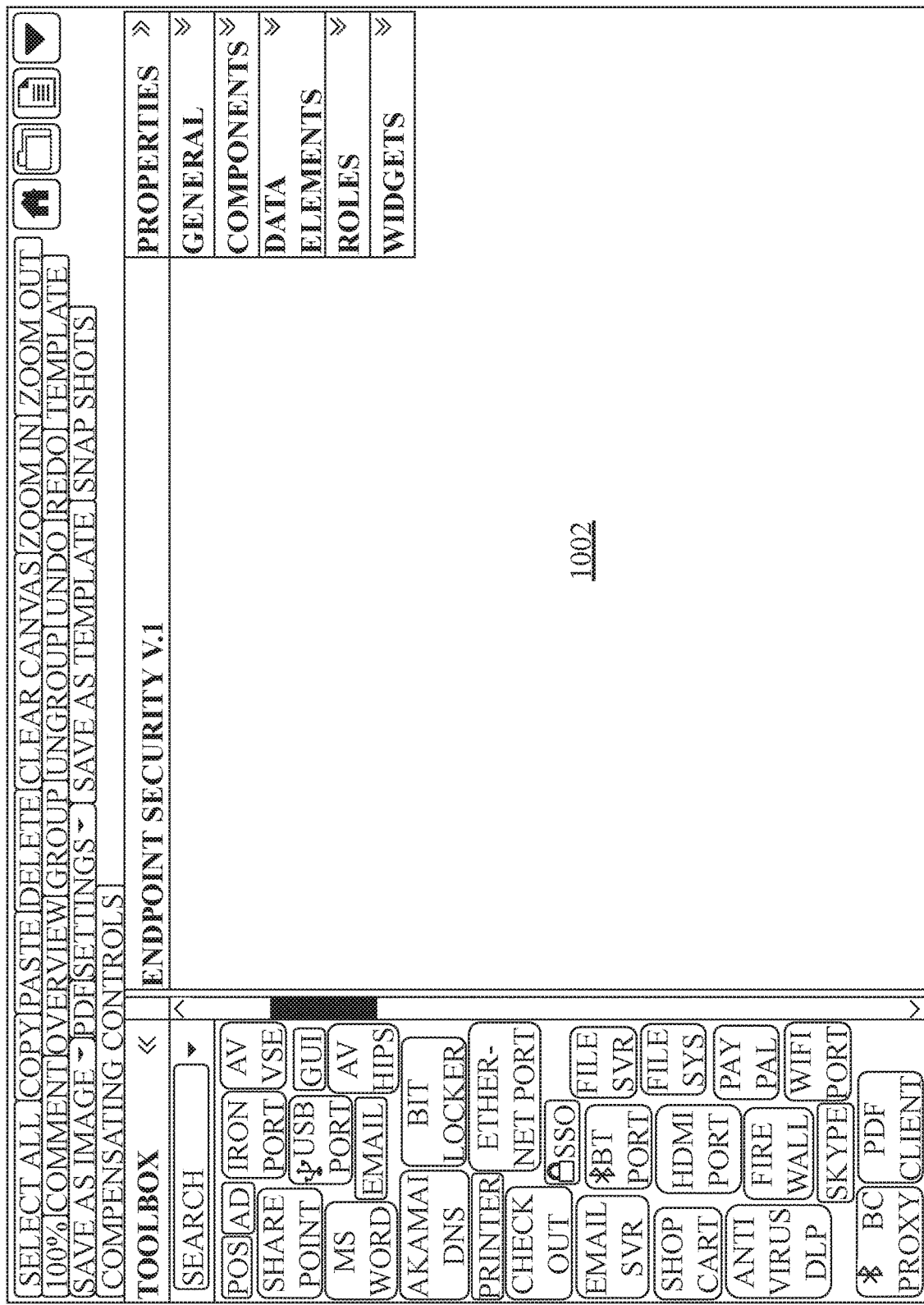
FIG. 15 is an implementation of an interface of the system of FIG. 1.

If the user selects "new from features" the diagram interface of FIG. 15 displays with a blank canvas 1002, and a popup selector (not shown) allowing the user to select "business requirement" features which are desired to be included in the model such as, by non-limiting example, authentication, funds transfer, credit verification, bill pay, or other features already stored in the database previously by the user, and after selecting the desired features, the blank canvas will populate with a node for each feature. The user can then modify and/or add components to the diagram as desired. In implementations each of these added "business requirements" will add a "component group" to the diagram and threat model, as will be described hereafter.

If the user selects "empty" the diagram interface (interface) 1000 of FIG. 15 will appear, showing the blank canvas 1002 as shown. To the left of the canvas is a toolbox module which may be minimized using the left facing double arrows and re-expanded by selecting the same arrows which will then be right facing. To the right of the canvas is a properties module which also may be minimized and expanded in similar fashion, along with sub-menu items "general," "components," "data elements," "roles," and "widgets" each of which may be expanded downward or minimized upward using the double arrows (in FIG. 15 they are all minimized).

The toolbox module is searchable, with the user able to begin typing and the system suggesting through a list populated just below the search box components which begin with the letters (or include the letters) typed by the user. The dropdown to the right of the search box may be used to allow the user to search from among all components (or a subset such as one or more specific component libraries as previously discussed, with ThreatModeler being an example component library) and/or one or more specific component types as stored in the database (and previously discussed with respect to FIG. 6). The user may also scroll down through the components using the scrollbar function.

Figure 10:
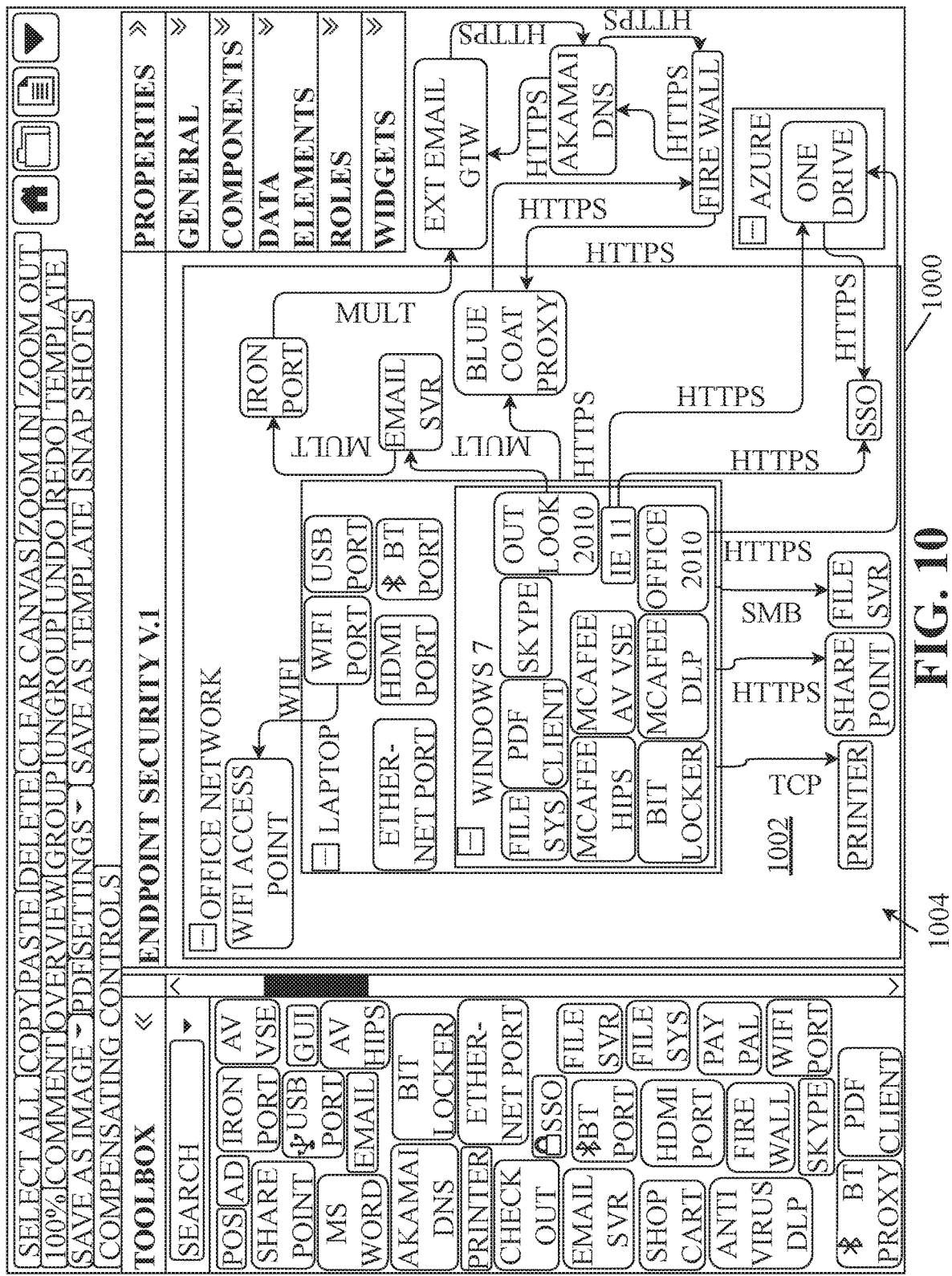
FIG. 10 is an implementation of an interface of the system of FIG. 1.

In the example of FIG. 10 the components in the toolbox are of varying sizes, but in implementations they may all be of similar sizes and shapes (or identical sizes and shapes). In implementations in which the system is deployed within a single organization with only a local library of components the components listed in the toolbox will be those that have been input by the user or that were previously loaded into the database during software installation. In implementations in which the system includes some remote communication with other libraries the toolbox may display components available from other parties, such as through cloud computing services, e.g., MICROSOFT AZURE or the like (in implementations the entire system and methods could be implemented using cloud computing in instances where a local software installation or local database are not desired).

The toolbox, as can be seen, includes components that were previously entered into the database through interface 600 as previously described. From interface 1000 the user may select a desired component and drag it to a desired location on the canvas, and by dragging multiple items the user may begin to add the components of a system, application or process to be modeled. By non-limiting example, FIG. 10 shows interface 10 with a relational diagram (diagram) 1004 already fully created by the user. As can be seen, the user has dragged multiple components onto the canvas 1002 and has defined various relationships between them. The user dragging components to the canvas is one way in which the user selects relevant components or relevant sources as described with respect to FIG. 2, and it is from these relevant components (relevant sources) that the system identifies relevant threats by identifying the threats that are associated through the database with those components.

In implementations a communication protocol (protocol) can be defined between components by clicking on a component and dragging the cursor to a second component. This will create an arrow, such as those shown on FIG. 10 between components on the canvas, and will display a default protocol (here the default protocol is HTTPS), but a user may right click the arrow to display a popup selector allowing the user to deselect HTTPS and/or select one or more other protocols (such as TCP, SMB, WiFi, 3G, 4G, AJAX, binary, BLUETOOTH, FTP, FTPS, HTTP, IMAP, MAPIRPC, SMTP, SMTPS, USB, etc.), and when any protocol is selected that protocol name will be displayed (or if multiple are selected then "multiple" or some term/icon meaning "multiple" will be displayed—in the image this is shown as "MULT" for short)—these protocol arrows will also be color coded by type (such as green for HTTPS, red for multiple, and so forth). Protocol arrows may also be deleted as desired. The alphanumeric descriptions are shown here next to the link arrows, but in implementations the wording may be superimposed over the link arrows. They are shown here next to the arrows for easier readability.

The components displayed in the toolbox of FIG. 10 are generally shown without icons. The USB Port, SSO (single sign on), BLUETOOTH PORT, and BLUETOOTH PROXY components are shown with icons as an example that all components may be shown in the toolbox with an icon if desired. It may also be seen that the user may input components that constitute branded software elements, such as PAY PAL, AKAMAI DNS, SKYPE, etc. In implementations all compensating controls will be displayed in the toolbox with a similar icon, such as the padlock icon shown for the SSO component of FIG. 10.

As a user adds components and links them together, the threat model includes the threats that are associated with the components/protocols. As previously described, each component, each protocol, and each data element may be directly associated with one or more threats through the database. Accordingly, each time a component is added to the diagram, or a new link is drawn between components and a protocol is selected, if there are any threats associated through the database with the component and/or protocol those threats are then included in the threat model. A user may at any time right click on a blank area of the canvas when no component/link is selected and a "threat report" item will be selectable which, when clicked, will generate a popup threat report which will include a list of all threats. In implementations this will look much like the threat report 1302 shown in FIG. 13, and will include a first "threats" tab list of all threats (and the number of threats), identifying the risk level of each threat, showing the threat status (open/mitigated), identifying the source of the threat (which is a component on the diagram), and having an actions column from which the user may display a description of the threat (previously associated with the threat through the database) (the description selector here shown with the letter "D" though the selector could instead show "description" or the like) and leave a comment to store to the database (the comment selector having the phrase "note" though in other implementations it could say "notes" or "comment" or the like). The user may organize the table by any column (alphabetically or reverse) and may also organize by column headers by dragging the column headers to the location indicated. For example, the user could drag the "status" header to the identified location and then drag the "risk" header to the right of it and the table would then be organized first by status and then by risk level. When this "dragging" is done a "ghost header" is dragged up to the identified location in the sense that the existing header remains in place. The organization may be reverted to an earlier state by deleting the ghost headers using an "x" icon.

The threat report displayed also includes a security requirement tab (showing number of security requirements) and displaying a table similar to the threats table. The security requirements table lists the security requirements that are associated with one or more of the identified threats in one column, lists a source in another column (which is the component associated with the threat), includes an "implemented" column indicating whether the security requirement has been implemented, an "optional" column indicating whether the security requirement is optional, and an "actions" column similar to the previously described actions column, this time the description giving a description of the security requirement and allowing the user to record a written note. This table may be organized similar to the previously described table.

With respect to the "implemented" column, in implementations this is a checkbox for each security requirement indicating whether the security requirement has been implemented. The user may manually check those security requirements that have been implemented and manually uncheck those that have not. This column may also have been previously populated with some "implemented" checkmarks based on mitigations that the user has selected for specific compensating controls, which will be discussed later with respect to FIG. 11. Further, the "optional" column may also include checkboxes which a user may manually toggle to indicate which security requirements are optional or not. This column also may be populated by the user selecting certain mitigations as will later be discussed with respect to FIG. 11—for example if there are two security requirements associated through the database with a specific threat, but only one needs to be implemented, then if the user selects one of those security measures as mitigating the threat the other security measure may populate on this list as being checked "optional."

The threat report further includes a "test cases" tab (showing the number of test cases) and displays a table listing test cases associated with the threats through the database. As previously described with respect to FIG. 8, each threat may have test cases associated with it. An example test case would be, for example, a "dictionary-based password attack" for a password-related threat. The test case tab would list this test case and have an "actions" column which, when an icon is selected, pops up a description, which in this case states "use a password cracking tool that will leverage the dictionary to feed passwords to the system and see if they work" and further lists techniques like setting the test to try all words in the dictionary, common misspellings, and combinations of words and common misspellings of combinations. The test case tab/table thus offers tests that the user may try to test against the threats both before and after security requirements are implemented. This table may be organized and sorted similar to the previously described tables.

The threat report further includes a "code reviews" tab (showing the number of code reviews) and displays a table listing the code reviews that are associated with the security requirements through the database (as previously shown with respect to FIG. 9). An example code review would be, for example, an "Authentication: Weak Password" code review. The code review table would list this code review and have an "actions" column which, when an icon is selected, pops up a description, which in this case states "Password strength should be enforced upon a user setting/selecting one's password" and gives examples of code that may be used to set up such an enforcement. The code review tab thus offers sample code that the user may use to implement measures against threats which may complement or work together with implemented security requirements. This table may be organized and sorted similar to the previously described tables.

Multiple selectors are shown at the top of interface 1000 in addition to the permanent selectors that are available on several interfaces. The "select all" selector selects all components on the canvas (the user may then deselect some, if desired, for example for grouping some or all the components as later described). The "copy" selector copies selected components and the "paste" selector pastes the copy onto the canvas (this may also be done with keyboard shortcuts, and shortcuts may in implementations be used for all other selectors described herein for system 100). The "delete" selector deletes the selected components from the canvas and the "clear canvas" selector deletes all components from the canvas. The "zoom in" and "zoom out" and "100%" zoom in and out of the canvas and revert to a 100% zoom, respectively. The "comment" selector populates an empty comment box on the canvas in which the user may type a comment which will remain on the canvas until later removed (though it may appear in minimized or icon format until hovered over or opened). The "overview" selector displays a thumbnail overview of the entire diagram in a corner of the canvas.

The "undo" selector undoes the last action (or multiple last actions if selected multiple times) and the "redo" selector does the opposite. The leftmost "templates" selector pops up a menu from which one or more previously saved business requirement "features" may be selected to add to the canvas (these may be nodes and/or component groups, for example, and may be the same nodes/component groups that are described above when the user uses the "new from features" function when generating a new model). The "save as image" selector has a dropdown and allows the user to save an image of the diagram as then displayed in one of various formats such as PNG, SVG, etc., or to take a "snapshot" which saves the diagram at the present state to the database. The "PDF" selector generates a PDF of the threat report based on the current configuration of the diagram components (the threat report described to some extent above). The "settings" dropdown selector allows the user to toggle between straight or curved link lines (protocol lines/arrows), showing or hiding the link wording (in FIG. 10 the lines are curved and the link wording is shown), making the diagram public or non-public, and showing or hiding comments (the comment function described above).

The "save as template" selector allows a user to save the entire diagram as either a threat model or a business requirement "feature" (in other words saving it as a component group) and in either case the user may give the feature a name, add labels, and select the type as either threat model or business requirement, then press cancel to cancel or save to store the new template to the database. The "snapshots" selector populates a list of previously saved snapshots, any one of which may be opened from the list or deleted.

The "group" and "ungroup" selectors allow the user to create a group containing multiple components or to delete a group (but not the included components). As seen in FIG. 10 for example, there is a "WINDOWS 7" group which includes file system, PDF client, SKYPE, OUTLOOK 2010, MCAFEE HIPS, MCAFEE AV VSE, IE11, BIT LOCKER, MCAFEE DLP, and OFFICE 2010 components. There is also a Laptop group containing the WINDOWS 7 group and further containing WiFi port, USB port, ethernet port, HDMI port, and BLUETOOTH port components. Finally, there is an Office Network group which includes the Laptop group and also includes file server, SHAREPOINT, printer, WiFi access point, IRONPORT, email server, BLUECOAT proxy, and SSO (single sign on) components. Then there are other components (external email gateway, AKAMAI DNS) which are not part of any group. A group may be formed from any one or more components, and the AZURE group is seen containing only a single component: ONEDRIVE.

When a group is formed the user may, using the right-side "general" dropdown, add a custom display name, select a container type (from container, trust boundary, collection, or some other option stored in the database previously by the user), select a component (for example for the WINDOWS 7 component "WINDOWS machine" is selected, which shows that some components stored in the database may include other components), select other display choices such as title and background/border color, and select a Common Platform Enumeration (CPE) identification from among a list previously stored in the database (for example in this case a CPE ID indicating a version of WINDOWS 7 is selected) (the list of CPE IDs may be searched using filters to easily find the appropriate one), and the user may also add notes.

As further examples, the WINDOWS 7 group is identified as a container group, a WINDOWS machine, and a specific WINDOWS 7 operating system version is identified. The Laptop group shown in FIG. 10 is listed as a container group and no CPE ID is selected. The Office Network group is identified as a trust boundary group type and no CPE ID is selectable. The AZURE group is identified as a trust boundary group type and no CPE ID is selectable.

Each grouping of components, however, could be diagrammed separately as an independent threat model and then saved as a component so that it may be imported into another threat model/diagram. When a user adds any of these component groups to a blank or existing diagram/threat model the threat model of the component group is added to (and/or nested within) the threat model of the existing diagram/threat model. In this way the user can modify a threat model by incorporating previously defined threat models. This ability is generally termed "threat model chaining" herein and is a useful mechanism for allowing a user to diagram complex systems/processes without having to repeatedly build common elements among the systems/processes.

Each component group may thus be redefined as a discrete "component" and may then be included as a single icon in the toolbox menu. By non-limiting example, referring to FIG. 10, the WINDOWS 7 component group could be defined as a component, then the user could, in another diagram (or the same diagram), select and add a WINDOWS 7 component to the diagram to import into the diagram and associated threat model the threats associated with the WINDOWS 7 threat model. The same could be done for the LAPTOP component group. Accordingly, a component group and associated threats added to a diagram may in turn already include other nested/chained threat models therein, so for example if a user defined a laptop component group such as that in FIG. 10 as a "WINDOWS LAPTOP" component then, when a user later adds a WINDOWS LAPTOP element to a diagram/threat model by selecting a WINDOWS LAPTOP component from the toolbox and dragging it onto the diagram, the threats associated with the laptop itself, as well as the nested/chained threats associated with the included WINDOWS 7 threat model, are automatically included in the threat model for the then displayed diagram.

Referring back to FIG. 10, the "compensating controls" selector may be selected to display a popup similar to compensating control report (report) 1200 of FIG. 12. This report is populated from previous relations stored in the relational database. As indicated previously with respect to FIG. 6, each component may be associated with one or more threats and one or more security requirements through the database using interface 600, and as described with respect to FIG. 8 each threat may be associated with one or more security requirements through the database. As further indicated with respect to FIG. 9, each security requirement may be identified through the database as a compensating control. Accordingly, based on these relationships and selections the list populated in FIG. 12 shows all possible compensating controls that could be implemented to mitigate threats that are present in the diagrammed system, application or process.

By non-limiting example, the threat of "physical theft" is associated with the component "laptop" through the database, but no security requirements are directly associated with the laptop component. Nevertheless, the "physical theft" threat is associated with the security requirements "MCAFEE FRP" and "BITLOCKER" through the database, both of which security requirements are identified through the database as compensating controls (MCAFEE FRP being a USB encryption tool and BITLOCKER being a disk encryption tool). Accordingly, when a user adds the laptop component to a diagram, if the user selects the "compensating controls" selector this list will then include both MCAFEE FRP and BITLOCKER as compensating controls for the physical theft threat. If the user removes the laptop component from the diagram (deletes it) then the MCAFEE FRP and BITLOCKER compensating controls will no longer appear in the list (unless they are also associated as compensating controls for some other threat present in the diagram). In implementations the list populated will also show compensating controls which are directly associated with a component that is added to the diagram. In other words, in the above example there are no security requirements directly associated with the laptop component, but if a third security requirement were directly associated with the component through interface 600, and if the third security requirement was identified through the database as a compensating control, then that third compensating control would also populate in the list of interface 1200.

Referring again to FIG. 10, it may be seen that this diagram includes the MCAFEE DLP, BITLOCKER, MCAFEE HIPS, and MCAFEE AV VSE components grouped in the WINDOWS 7 group. The user may, for example have modeled the WINDOWS 7 group, then used the compensating controls selector at the top of interface 1000 to identify that there are certain threats that these components would mitigate. The user may then add those components to the WINDOWS 7 group by dragging them from the toolbox to a location within the group outline to add them to that group. Then, upon right clicking on any specific security requirement component, the user may select a "mitigations" selector which pops up mitigations interface (interface) 1100 as shown in FIG. 11. The user could add one of these components at a time and model the mitigations, generate a new threat report, then either remove that component or add another compensating control, and in this way test out various compensating controls. This is one way in which the system facilitates steps 512, 514, 516, 518, 520, and 522, among other steps, of FIG. 5.

Interface 1100 displays a table which lists all threats and their associated sources (component associated with the threat), risk levels, and status, and highlights the listed threats which the security requirement is configured to mitigate as identified previously through the database through interface 800 (these threats are "mitigatable" by the selected security requirement). The user may deselect highlighted threats and/or may highlight other threats, then may select "close" to cancel or may select "mitigate" to toggle those threats to mitigated through the database. Once this is done, for example, the threat report as seen in FIG. 13 (or popup shown from the diagram interface) will list the mitigated threats as "mitigated" and the compensating controls list shown in FIG. 12 will also show the mitigated threats as mitigated.

The threat report of FIG. 13 allows a user to manually change the risk level and threat status directly from the home menu using the "change risk" and "change threat status" dropdowns once a threat is selected by clicking on any row. Changing the risk level of a threat from this interface will only change the risk level for this specific threat model. Threat statuses that may be used include, by non-limiting examples: open, closed, mitigated, fixed, not applicable, needs more details, not tested, secure usage practice, and so forth.

The systems & methods described herein may also be used for analyzing an attack surface of a complex system or process, which will be described now. In implementations the attack surface of a system or process is comprised of the sum of all open and unmitigated potential threats to an "asset" identified through threat modeling.

As described herein, a modeled system or process may include a modeled deployed or contemplated computing network or environment, which could include by non-limiting example: one or more applications; one or more on-premises infrastructures; one or more cloud-based infrastructures; one or more hybrid infrastructures; serverless architectures; microservices; one or more embedded devices; one or more IoT devices; one or more mobile devices; one or more Industrial Control Systems (ICS); one or more cyber-physical systems (CPS); one or more third party systems; one or more organizational networks or intranets; non-cyber elements interacting with a cyber system such as, by non-limiting example tangible assets, intangible assets, property(ies), plant(s), equipment, liquid assets, brands, reputation, residential structures, real property, utility services, unattached removable items and assets; an infrastructure system, such as a transportation infrastructure, an electrical grid, a telecommunications network, and so forth, all in implementations accessible and utilized through a highly interconnected network of intranets, wireless networks, and the Internet.

All such components of a modeled process or system may include potential threats which, if discovered and exploited by an adversary, may yield one or more attack vectors to one or more assets of the system or process. The "asset" may be any item selected by a user to be identified as an asset. The modeled "attackers" included in any threat model may be actually modeled as a person in implementations, though in other implementations may be simply modeled as an entry point or device included in the process or system which an attacking person may use to cause harm.

It may be pointed out that increased interconnectivity of a computing system with other systems (such as the Internet, third party systems, end user systems, etc.) may increase economic value and efficiency though these may also increase organizational risk due to the increase in adversarial actors and a constantly evolving threat landscape. The threat modeling chaining and attack simulation systems and methods described herein allow organizations to manage threats at a comprehensive organizational level notwithstanding an ever-changing threat landscape.

A modeled "attack" as used herein is a modeled attempt by an adversarial entity to traverse the modeled system or process from an attack surface to one or more assets within the system or process. The routes from all potential attackers to a selected asset are the "attack vectors" or attack paths to that asset.

Figure 14:
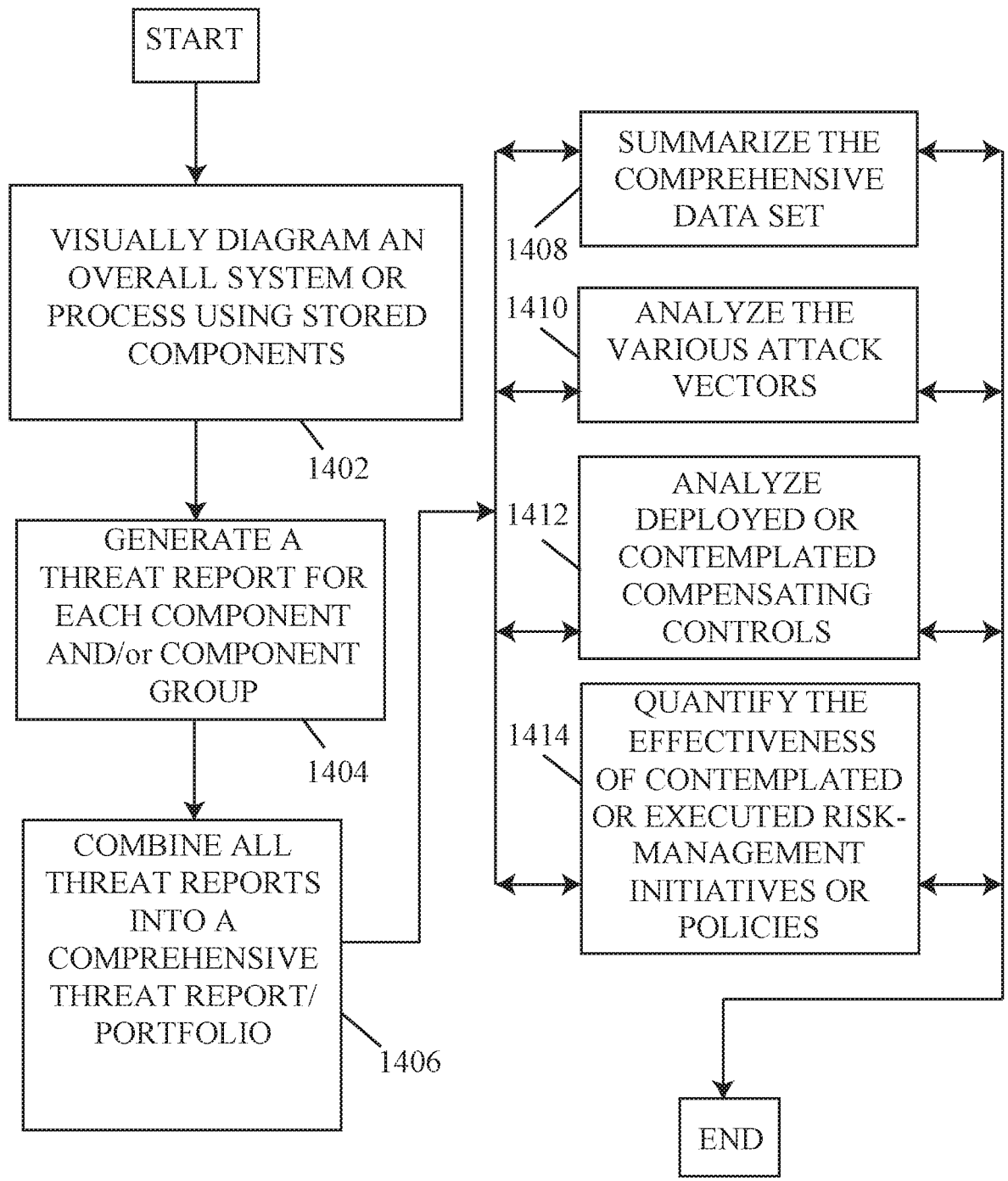
FIG. 14 is a block diagram representatively illustrating an implementation of an attack simulation method.

Referring now to FIG. 14, a block flow diagram illustrates steps that may be included in a general attack surface analysis. Step 1402 includes user generation of a diagram of a system or process, as has been described previously with respect to FIG. 10. Step 1404 includes system generation of a threat report for each component or component group and step 1406 includes system combination of the individual threat reports into a comprehensive threat report for the overall diagrammed system/process (this would include, for example, including threat report elements for nested or chained threat models, as has been explained above), and then steps 1408-1414 include steps which may occur in any order. In step 1408, once a user has selected an asset to analyze, the system summarizes data to show all attack vectors associated with threats which may compromise that asset. At step 1410 the user analyzes the various attack vectors to determine what compensating controls may be included to protect the asset. At step 1412 the user adds or removes compensating controls to/from the diagram and/or toggles compensating controls between ON/OFF states. At step 1414 the user determines the effectiveness of the compensating controls or other risk management methods (such as changing communication protocols, changing the relative location of the asset within the modeled environment, adding non-compensating control elements between the asset and attack locations, and so forth).

Figure 16:
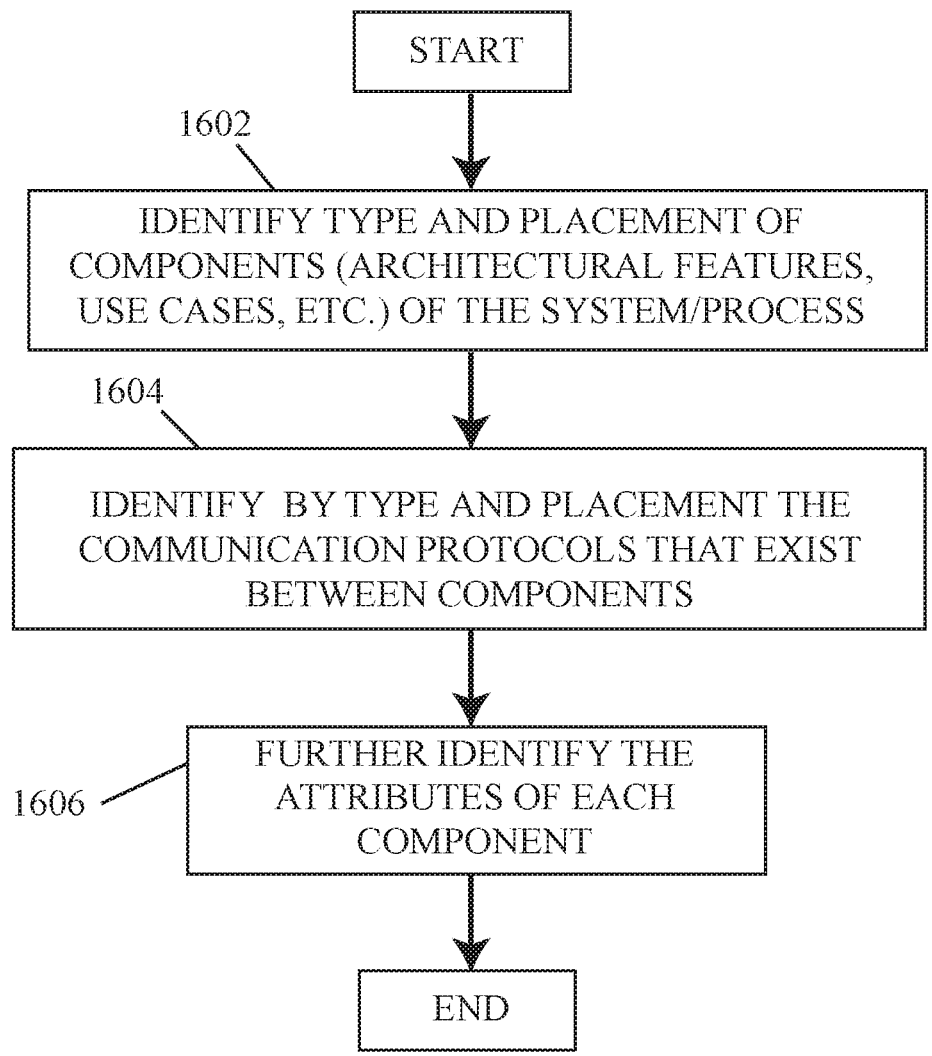
FIG. 16 is a flowchart representatively illustrating an implementation of a threat modeling method.

FIG. 16 further breaks down step 1402. At step 1602 the user identifies the components of the system or process and chooses their relative placement within the diagram, at step 1604 the user identifies the type and placement of any communication protocols between components, and at step 1606 any other attributes of components (including protocols) may be further designated (this step may be excluded in some methods, and these steps may be done in any order in implementations).

Figure 17:
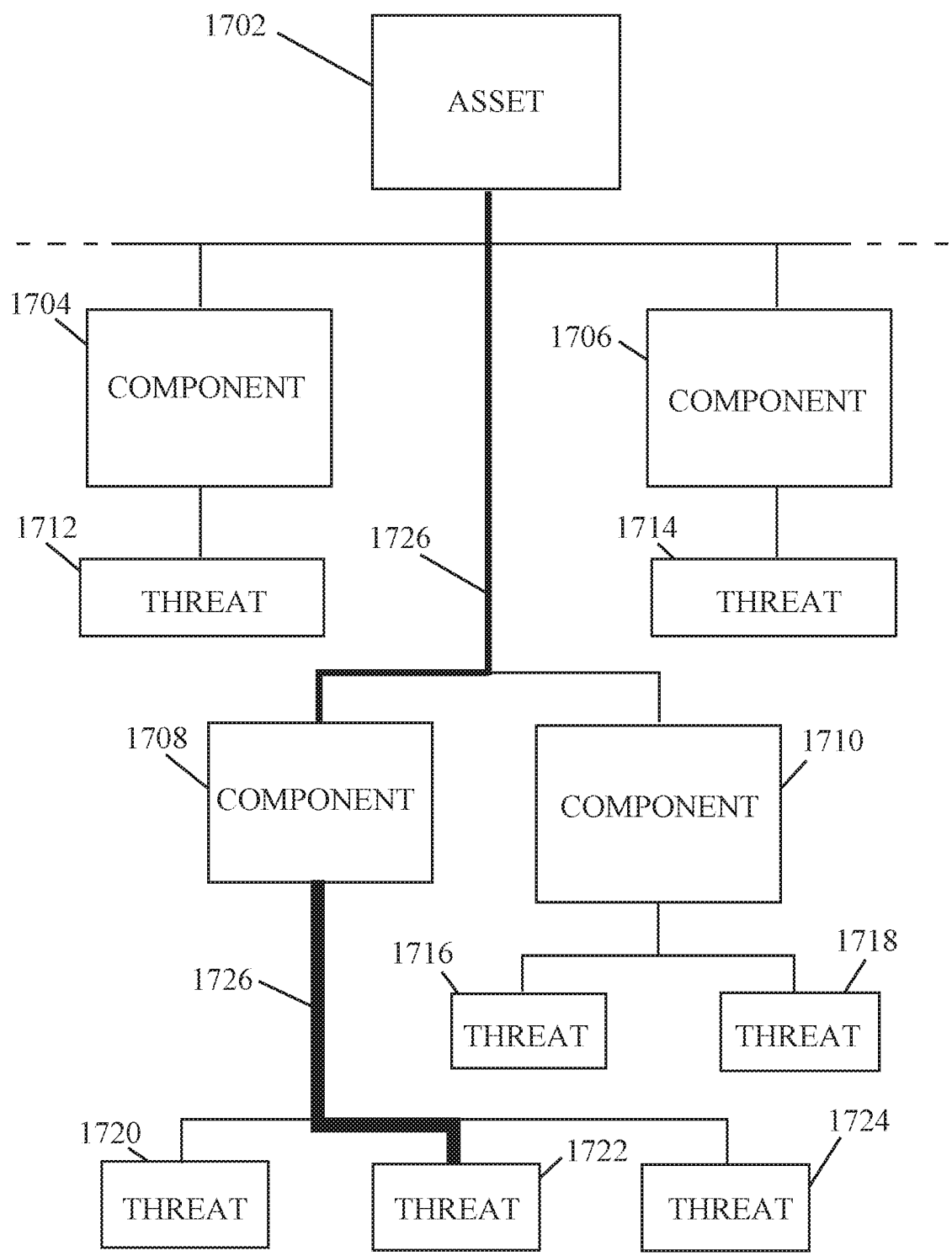
FIG. 17 is an attack tree diagram representatively illustrating an attack path of a threat of a threat model.

FIG. 17 shows a tree diagram that representatively illustrates a method of determining an attack vector for a selected asset. After a system or process is modeled using the diagram interface, described above, then in the diagram interface or in another interface either an asset is selected or an associated component is selected and relevant threat attack paths illustrated. For example, in the topmost node of FIG. 17 an asset 1702 is shown, and the attack tree or threat tree shows that the asset is associated through the database with four components. Components 1704, 1706, 1708, and 1710 are each associated with threats (i.e., the threats that are associated with each component through the database). Accordingly, threats 1712, 1714, 1716, 1718, 1720, 1722, and 1724 are shown. It may be seen that the system then determines that threat 1722, through component 1708, is a threat to asset 1702, and thus attack vector 1726 (shown by lines of heavier weight) is shown between threat 1722 to asset 1702. The diagram of FIG. 17 may be shown on an interface of the system, though in implementations FIG. 17 simply models the method the system is utilizing behind the scenes to show the attack vector(s) in the diagram interface, as in some implementations (such as those shown in the drawings) the threats are not explicitly shown on the diagram interface(s). FIG. 17 shows an attack vector by which an adversarial entity may target the asset, i.e., by exploiting threat 1722 of component 1708. It should be noted that the asset may be a sub-component within a diagrammed component, or it may be an element that is somehow associated with the component (for example the component may be a database, and sensitive client information may be stored within the database—in that instance the asset could be defined broadly as the database, or it could be defined narrowly as the sensitive information within the database, other information in the database not being included in the definition).

It is noted that each asset could have any number of threats that could threaten to compromise it. Accordingly, the system identifies all threats which may compromise the asset in order to visually diagram attack vectors for the user. Some assets may be threatened by only a single threat, some may be threatened by two or three threats, or more, and so forth. Along these same lines, it is pointed out (as has been discussed to some extent above) that each individual component (or grouped set of components) of a threat model could, itself, be associated with its own threat model through the database. Because of this, the overall threat model that is shown (for instance in FIG. 13) in implementations could be called a threat model portfolio as it includes all sub-threat models and nested threat models. For example, an overall threat model A could include components B, C, and D. Component B could be a single component, component C could be a previously modeled group of components having its own threat model, and component D could be a previously modeled group of components having its own threat model that also includes therein a nested threat model for a component group E. Accordingly, the threat model A would include all threat models associated with components and component groups B, C, D, and E, including all nested threat models. As described above, this "threat model chaining" may allow for quick and simple building of process/system models without having to recreate commonly included system/process elements.

In implementations one or more interfaces of system 100 may be utilized to list the top potential threats (such as the top ten potential threats), the top most vulnerable components, the composition of threats by risk type, the composition of threats by status (mitigated, unmitigated, open, etc.), and so forth. The data may of course be organized and displayed in many other ways. In implementations an interface could list each threat, list each threat risk level, and list the source(s) for each threat. In implementations each threat source listing may include a component and an underlying source, so for example one component may be associated with multiple sources of a threat. An example would be an online banking interface which is shown on a diagrammed threat model as a component, and a threat may be a virus being introduced to the bank's environment through a breach in the banking interface, and one source of the threat may be a legitimate user who unwarily exposes the ATM to a virus on his/her computer, and another source of the threat may be an individual hacker seeking to introduce the virus to the banking environment, and another source of the threat may be a state-sponsored entity with high-end mechanisms to seek to introduce the virus to the banking environment.

In implementations an interface of the system may list the most vulnerable components in ascending/descending order, along with the risk level for each listed component, the number of total threats to that component, and the number of open or unmitigated threats for that component. In implementations an interface of the system may list multiple data elements associated with components (for example user names, social security numbers, financial info, credit card numbers, employee ages, etc.) (in this case the component likely being a database housing the data), a data classification for each data element (such as confidential, restricted, public, etc.) and an exposure level for each data element (such as very high, high, low, etc.). In implementations an interface of the system may break down the risk levels by percentage, such as 45% very high risks, 25% high risks, 15% medium risks, and so forth. In implementations an interface of the system may break down risk status by percentage, such as 45% open threats, 25% closed threats, 30% mitigated threats, etc. In implementations an interface of the system may visually illustrate the number of threat introductions plotted versus time, such as the number of threat introductions by month.

Any of the interfaces discussed herein may, as would be expected, change (and in implementations may change dynamically) as edits are made to the diagram (for example when a compensating control is toggled between ON/OFF states, this may change many or all of the interface displays accordingly by varying percentages, mitigating threats, etc. Thus when a compensating control is introduced and/or turned on or off, the threat model, threat report, mitigations interface, compensating control report, and so forth may all change accordingly to reflect the updated configuration.

It is pointed out that any threat model of the system may be subjected to an attack vector analysis. So, for example, an attack vector analysis may be performed on a simple two-component diagram, or an attack vector analysis may be performed on a hundred-component diagram that includes the two-component diagram as a nested sub-threat model.

In implementations an interface of the system may show a display similar to FIG. 17 except mapping all components/assets vulnerable from a single threat. In other implementations an interface of the system may show a display of all threats affecting a single component or asset. In the latter case the visual display may show attack vectors branching outwards from the asset, tracing communication protocols and extending through multiple components as far back as the locations/sources of the underlying threats. This is representatively illustrated in FIG. 18, which shows a type of display that may be shown on an interface of the system.

Figure 18:
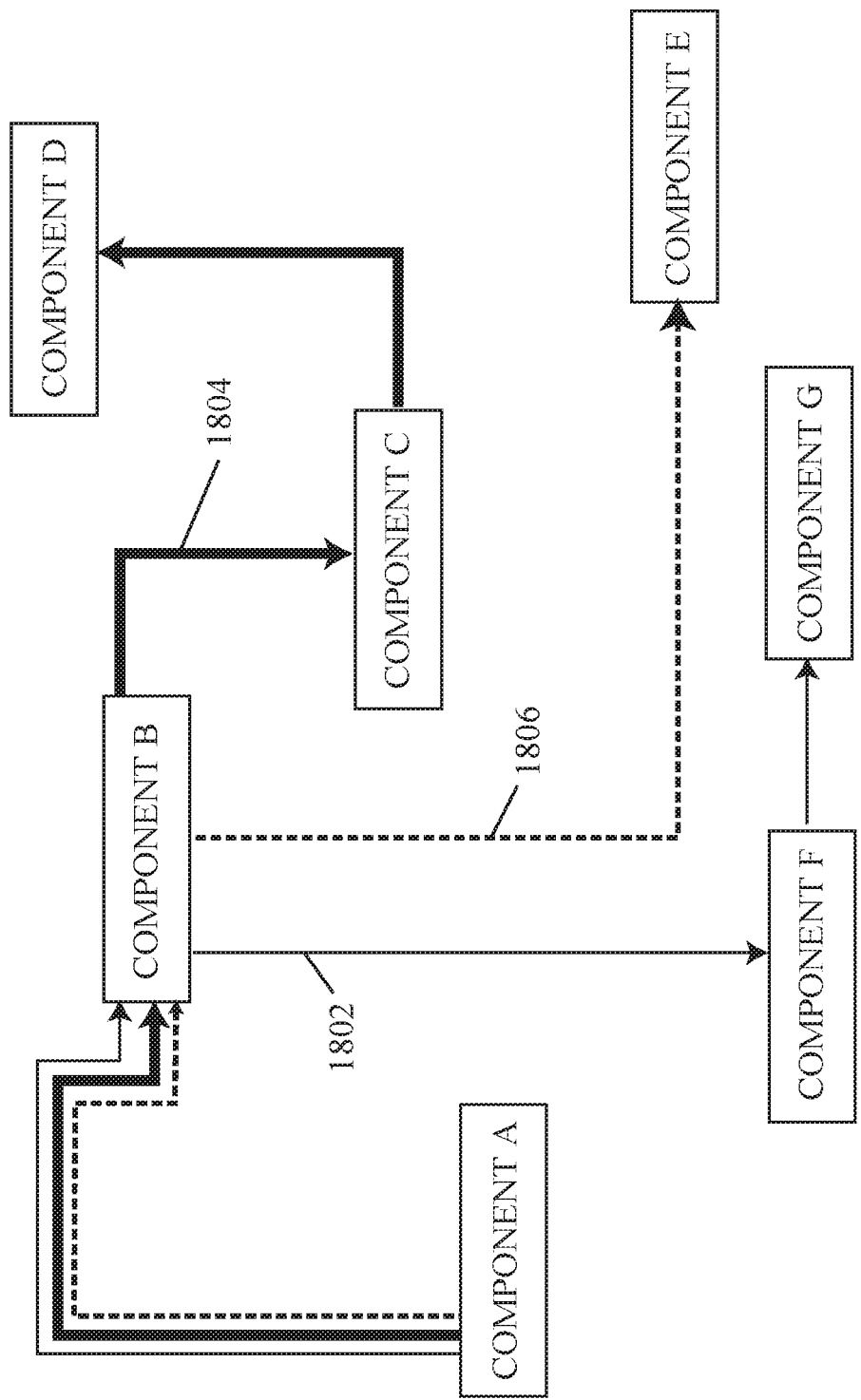
FIG. 18 is a block diagram representatively illustrating attack paths of multiple threats of a threat model.

FIG. 18 shows components A-G. Component A has been selected as an asset, and the attack vectors of all threats threatening the asset (component A) are diagrammed using arrows. The arrows in FIG. 18 are shown in different formats so that they can be distinguished from one another. In other implementations they may all have the same appearance. The arrows are also shown pointing away from the asset, but in other implementations this may be reversed so that arrows point towards the asset from the underlying threats. It may be seen that a threat emanating from component G threatens to compromise component A (or the asset within or associated with component A), the attack vector 1802 passing through component F and component B to reach component A. A threat emanating from component E also threatens to compromise component A, the attack vector 1806 passing through component B to reach component A. A threat emanating from component D also threatens to compromise the asset, the attack vector 1804 passing through component C and component B to reach component A.

Figure 19:
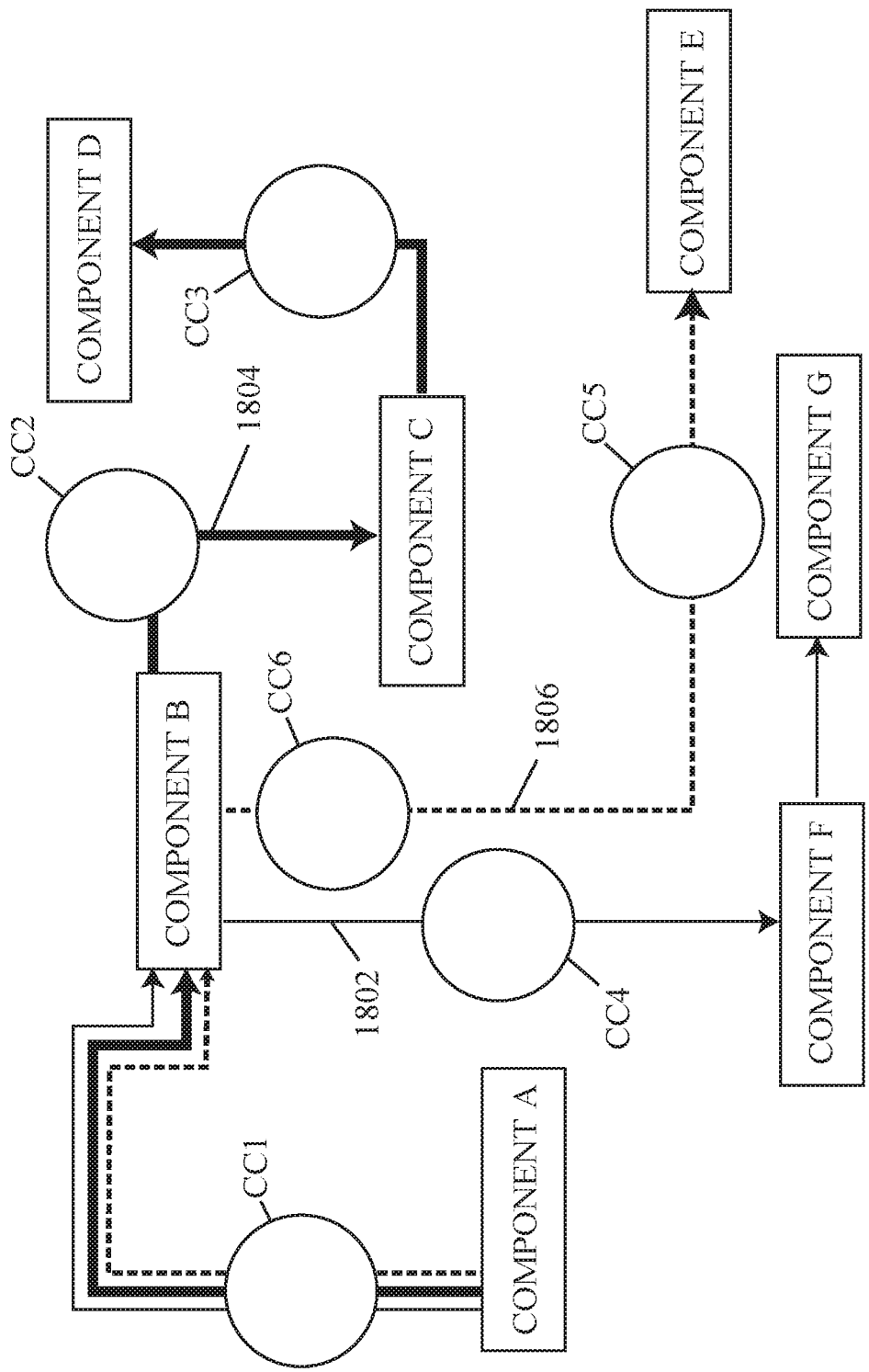
FIG. 19 is the block diagram of FIG. 18 with compensating controls added to the diagram.

The attack vector displays may be modified based on contemplated compensating controls. FIG. 19, for example, shows the diagram of FIG. 18 but modified to include six compensating controls (each labeled "CC"). These compensating controls may mitigate different threats emanating from different components. Compensating control 3 (CC3) may mitigate one or more threats from component D. CC2 may mitigate one or more threats from components C and/or D. CC5 and CC6 may each mitigate one or more threats from component E. CC4 may mitigate one or more threats from components F and/or G. CC1 may mitigate one or more threats from components B, C, D, E, F, and/or G. Using such a modeled attack vector diagram, the user may be able to alter compensating controls and make decisions about where in the system to deploy compensating controls. The user may determine, for example, that CC1 may mitigate many threats more efficiently than several compensating controls deployed elsewhere in the system. Or it may be determined that the asset is better protected by some other combination of compensating controls.

The elimination of any threat of course protects downstream components. Accordingly, for example, if CC3 eliminates or mitigates one threat emanating from component D, then the downstream effects of that threat to components C, B, and A are all mitigated. On the other hand, if CC1 eliminates or mitigates the same threat, it would only eliminate or mitigate the threat for component A, not for components B or C. Accordingly, there are security advantages to having compensating controls further upstream.

Changing the compensating controls in such a diagram could also change the other displays on other interfaces, for example the listing of top threats, listing of top ten most vulnerable components, other top ten listings, composition of threats by risk, composition of threats by status, composition of threats by source, composition of threats by other criteria, the overall threat model, the mitigations interface, the compensating control report, and so forth. This dynamic change of all interfaces allows the user to do "what if" analyses by adding/removing any compensating control and/or toggling any compensating control between ON/OFF states and then seeing how all the aforementioned displays/reports etc. change accordingly. The change may, for example, illustrate one or more threats as mitigated or closed instead of open or unmitigated, reduce the total number of open or unmitigated threats, reduce exposure levels of data elements, alter the percentages of threats by risk level (very high, high, medium, low, very low, etc.), alter the percentages of threats by status (open, closed, unmitigated, mitigated), or the reverse of all these, on any of the interfaces or reports of the system.

The term "asset" as it is used herein may refer to anything that has value to a user or organization, and therefore requires security measures to protect it from theft, manipulation, destruction, compromise, or other forms of abuse. Attackers are an active population of computer environment users and vary in the skills, toolsets, opportunities, financial backing, and other attributes required for a successful attack on an asset. Most security measures to protect a computer system-related asset may be categorized into one of two categories: (1) defensive and/or monitoring mechanisms to inhibit attacks in progress or mitigate the effects thereafter, and; (2) reducing the number of potential threats through which attacks may be initiated to begin with. The latter can in many cases be less costly overall, and the ability of the systems and methods described herein to test and retest various configurations, including modeling the use of compensating controls, allows users to focus efforts on this method.

In implementations threat modeling and/or attack simulation methods may include the following steps: (1) generally defining a threat model (including model type, outputs to be generated, and overall objectives for different stakeholders); (2) visually diagramming a system/process using database-stored components (including communication protocols and compensating controls); (3) classifying one or more data elements within a component (or associated with a component), and/or one or more components themselves, as assets; (4) identifying and enumerating potential threats to the assets based on the diagrammed components; (5) analyzing the identified threats (threat analysis); (6) identifying and analyzing potential attackers based on the threat analysis; (7) analyzing the effectiveness of deployed or contemplated compensating controls to mitigate the potential threats; (8) analyzing a threat model and attack surface as modified by compensating controls; and (9) measuring and quantifying the effectiveness of the model and/or method relative to the desired outputs and objectives previously determined. This is just one example of steps included in such methods, and other methods may exclude some of these steps, or include other steps, and so forth. In an implementation of the above steps, step (6) interrupts step (5), and in an alternative implementation step (5) is allowed to be completed without interruption. Furthermore, in implementations steps (7) and (8) may be iteratively bounced between during any given implementation, so that a user adds a compensating control then checks the outcome, toggles the configuration of the compensating control then checks the outcome, removes a compensating control then checks the outcome, moves a compensating control to a new location then checks the outcome, etc., before moving to step (9).

Referring to step (1), different stakeholders may have different threat model output needs, so different model types can be built using system 100 and the methods described herein. For example, software application developers, operations teams, embedded system teams, IoT device teams, cloud deployment and architecture teams, ICS system or cyber-related system teams, and so forth, may create different threat model types. Architects may model threats to a residential structure, structural engineers may model threats to occupants, neighborhood planners may model supporting infrastructures needed for developments, and so forth. Home decorators may model occupant flow and so determine the most secure places for expensive home décor. In non-computing systems/process that are modeled, the protocols may represent things other than communication—for example in the home décor example the protocols may represent methods of moving an occupant between rooms. In implementations a user may select one of many model types to begin with (to populate the proper predefined components with which to diagram the model). This could be selecting, by example, from among examples such as the following: application threat model; operational threat model; cloud threat model; embedded threat model; IoT threat model; cyber-physical system threat model; and so forth. A user may still access all components in the diagram interface by searching for them but selecting the proper model may allow the most relevant components to populate at the top of the list.

Still referring to step (1), a user may in implementations also select role-based threat model outputs (such as with yes/no selectors) such as: secure coding requirements; operational checklists; executive metrics; executive reporting; security metrics; security reporting, and so forth, and these may also affect the position of components within the toolbox list on the diagram interface. In other implementations these selections (and the selections in the above paragraph) may only be used for record-keeping purposes. The input may also include the name of the model, the version, the name of the model creator, the date created, the update person, the update date, comments, desired objectives by development/operations/security/executives/business leaders, and others, and notes or toggle elements to indicate whether those objectives are met, in progress, or in some other state (and any or all of these features may be included on one or more of the already-described interfaces).

Figure 20:
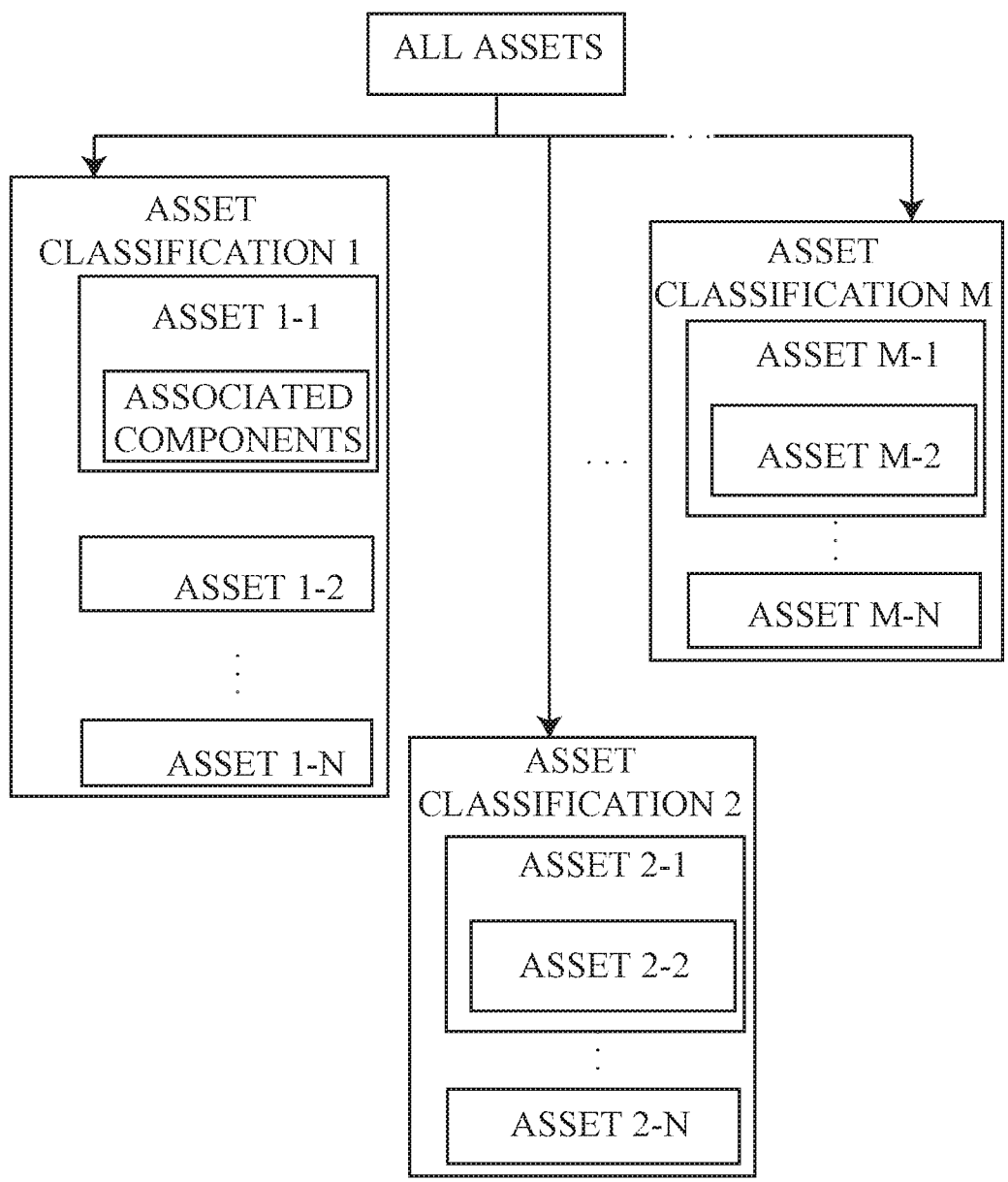
FIG. 20 is a block diagram of an asset classification method of an attack simulation method.

A representative example of the aforementioned step (3) is illustrated in FIG. 20, which may involve the classification of assets which may be associated with, located nearby or relevant to, or utilized by diagrammed components. In implementations the asset classification for each asset includes: an asset class; an asset, and; an associated component. In implementations the asset classification may be used as an input for analyzing potential attackers by providing insight to possible purposes attackers may have in targeting the asset. As an example, in implementations of cybersecurity modeling the assets may be classified as: non-confidential data; confidential consumer data; confidential corporate data; system capabilities (such as electronic funds transfers); non-digital assets (such as infrastructure or IT-system controlled equipment), and so forth. In a residential security model the classification could be: lightweight valuables; heavy valuables; personal information; life and health of occupants; residential structure/utilities; home security (entry keys/codes), etc.

Step (5) has already been described to some extent previously with respect to FIG. 17 with the creation of an attack tree (a partial attack tree is shown in FIG. 17—a full attack tree would include all assets as topmost nodes, and in implementations the attack tree may be similar or identical to the "threat tree" shown in FIG. 14 of the '021 Application). Referring to FIG. 17, the attack vector connects the asset with the component from which the threat emanates, and this association was determined by the previous classification step. In implementations the attack/threat tree may be simplified by only showing one topmost node (one asset) and only its associated components and threats. In implementations the attack tree only shows three levels—the topmost level being the assets, the middle level being components, and the bottom level being threats. This model can be simplified further to have only two levels—the topmost level includes asset/component pairings, and the bottom level shows the threats. In this simplified model the attack tree may show the asset identified as being nested within a component or otherwise attached or coupled with it (in implementations the topmost level would then show, for example, component 1 including asset 1 in level 1, component 2 including asset 1 in level 1, component 3 including asset 1 in level 1, etc., with level two (the bottom level) showing the threats coupled with the components). As a representative example, the asset could be jewelry, the components could be a front door, a back door, and a window, and a threat to the front door could be a bump-key, and since an attacker may use a bump-key to enter the front door, the bump-key is a threat to the asset.

Step (5) includes a second part, which is analyzing the identified threats. In implementations this involves various stages. One stage includes creating a profile for each threat. This may include utilizing real-world threat intelligence to provide attributes to said threats, and the attributes may include defined technical means to exploit the threat. A numerical value may be assigned to this means attribute (a high value indicating a higher level of technical means required to exploit the threat). This means attribute may also include the requisite skill, toolset, social network, financial backing, etc. the attacking entity would need to utilize the threat and traverse the corresponding attack vector. As examples, the technical means for the aforementioned bump-key against the front door is relatively low, whereas the technical means to alternatively burrow through the home's foundation to bypass other security controls is relatively high.

Another threat attribute is the access required to carry out the attack. A number is assigned to the access attribute, with a high number indicating a higher required level of access. A low access attribute may for example be attached to a lower level employee's alphanumeric password (which may be known by an immediate supervisor), while a high access attribute may be attached to biometric signatures for key personnel (which may require high access levels such as a privileged system administrator).

Another threat attribute is a defensive distance, or number of security controls and their effectiveness, between a threat and the asset. A high numerical value indicates a greater number of effective security measures in between. Another threat attribute is the potential impact if the threat is realized—a high value indicates a high technological or business impact in the event the threat is realized.

The second stage involves analyzing the attacker population. Two methods are disclosed herein. In one method (the preferred method), potential attackers are analyzed based on the identified threats and identified associated assets. The other method allows users to adopt existing threat intelligence about known attackers who have utilized existing threats (for example data of a 30% chance of a home invasion in any given year compared with a 1 in 20 million chance of a terrorist attack at the home). In the preferred method objective attributes and characteristics of attackers are provided even where such intelligence is not known.

The third stage involves determining a likelihood of a threat being realized. When the above preferred method is utilized this includes three sub steps of determining a subset of the attacker population with the sufficient means, sufficient motivation, and sufficient opportunity to exploit the threat, to determine the probability of an attacker subset coming from the attacker population (this discards attackers who would be unable to exploit the threat for whatever reason) (if the other method is used the statistically-provided probability is used). A determination is then made of whether the asset is attractive to the attacker, if not the likelihood of threat exploit is set to a minimum value, but if it is attractive the likelihood of threat exploit is the product of an attacker coming from the attacker population and the level of attraction. The next step calculates the product of the impact should the identified threats be realized and the likelihood of the threats being realized for each threat. Each threat is then prioritized according to some scheme (e.g., critical, high, moderate, etc.).

Step (6) involves analyzing attackers using means, motive, and opportunity (as identified above, in the preferred embodiment this occurs partway through step (5)—but if real world intelligence is used this step is obviated and skipped). If the attacker lacks either sufficient means, or sufficient motivation, or sufficient opportunity to conduct an attack, the attacker is disregarded, whereas if the attacker has all three the attacker is included in the organizational attacker population. These determinations could be done, for example, by any known or discovered method to assign a meaningful and relevant value to each category, and if the value of the attacker's technical means value meets or exceeds the above set technical means value (and similarly for a motivation value compared with the above identified access level value and an opportunity value compared with the above identified defensive distance value) then the attacker is included in the organizational attacker population, otherwise not.

Step (7) has previously been described with respect to FIG. 5.

Step (8) includes reviewing the threat report after all of the above steps have been done. Step (9) involves comparing the outputs obtained from the threat model and process relative to the desired outputs and desired objectives indicated in step (1). In implementations steps (1) and (9) may be done through system interfaces. In other implementations they may simply be done manually. In still other implementations they may both be excluded.

Figure 21:
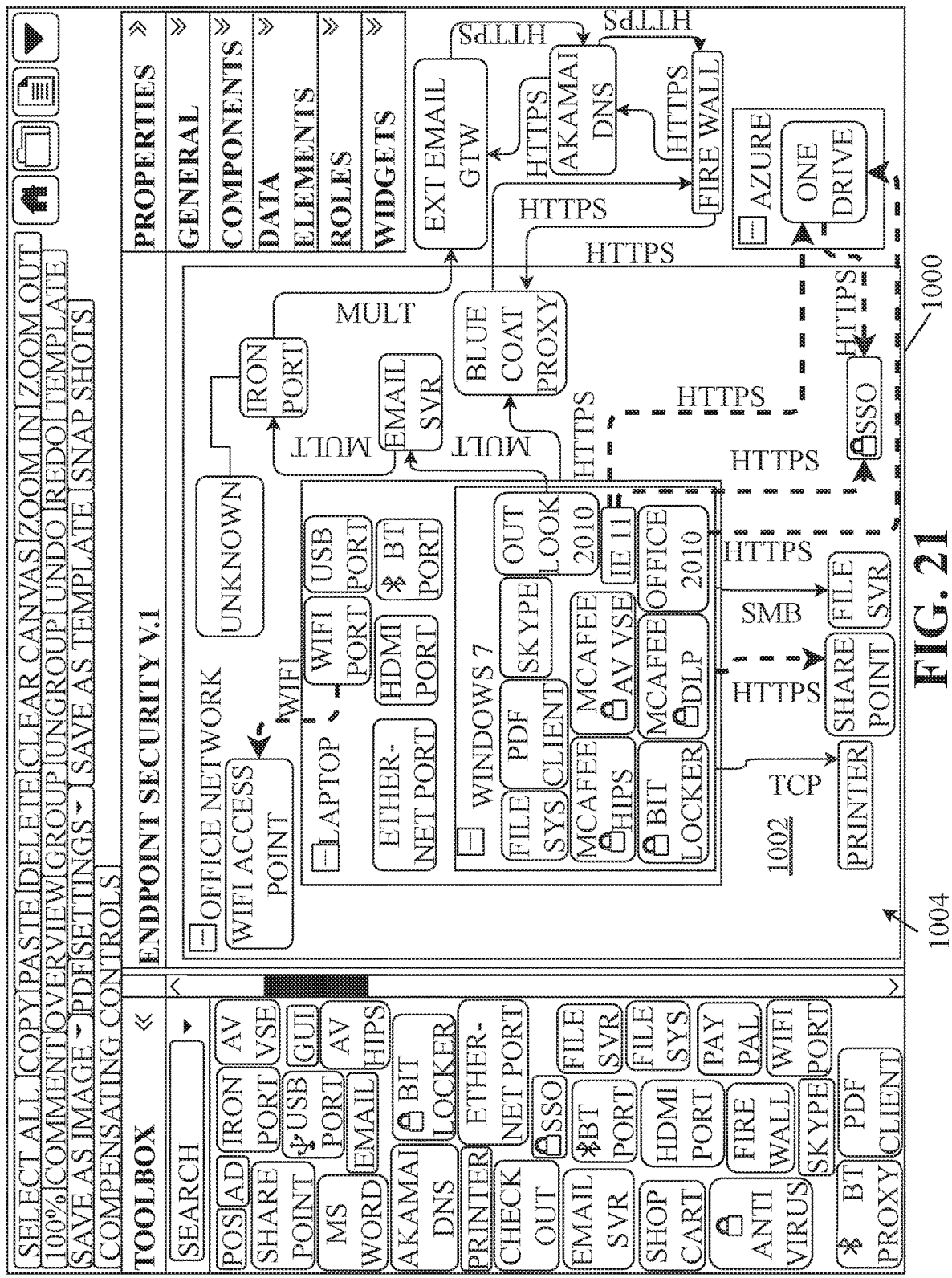
FIG. 21 is an implementation of an interface of the system of FIG. 1.

Referring now to FIG. 21, a representative example of attack simulation methods is shown. FIG. 21 shows the methods illustrated using the diagram interface 1000, though in other implementations the methods may be implemented using a separate interface that takes the components diagrammed in any given threat model and displays them in a separate interface just for the purpose of illustrating attack vectors. In FIG. 21 it is to be understood that the user has previously identified, through the database, the ONE DRIVE element as an asset. In other implementations the asset could be linked to the ONE DRIVE component but could be displayed as its own separate component—for example a "client info database file" shown next to or within the ONE DRIVE component (though in such a case the "asset" itself would be a "component" as that term is used herein). In the shown implementation the ONE DRIVE component itself is identified as the asset.

A number of dashed protocol lines are shown in FIG. 21. These are shown in this fashion after the user has selected the ONE DRIVE component and made a selection to show all threats that could compromise the component. For example, this could be done in implementations by right-clicking on the ONE DRIVE component and selecting a selector such as "Show Attack Paths," though the attack paths may be shown using other methods that the practitioner of ordinary skill in the art may determine. Once the selection is made, all threats reaching the ONE DRIVE component are highlighted in some manner. In the representative example they are highlighted by showing dashed and "moving" arrows, meaning an animation which shows the dashed portions of the lines as moving in one direction or another. In some implementations this animation could show the dashes moving in the direction towards the asset, which may assist the user to trace attack paths back to the outermost threats. In other implementations the arrows could be reoriented when the attack paths are shown so that the arrow tips all point downstream towards the asset, which may also assist the user to trace attack paths back to outermost threats. In implementations the attack paths are shown in a different color and/or using a greater line thickness than other protocol lines. In implementations the attack paths are shown in bright red and using thick lines while non-compromised paths are shown in thin black lines.

It can be seen that there are threats associated with the WIFI ACCESS POINT and with the SHARE POINT components, and that these threats reach the ONE DRIVE component through OFFICE 2010 and IE11 components. There are a number of potential compensating controls in the diagrammed system which may be utilized to mitigate these threats. For example, the laptop component group is shown including the MCAFEE HIPS, MCAFEE AV VSE, BIT LOCKER, and MCAFEE DLP compensating controls, and there is also an SSO compensating control diagrammed between the IE11 and ONE DRIVE components. All compensating controls in this diagram are shown as having an icon of a padlock on them so that the user can easily view the compensating controls to modify the threat model and the attack simulation (the compensating controls in implementations do not introduce any new threats but only mitigate threats).

Figure 22:
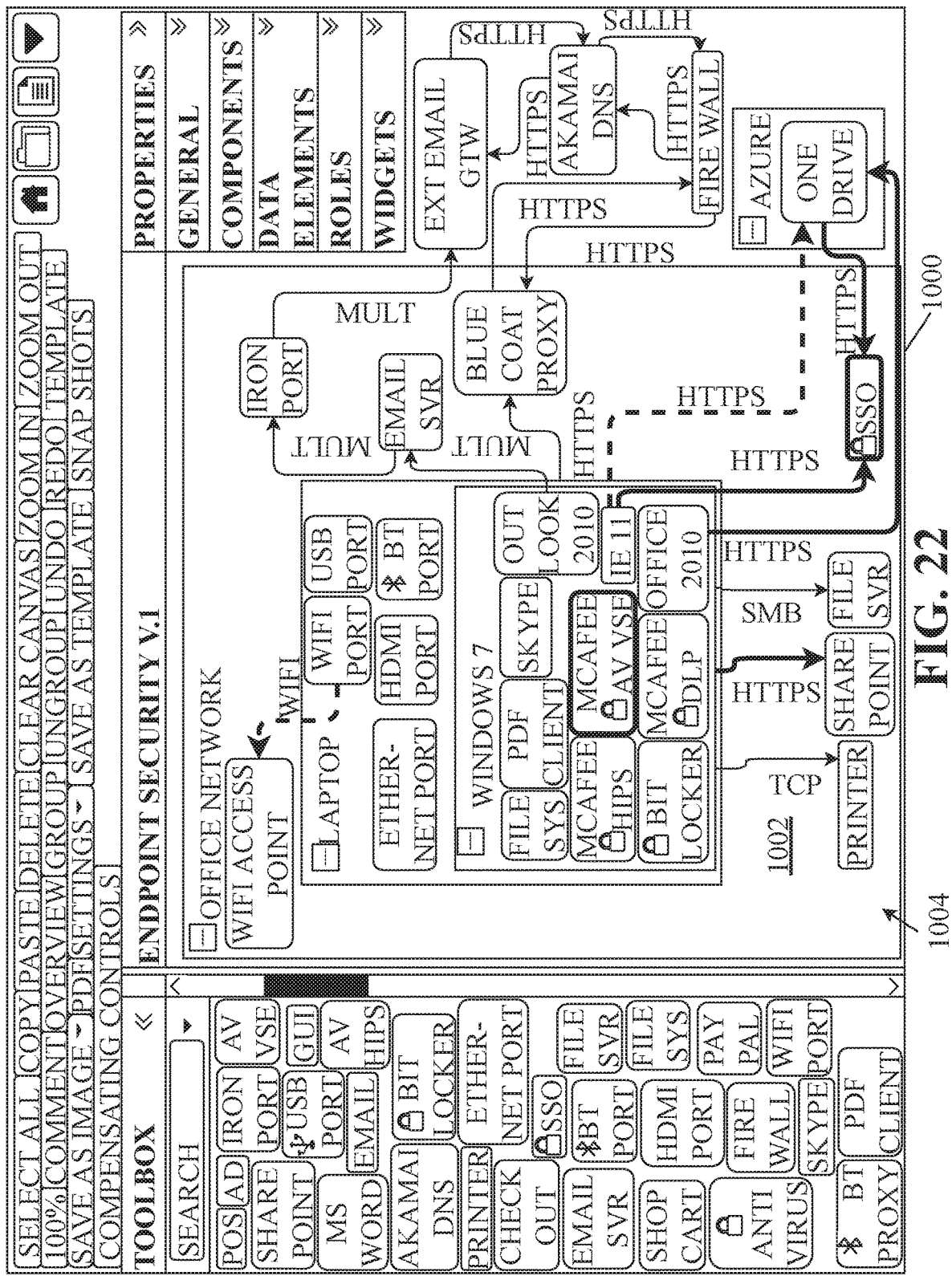
FIG. 22 is an implementation of an interface of the system of FIG. 1.

Referring now to FIG. 22, in this screen the user has toggled the MCAFEE AV VSE and SSO elements to an ON configuration. In implementations this is done by right-clicking each component and selecting "BLOCK" from a menu, which then changes all attack paths that are mitigatable by the selected compensating control to a mitigated display state (in some implementations the user may be able to select which attack paths are mitigatable from this interface). In FIG. 22 these compensating controls are highlighted by outlining them in a thicker line to show that they are turned on (though this display may be excluded in other implementations). The attack paths that are mitigated by the compensating controls that have been toggled to an ON state (or to a blocking state) are now shown as solid lines again, while those that are not mitigated are still shown in dashed format. In implementations the mitigated attack paths are shown in a thick green line. The user may reselect the compensating controls and select unblock to revert the threat model to the previous state. The user may also delete any given compensating control from the diagram altogether, and this will have the effect of changing any attack paths that were mitigated by that compensating control to an unmitigated display state.

While the mitigated display state for attack paths are described herein as green and bold and the unmitigated display state for attack paths are described as dashed, red, bold and animated, the practitioner of ordinary skill in the art could select other visual techniques to differentiate attack paths from non-attack paths and mitigated attack paths from non-mitigated attack paths. When a user toggles a compensating control to an ON state this may have the effect of dynamically changing the threat report, the compensating control report, the mitigations interface, and so forth by toggling relevant threats to mitigated (and toggling the same compensating control to the OFF state or removing it altogether from the diagram may have the opposite effect). In implementations one or more of the user interfaces (such as those of FIGS. 21-22) may allow user selection of certain threat sources and deselection of others, so as to only show attack paths of threats associated with a selected subset of the diagrammed components. The threats are shown in FIGS. 21-22 as emanating from outermost components (and the system/method may default to checking for threats at all outermost nodes), but in implementations they could emanate from internal sources (such as a USB port in an internal system administrator computer being a threat source for a virus). An attacker could be visually displayed at each threatened component, for example an "attacker" component could be placed on the diagram coupled with the WIFI ACCESS POINT and SHAREPOINT components to indicate the presence of an attacker. In other implementations the attacker need not be displayed in this way, but the user may understand that an attacker is reaching for the asset through the end points from where the threats are shown emanating on the diagram. From these end point components, or from an actual "attacker" component, the user may edit an attack profile (such as to indicate along a spectrum from a low funded individual hacker all the way to a state-sponsored team of skilled and well-funded hackers) and this may modify the attack paths. For example, if the latter profile is identified then certain compensating controls may not mitigate the threats (for example the SSO element may not be effective, and another compensating control would be needed instead), and accordingly when the profile is changed one or more of the attack paths may change to a mitigated or unmitigated display state in response. The identification of hacker type may be done, for example, through dropdown lists, checkmark items, and so forth that had been previously set through the database by the user, and the ability of a compensating control to mitigate threats by lower-end attackers but not higher-end attackers may also be defined/set through the database in the input interfaces previously described (though using selectors not shown—but which the practitioner of ordinary skill in the art will know how to implement).

In implementations another interface may allow the user to get a list of all threats which may compromise the asset and all attack paths associated with those threats. The asset has been described above as being anything of value to the user, it could for example be a database, a financial asset, a trade secret (or files related to trade secrets), and so forth.

One more comment is made here with respect to threat model chaining. The user may select a sub-component or component group (for example the user could right click the WINDOWS 7 component in FIG. 22) and select an "open in new window" selector to open a new diagram interface showing the diagram just for that component group. The user may then view just the threats associated with the component group, using previously identified methods, and/or may identify assets within the component group (for example OUTLOOK 2010) to show attack paths related just to this component. In implementations a user may right click or otherwise select a component group on an existing threat model by selecting a box outlining the component group and then select a "show threats" or other menu item to treat the entire component group as an asset and to show all attack paths thereto.

In implementations the designation of a component as an asset is done as simply as clicking on any component and selecting a "show threats" or similar menu item from a list. In other implementations a component may be designated as an asset by another mechanism and/or using another interface. The asset may be selected and its features edited, as well, as detailed to some extent above (for example some of the asset classification may be done here, though this may alternatively be done using one or more other interfaces). The attack simulation systems and methods herein allow a user to obtain a thorough understanding of threats and risks to multi-faceted systems/processes, and the impact to relevant assets, should potential threats be realized.

Although the examples of computing system models have been described in detail, system 100 may be utilized to model other threats. For example, referring to a disease epidemic threat model, the threats may be sources or ways the disease may spread, the security requirements may be methods or elements to reduce the effects of those sources, such as sterilizing surgery instruments, washing hands, using air filters, breathing masks, gloves, and the components may be steps or interactions that occur with respect to persons who may be infected, such as admitting them, dealing with infected clothing, performing medical operations on them, etc. In such a scenario the threat model may have no components, threats, or security requirements that relate directly to computing devices or systems, though the threat model may be modeled on system 100 which utilizes computing devices. The same may be said for the aforementioned threat model of commuting to work. Numerous other threat models, involving any of myriad types of threats, could be modeled using system 100. Other types of threat models could include: modeling physical and technology threats to airplanes, smart homes, smart TVs, an electric grid, and so forth.

Accordingly, the system and interfaces described herein allow a user to model a variety of systems, applications, and processes to determine threats and to mitigate those threats. The user may, at any time, delete any security requirement component (which may be a compensating control component) from a diagram and then generate the threat report again to revert to the threat statuses prior to mitigation by any particular component. This is one way in which step 518 of FIG. 5 may be accomplished, since removing the mitigating component will revert the mitigated threats back to the open status (except for threats which are also mitigated by another mitigating component). In implementations there may be other ways to "roll back" the threat report to an earlier status, such as with one or more selectors on the threat report itself to revert to an earlier configuration, or one or more "back" selectors on the diagram interface, and so forth.

Utilizing the methods and systems described herein an organization or individual can quickly and efficiently model deployed or contemplated systems, applications and/or processes and assess relevant threats to determine a mitigation strategy. The user may assess new threats to the entire attack surface of a system, application or process as the new threats arise and accordingly develop modified mitigation strategies with minimal disruption to existing operations. Additionally, the methods and systems described herein allow users to study the ability of a compensating control to block new or existing threats without penetration testing (pen-testing), which can be resource-intensive, slow, and not as thorough as desired. The systems and methods also allow assessment of future compensating controls which have not yet been implemented (and accordingly where penetration testing is not yet an option). Any of the threat modeling described herein may utilize existing threat modeling methodologies including STRIDE, P.A.S.T.A., TRIKE, OCTAVE, and/or VAST methodologies, which may include modeling the system, application or process as a data flow diagram (DFD) or a process flow diagram (PFD). The methods and systems herein integrate well with agile and DevOps development environments, and allow a threat modeling process which is simple enough to allow non-security experts to participate in the threat modeling process and to benefit from the outputs of the system/method.

In implementations a compensating control record in the database may include a definition or details which include: an articulation of the rigor and intent of a prescribed security requirement which the compensating control is meant to satisfy; a defensive level of the compensating control; security and defensive capabilities of the compensating control, and; additional risk imposed by not adhering to the prescribed security requirement.

Systems and methods described herein may have other features that have not been described in detail. Users may be able to access the interfaces of the system through a web page, as described, and may be able to register using user accounts, with login credentials, the web page having functionality for retrieving lost passwords etc. Individual users may be able to import custom libraries and other elements into the database including custom components, threats, threat agents, test cases, security requirements, code snippets, code reviews, data elements, roles (developer, customer, user, admin, etc.), widgets, component types, attributes, templates, threat models, and the like. In implementations widgets may be a subset of components and may include reusable modular components that may be included in some components. Some examples of widgets may be, by non-limiting example: forms, cookies, banners, embedded video, RSS feeds, SMS functionality, SILVERLIGHT, secure hardware token, file upload, XML parser, and so forth. Widgets may be associated with threats through the database, using an interface similar to interface 600 (but accessible by selecting "widgets" from interface 700), and may be added to any diagram in the same way that components are added, which may include defining communication protocols between the widget and other components/widgets. Widgets may in implementations comprise identifying information about a component, user roles which can interact with a component, and the means by which the component receives, transmits, or stores data elements.

In implementations a software installation on one or more computing devices to implement the systems and methods may include storing default libraries in the database (such as over six hundred and fifty threats), a number of standard or default definitions for components, default risk levels to choose from (though the user may set up custom threats and associations through the database which essentially sets up custom risk algorithms), custom risk levels to choose from, and so forth, as described above. The ability of the user to diagram a system, application or process visually allows for non-security experts to analyze threats using a threat model. In implementations, previously generated diagrams may be able to be imported into the system using a PDF or VIZIO drawing.

In implementations the system is configured to interface with third-party software applications and libraries (including software as a service (SAAS) services), by communicating with the third-party software/library using its application programming interface (API). This may be used, for example, to store standards from standards-issuing bodies in the database and to associate them with security requirements and/or compensating controls through the database. This may assist a user to determine when a component added to a diagrammed threat model would qualify as a compensating control as defined by the standards issuing body. The system may be said to include a "contextual threat engine," which includes the underlying database relations allowing the system to dynamically update the threat model each time a component is mapped onto the canvas, or connected with another component using a communication protocol, or when a protocol is changed or deleted, or a component removed, etc. The systems and methods described herein facilitate comprehensive enterprise-level attack surface analysis. Different users may use different interfaces within an organization in some implementations. Information technology (IT) professionals may define the actors, threats, components, etc. specific to an organization, non-IT professionals may map out systems using the canvas, executives may review the high-level threat details included in the home page or threat model, and so forth (though in other organizations any user may use any interface).

In implementations one or more user inputs may be used using one or more user interfaces to import a threat model from a third-party software or database into the system. When this is done an administrator may map components or elements of the imported threat model to stored components of the system so that the relevant threats and etc. will be included in the imported threat model. Along these lines, it is pointed out here that both end users and administrators are "users" of the system as that term is used herein. Accordingly, when the claims refer to "one or more user inputs"

these inputs may be carried out by an end user and/or they may be carried out by an administrator, such as an administrator maintaining a cloud database which several different end users are accessing to implement different deployments of the method/system.

Referring now to FIGS. 23-29, various representative examples of systems and methods for automated threat modeling of an existing computing environment will be described. The existing computing environment could include, for example, a computing network, such as a local computing network, a cloud computing network (an AWS, AZURE, or other cloud network), and the like. The term "computing environment" as used herein, however, is not limited to computing networks. The existing computing environment could alternatively or additionally be a software application, such as a mobile application. Automated threat modeling may, accordingly, be used to map out an existing computing network to determine threats related thereto, and/or could be used to map out a software application or mobile application to determine threats related thereto.

Figure 23:
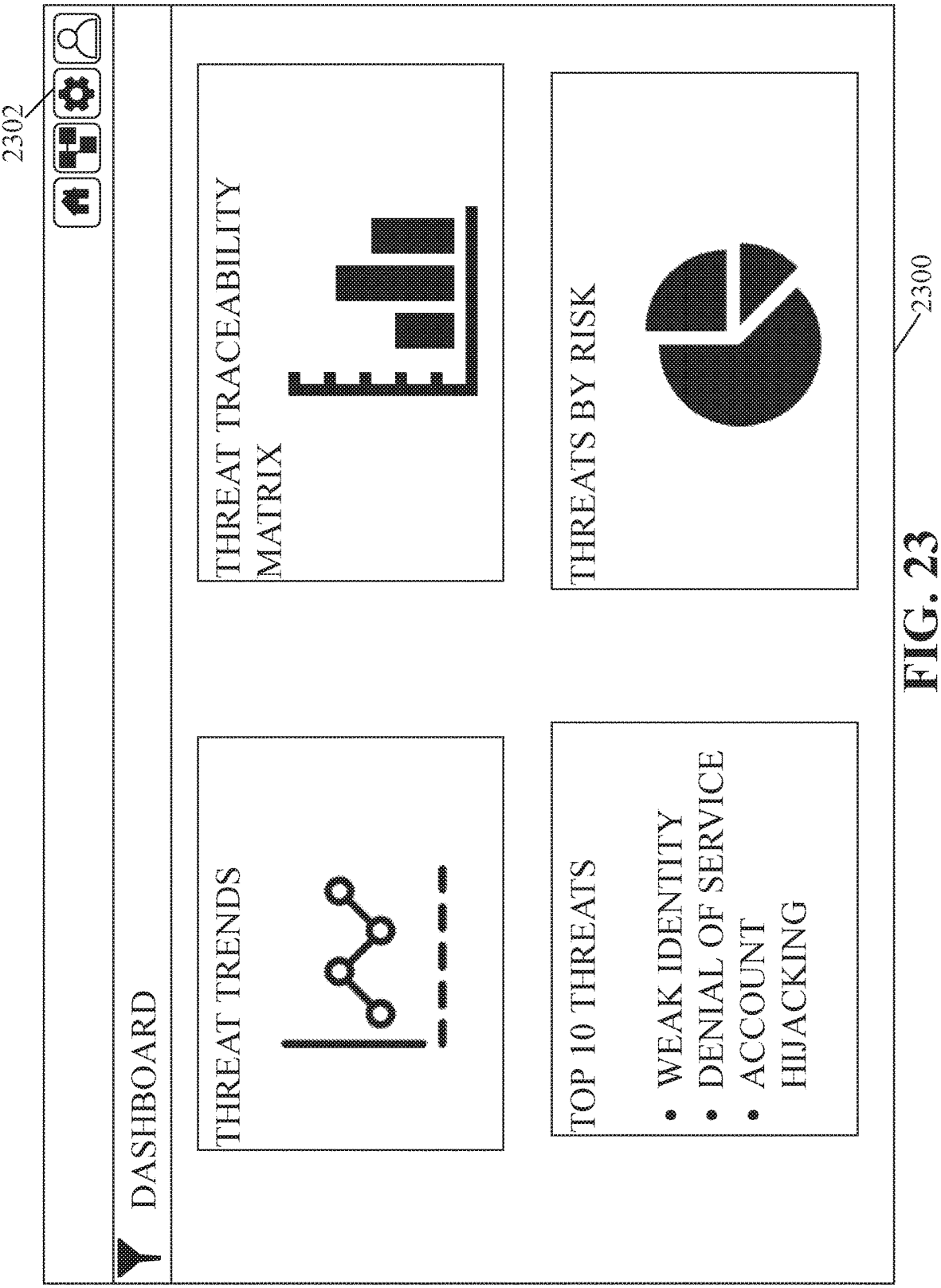
FIG. 23 is an implementation of an interface of the system of FIG. 1.
Figure 24:
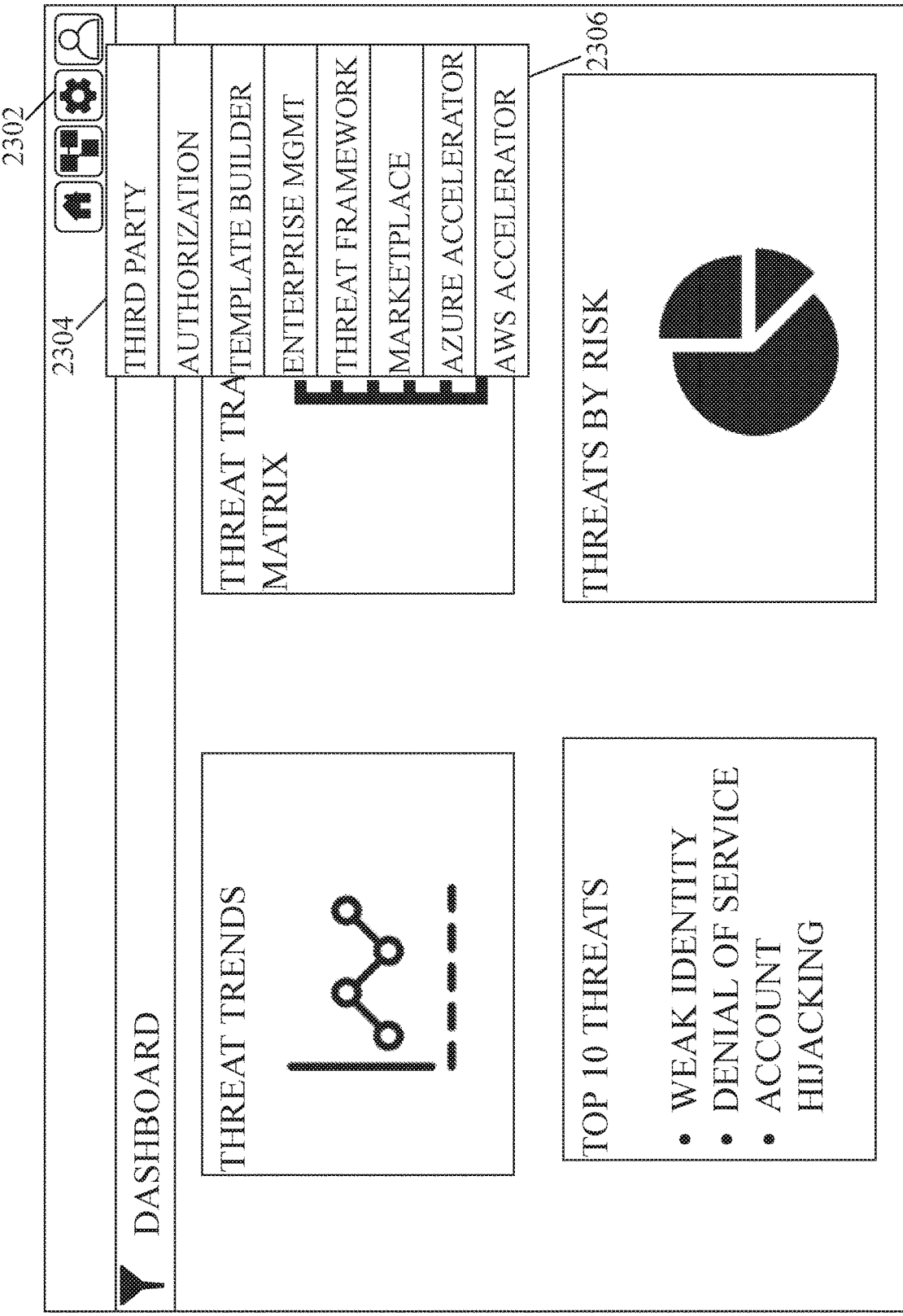
FIG. 24 is an implementation of an interface of the system of FIG. 1.
Figure 25:
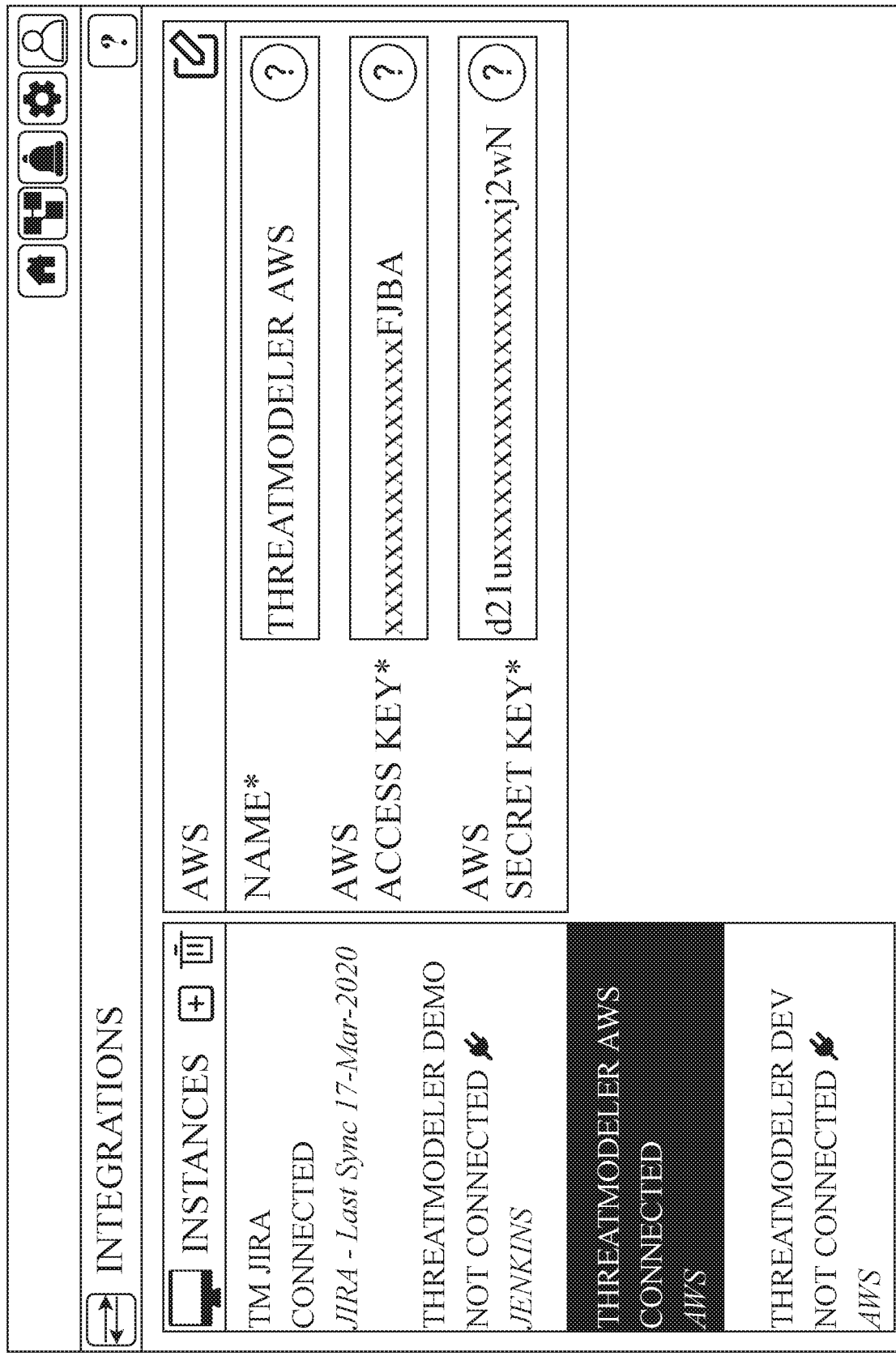
FIG. 25 is an implementation of an interface of the system of FIG. 1.

The system 100 previously described, with some additional user interfaces and functionality that will be described shortly, may be used for automated threat modeling of the existing computing environment. FIG. 23 shows a dashboard interface (interface) 2300 which may be displayed on one of the computing devices of system 100 (such as an end-user computer) and may allow a user to view information and/or navigate to different interfaces or windows as desired by the user. For example, the dashboard interface shows a THREAT TRENDS area, a THREAT TRACEABILITY MATRIX area, a TOP 10 THREATS area, and a THREATS BY RISK area. These may show information and/or may be selected to navigate to an interface/window with more information, and are only representative examples that will not be described in great detail. A filter icon is also seen at the top left which may allow a user to filter the items shown on the screen in various ways. At the top right a settings selector 2302 may be hovered over or selected (such as with a click) to bring up a menu interface (dropdown list) 2304 as seen in FIG. 24. A number of selectors on this list may be selected to navigate to other interfaces and/or windows, one of which is an automated modeler selector (selector) 2306 which may be selected to bring up an automated modeler interface (interface) 2500 as seen in FIG. 25. Selector 2306 in FIG. 24 has the title "AWS ACCELERATOR," and the automated modeling described hereafter will use as a representative example the automated modeling of an existing AMAZON WEB SERVICES (AWS) network, but other types of networks, such as an AZURE network or a GOOGLE CLOUD network, could be automatically modeled in similar ways. Accordingly, in other implementations the list 2304 could include selectors for other types of networks (such as the AZURE ACCELERATOR selector shown), or the selector 2306 could bring the user to an interface from which the type of network could be selected from a list. Interface 2300 could be a home page for the software.

Before describing user interfaces of system 100 further, some explanation is useful regarding user interfaces associated with an existing computing environment. Such user interfaces do not form a part of the claimed invention but, nevertheless, in some implementations the user will need to access and utilize some of the user interfaces associated with the existing computing environment in order to facilitate the automated modeling described herein. As a non-limiting example, continuing with the Amazon Web Services (AWS) example, when a user uses AWS for cloud computing/networking there are many services (possibly over 150) that AWS provides to customers in order to set up infrastructure and the like. This may include servers, databases, virtual containers, machine learning elements, and so forth. These may be seen from a management console within AWS. Every component has its own task or service to perform. When a user accesses AWS there is an AWS Config Dashboard which shows all AWS resources the user's network is using inside the cloud computing environment. Every individual service also has its own application programming interface (API) which provides information about how that service is being leveraged and what other services it is communicating with. The one or more servers of system 100 may use the API to determine the components that make up the VPC environment, such as by using code, executable(s), etc.

For each user that is created in AWS, an AWS access key and AWS secret key are created. The user may find these within an AWS Identity and Access Management (IAM) interface, and from that interface the user may also create new users. A new user is created by providing a user name, and from this interface the user can select an access type. The "Programmatic access" type enables an access key ID and secret access key for the AWS API, command-line interface (CLI), software development kit (SDK) and other development tools. Accordingly, the admin/user would select "Programmatic access" when creating the new user. After the access type is selected, the admin/user selects permissions for the user. The admin/user may attach an existing policy titled "ReadOnlyAccess" (this is an AWS managed policy).

Because the above AWS interfaces are not part of the present invention, but are available to users who use AWS cloud computing services, the user interfaces are not described in detail and are not shown in the drawings. The AWS examples are just examples, and in other cloud computing environments (AZURE, GOOGLE CLOUD, etc.) other example interfaces would be accessed to obtain access credentials.

Once the access credentials for the cloud computing environment are known, the system 100 may be used to automatically detect all accounts in the cloud computing environment. With regards to the AWS virtual private cloud (VPC) example, this could include detection of all servers, databases, dockers, routers, computers, containers, and so forth.

Returning to FIG. 24, after a user has set up cloud computing or a VPC using a VPC/cloud computing provider, the user may navigate to interface 2300 and select the THIRD PARTY selector. This brings the user to the integrations interface (interface) 2500 of FIG. 25. From this interface the user can select the plus icon to add a new instance (or the trash icon to delete an instance). When the user selects the plus icon the user can, from a dropdown menu (not shown), select "AWS" from a list of options (the list including other options such as JIRA, JENKINS, AZURE DEVOPS, etc.—in other implementations other options could be included such as GOOGLE CLOUD, ORACLE CLOUD, AZURE, IBM CLOUD, VCLOUD, etc.). The user in this representative example selects AWS and then the interface window on the right hand side may be used to connect with an AWS instance by providing an access key and a secret key of a user.

It is pointed out that, on the left hand side of interface 2500, the user may see a title for the instance (for example the selected instance is titled "THREATMODELER AWS"), an indication of whether the instance is connected with system 100 (and, if so, when the last sync was performed), and an indication of the type of instance (JIRA, JENKINS, AWS, etc.).

In the example of interface 2500 the user has selected the THREATMODELER AWS instance (indicated by its being represented with a different color scheme, as an example). On the right hand side the user may view the details of this instance. The details include the instance type at the top (AWS in the example), the given title or name (THREAT-MODELER AWS), the AWS access key, and the AWS secret key. In implementations these keys may be displayed with some of the characters represented only as x's for privacy/security, as shown in FIG. 25. The user in this example has previously input the name, AWS access key and AWS secret key. The user may select the edit selector on the right hand side to edit the name, access key or secret key, as desired, or may select any of the question marks to get help or further instructions regarding any given field.

As previously described, the user uses the AWS interfaces in order to obtain the AWS access key and AWS secret key. In similar fashion, if the system 100 is utilized for connecting to a non-AWS VPC or cloud computing services, then the input fields shown on interface 2500 for such an instance may be custom to such a VPC or cloud computing services. For example the right hand side of FIG. 25 may appear different (with different input fields) for a GOOGLE CLOUD instance, or an IBM CLOUD instance, etc. In any case, with any type of VPC or cloud computing services, the user may obtain the access credentials using the user interfaces associated with that VPC or cloud computing provider, and may enter those credentials using interface 2500. The example of interface 2500 allows a user to manually enter the access credentials, but in other implementations interface 2500 could be modified to access a file which was downloaded from the cloud services provider and which itself includes the access credentials, such as a comma-separated values (CSV) file downloaded from the cloud computing services interface.

Returning to the example of FIG. 25 (and discussing the previously-discussed AWS interfaces), once a new user has been added in AWS and the appropriate permissions have been provided, the generated AWS access key and AWS secret key may be entered using interface 2500 to allow the system 100 to connect with the cloud computing services. From the dropdown list 2304 of FIG. 24, an automated modeler selector 2306 (in this case the AWS Accelerator selector) may be selected to bring the user to an interface similar to interface 2600 of FIG. 26.

Figure 26:
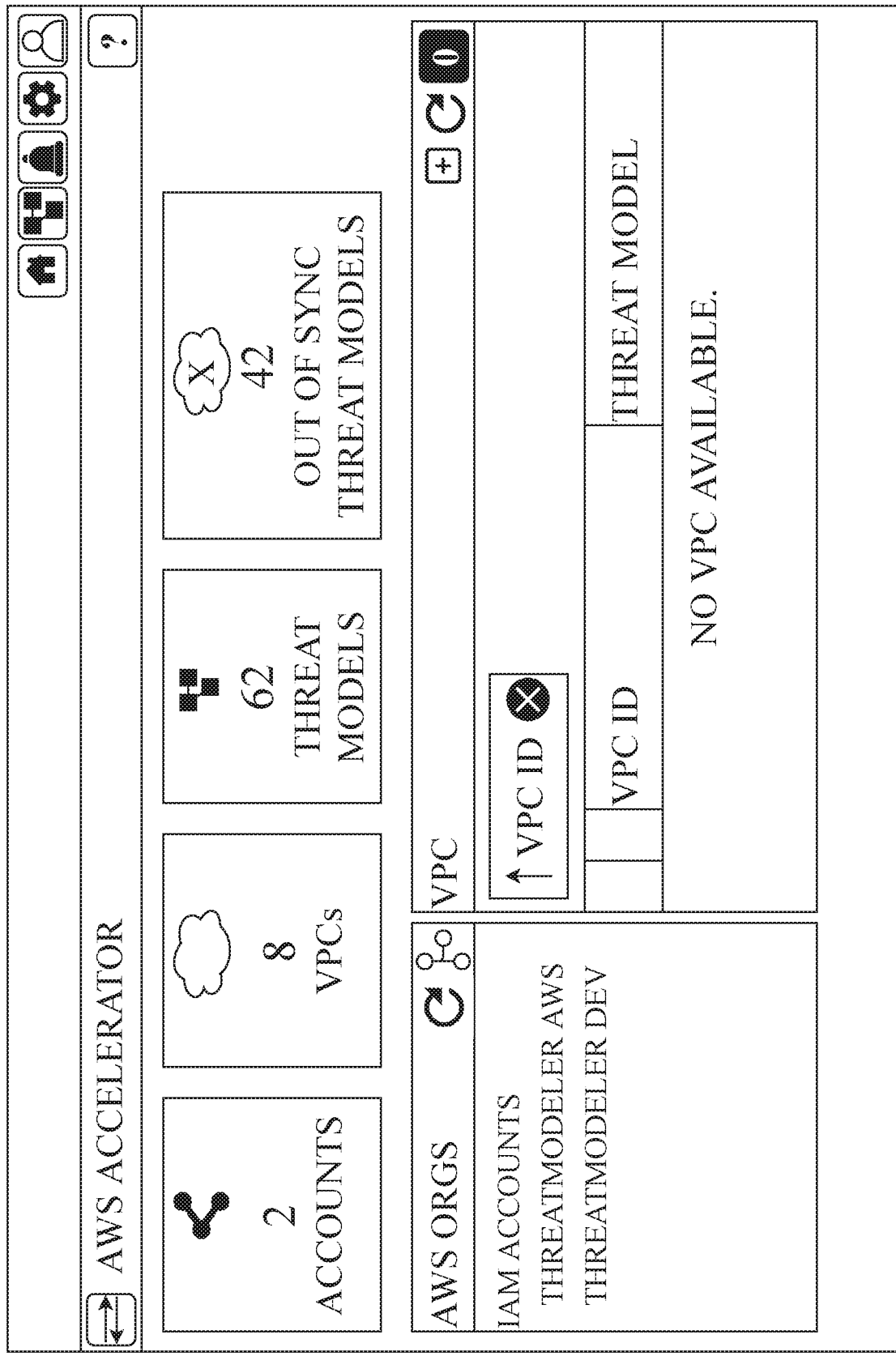
FIG. 26 is an implementation of an interface of the system of FIG. 1.

On the left side of FIG. 26 the user can select an account and the interface will list all the VPCs for that account. Every account has its own one or more virtual private clouds. Each VPC may be used to create one or more threat models, and these may be synced occasionally (or on a schedule). When the VPC is changed, the threat model for that VPC may be out of sync temporarily. Along the top of interface 2600 an indicator of the number of accounts is shown (in this case two), the number of VPCs associated with those accounts (in this case eight), the number of threat models associated with the VPCs (in this case sixty-two), and the number of threat models that are out of sync (in this case forty-two). Accordingly, in this case although there are eight VPCs, there are sixty-two threat models that have been generated. A VPC could, accordingly, have multiple threat models. For example a user could automatically generate a threat model using a VPC and, later, could generate another threat model using the same VPC. The later threat model may be more up-to-date than the previous model, and/or may exclude items in the threat model that the user has manually included but that are not a part of the actual existing computing environment, and there may be other reasons why a user may generate multiple threat models for a given VPC.

The two accounts that are identified on the top left are, in this example, the two AWS Identity and Access Management (IAM) accounts listed on the bottom left, which are titled "THREATMODELER AWS" and "THREATMODELER DEV." In this example, when the user selects the THREATMODELER AWS account on the left hand side of FIG. 26 by clicking on it (as reflected in interface 2700 of FIG. 27 by the "THREATMODELER AWS" selector changing to a different color scheme), a list of VPCs associated with the account/instance is generated (as shown on the right hand side of interface 2700). The list of VPCs itself is information that is directly provided by the cloud services provider, for example in this example the list of VPCs is directly obtained using an application programming interface (API) of the VPC which the system 100 utilizes, using the access credentials (AWS Access Key and Secret Key), to make a call for the information. Accordingly, providing the list of VPCs itself may, in implementations, simply involve making API calls and pulling the relevant information.

However, some of the information on the right hand side is not included or stored on the VPC end, but is stored in one or more data stores of system 100 itself. For example, on the right hand side is shown at least one listed threat model. The threat model itself is not provided by the VPC, but is stored in data stores of system 100. Additionally, the number of threat models (shown on the right hand side of each VPC listing) is also provided by data in one or more data stores of system 100.

Interface 2700 shows that each VPC has a number indicating the number of threat models that have been generated for it. The topmost VPC has one threat model that has been generated, the second listed VPC has one threat model that has been generated, the third VPC has four threat models that have been generated, and so forth. Each listed VPC may be expanded (by selecting the triangle icon at the left or by clicking or double clicking on the VPC identifier itself) to show a dropdown list of all copies for that VPC. The user may select the plus icon on any listed VPC to create a copy of it in the list (this could be done, for example, to facilitate later creation of multiple threat models for that VPC). In this case the screen shows only two copies of the VPC, and only one of these has a threat model associated with it. In implementations the list of VPCs may be scrollable. It can be seen that in this representative example all sixty-two of the generated threat models are accounted for by the THREATMODELER AWS account. Accordingly, the THREATMODELER DEV account has no threat models associated with it yet.

It can be seen in FIG. 27 that the user has selected/expanded the second VPC (and it is accordingly shown in a different color scheme) and the user has also selected the first threat model listed for that VPC by clicking or double clicking on it (and it is also shown in a different color scheme). When the user does this the threat model associated with the VPC instance/copy is displayed. This could, for example, bring the user to an interface similar to interface 2800 of FIG. 28, which shows along the top side navigation items of OVERVIEW, DIAGRAM, and REPORT. The OVERVIEW tab is displayed by default, and in this case shows the threat report associated with the threat model (on the top left, showing the threats, including number of threats, which may be organized by threat name, source, status, and/or risk level), and also shows a tasks interface or tasks list which shows suggested tasks for the threat model. More about interface 2800 will be discussed hereafter.

Returning to FIG. 27, we will now discuss the initial creation of a threat model using a connected VPC or cloud services. On interface 2700 the user may select a VPC instance/copy that does not have a threat model associated with it. When the user does this, the user may then select the plus icon (in the middle right of the screen proximate the sixty-two indicator) to generate a threat model. When the user hovers over this plus icon the wording "create threat model" appears, and wording may similarly appear over other selectable items when hovered over to assist the user in using the interfaces. When the user selects this plus icon a popup appears (not shown) which includes some selectors asking what tags the user wants to apply to this threat model for later searching (an AWS tag could be selected, for example), a selector allowing the user to select a type (AWS Cloud Application, for example), fields allowing the user to select or deselect internal (to indicate whether this is an internal model or not), a priority level (high, etc.), a date/time of the creation, and a name field (which defaults to the VPC name but which may be edited—for example the user could put "1.1" or "1.2" at the end, or change the name entirely, as desired), and SAVE and CANCEL selectors to initiate the threat model generation or to cancel its generation, respectively.

When the user selects SAVE to initiate the threat model generation, the system 100 uses AWS config and other SDKs and/or APIs to find the inventory of all components/services available in the VPC/cloud services. Once the list of components are provided, the system starts applying logic based on the information received, e.g., where does this resource lie, in which subnet, in which availability zone, etc., and based on all of that information the system starts building the diagram and, accordingly, the threat model. This is all done automatically, and once the threat model has been generated the user is brought by default to the overview interface of FIG. 28 (which includes the threat report and which, accordingly, may also be called a threat report interface), previously described to some extent. In other implementations the diagram interface could be displayed by default, but in either case the user can navigate between the overview, diagram, and a report interface using the tab selectors shown at the top of interfaces 2800/2900.

The proper mapping out of the diagram, and the generation of the associated threat model, may be done in a variety of ways. In implementations the selection of the previously mentioned SAVE selector could initiate an executable which includes code having logic to determine which threat model components (stored in the one or more data stores of system 100) correlate with the components/services identified in the VPC using the API call(s). For instance the executable/code itself could include logic related to all possible components/services within the VPC/cloud services. In other implementations the executable or code could refer to a separate mapping file. In some implementations the executable or code could include some machine learning elements, analogous or similar or identical to what is described in U.S. patent application Ser. No. 16/946,853, titled "Systems & Methods for Automated Threat Model Generation from Diagram Files," listing as first inventor Anurag Agarwal, filed Jul. 9, 2020, the disclosure of which is entirely incorporated herein by reference.

The system 100 in implementations includes a library which includes all components and services that the VPC or cloud computing provider offers. Using the AWS example, the system may include an AWS library which includes all components and services that AWS offers. This library may be included in the code or executable itself, as indicated above, or it could be a separate file or the like that the executable/code refers to. Accordingly, in implementations when the user selects the SAVE selector to automatically generate the threat model, the API call(s) provide(s) information about the services and components of the linked VPC/cloud computing environment. The system 100 obtains the relevant information/details about the components and services of the VPC/cloud computing environment using the API(s) and puts everything together, using logic of the executable(s) or code itself, to generate the threat model, threat report, diagram, and so forth.

Figure 28:
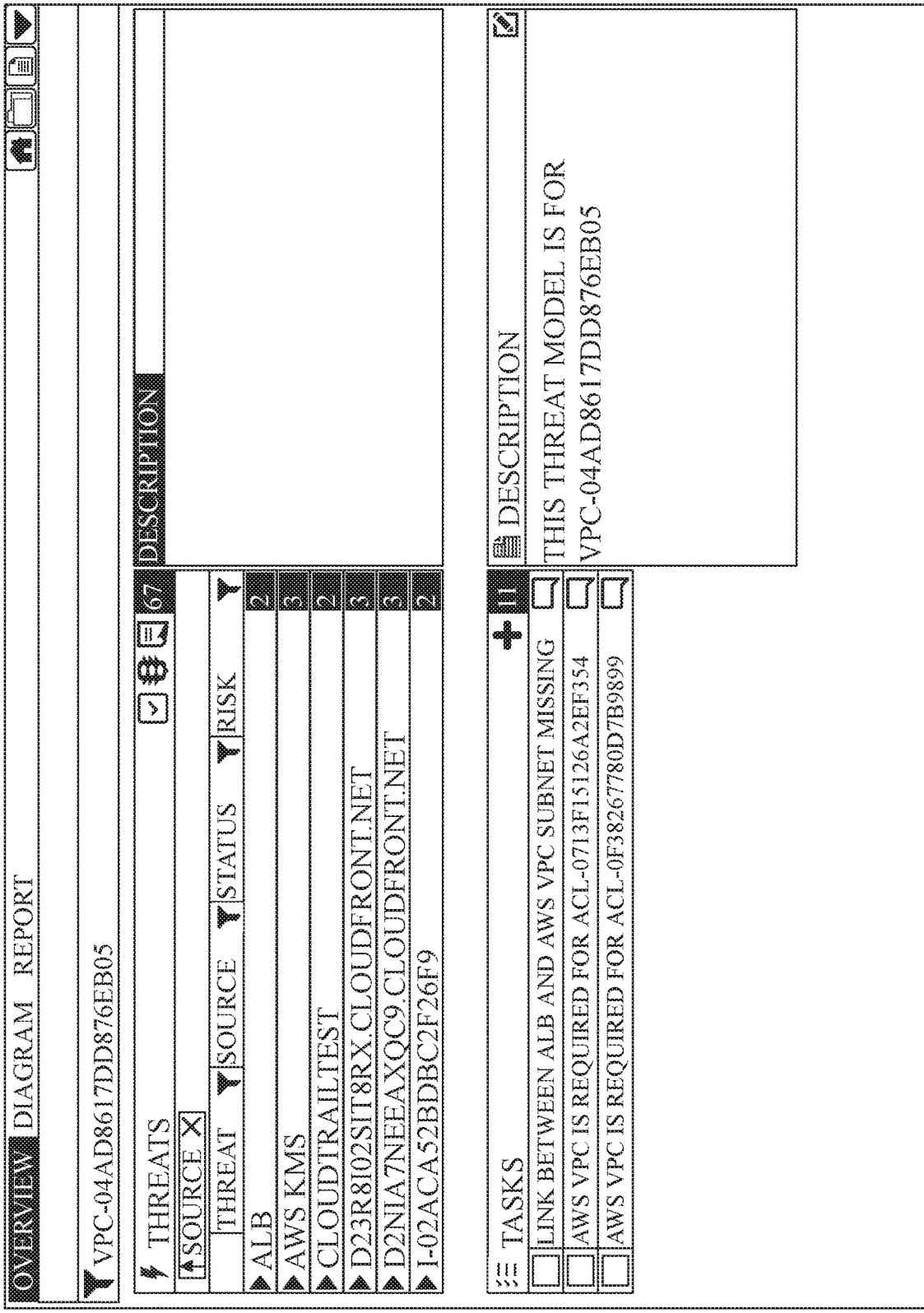
FIG. 28 is an implementation of an interface of the system of FIG. 1.

As previously described, FIG. 28 is an overview interface which is the default interface shown after the threat model is generated. The threat report on the top left of interface 2800 could, in implementations, include any of the details or features of threat report interface 1302, previously described (or in implementations the actual threat report interface 1302 could be shown embedded within interface 2800). The tasks interface on the bottom left could include tasks that are suggested based on rules that have been input previously by a user, using interfaces not shown in the drawings but which are shown in U.S. patent application Ser. No. 16/664,679, titled "Systems and Methods for Assisted Model Generation," listing as first inventor Anurag Agarwal, filed Oct. 25, 2019, the disclosure of which is entirely incorporated herein by reference. The '679 application further discusses, at length, the creation of rules which may be used to facilitate a list of suggested tasks such as the tasks interface at the bottom left of FIG. 28. FIG. 28 also shows a description field that may be edited as desired, in the example of FIG. 28 it simply states that this is a threat model for a specific VPC. The suggested tasks listed are based on the diagram, but of course they are meant as recommended edits to the actual existing computing environment (VPC/cloud environment/application, etc.).

Figure 29:
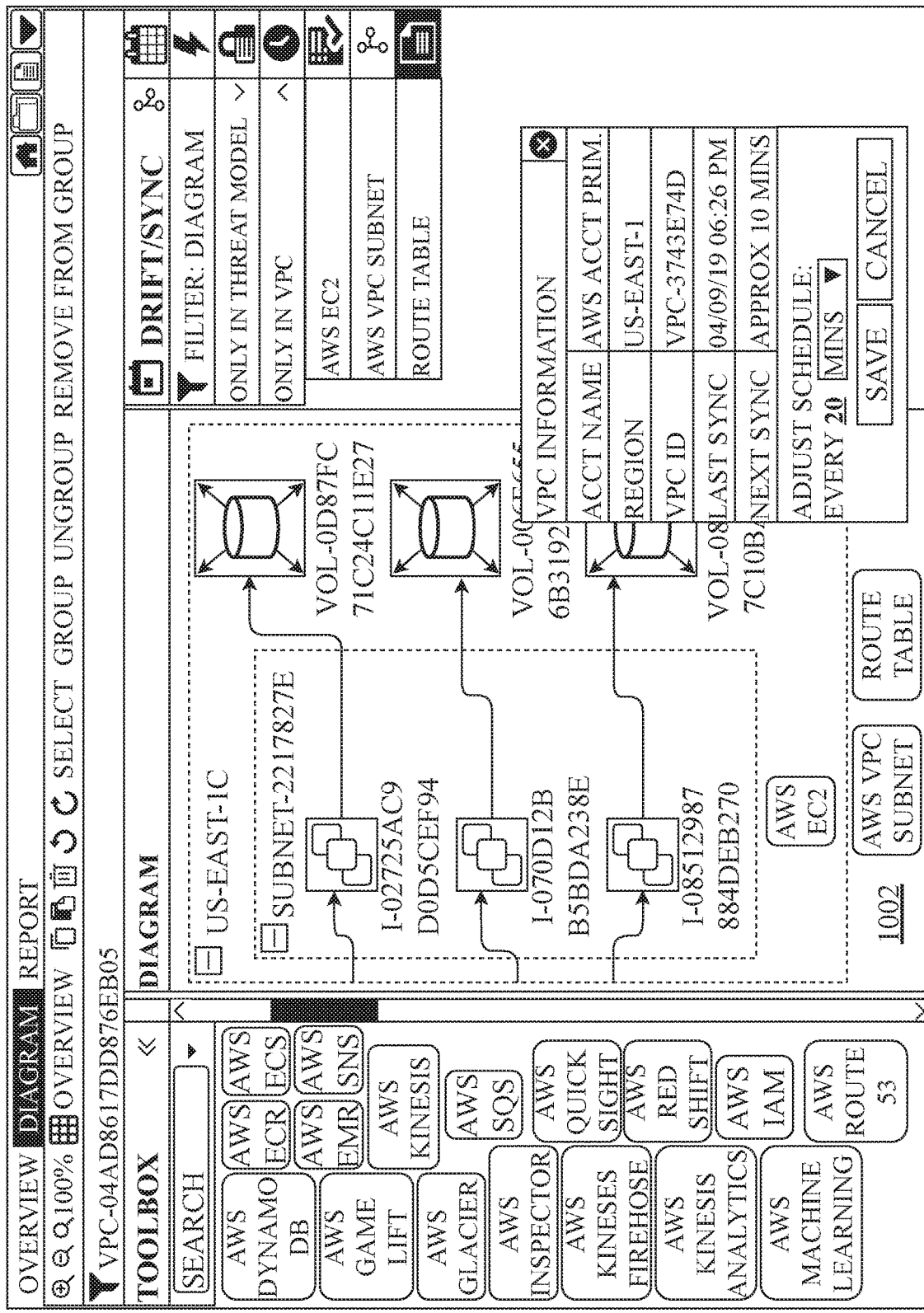
FIG. 29 is an implementation of an interface of the system of FIG. 1.

From the overview interface of FIG. 28 the user may select the DIAGRAM tab/selector at the top of the screen to navigate to a diagram interface similar to interface 2900 of FIG. 29, which includes visual representations of the threat model components. The visual representations and the threat model components are associated, through the one or more data stores, with threats stored in the one or more data stores, so that the threat model components of the diagram determine the threats that will be displayed on the threat report. Naturally, the data stores of the system 100 may include visual representations for many potential VPC components, so that those that are diagrammed are only a subset of all those that are stored in the one or more data stores.

Although specific details are shown with respect to diagram interface 2900, the diagram interface may alternatively or additionally include any components, elements or functionality of the diagram interfaces previously described and shown in FIGS. 10, 15, 21, and/or 22. Additionally, any elements or selectors displayed on interface 2900 that are similar or analogous to selectors/elements described with respect to other diagram interfaces described herein may have functionality similar to that which is described elsewhere herein. The canvas 1002 shows a diagram of the VPC or cloud computing environment, as determined using logic elements and the executable(s)/code of the system, described above. In the toolbox area on the left of interface

2900 are shown AWS components. These are threat model components that were previously created and stored in the one or more data stores. In this example the AWS threat model components are shown because the system knows that this diagram is of an AWS VPC. However, in other implementations the toolbox area may include threat model components specific to another VPC or cloud computing environment (for example AZURE components if the system/environment being modeled is an AZURE environment).

On the diagram of interface 2900 are shown names/identifiers (IDs) for different threat model components—these IDs may in implementations (as in the example of FIG. 29) be obtained from the API pull(s). The images of the diagrammed threat model components will come from the one or more data stores of system 100. In this implementation, as described to some extent above, the system 100 includes in the one or more data stores threat model components that are correlated with specific components/services of the VPC environment (for example every possible component/service having correlated threat model components) either correlated through the database, or correlated through the code/executable(s) used to generate the threat model, or correlated through a separate mapping file, or some combination thereof. If a mapping file is used, the functionality may be similar to that described in previously-referenced U.S. patent application Ser. No. 16/946,853. In implementations, however, as in the examples shown in the drawings, the correlations are included in the code itself that is used to generate (or initiate generation of) the threat model. Accordingly, for any component or service that is found from the API pull, the system knows what threat model component to use to represent it on the diagram and in the threat model because the correlations are in the code itself.

In some implementations machine learning could be used to facilitate and/or to enhance the matching of computing environment components to threat model components. For example, a machine learning (ML) algorithm could be configured to select, for each existing computing environment component, a corresponding threat model component. The ML algorithm could be trained before deployment and could be continuously trained in-situ to improve performance. If users tend to change an automatically-selected threat model component to a different threat model component, for example, the ML algorithm of the system 100 may be retrained by such selections and may update its values or confidence levels so that it is more likely to select proper threat model components to represent existing computing environment components. The ML algorithm may be included in the system as separate code or as an ML "engine" that is used by, referenced by, and/or triggered by other code/executable(s) of the system during automated threat modeling of an existing computing environment. When machine learning is used it may be used without any mapping file, though in other implementations there may be a mapping file (or mapping inherent to the code itself) and the machine learning may simply update the mapping file and/or the mapping inherent to the code itself (such as by adjusting values or confidence levels within the code).

As indicated, however, while the code builds the threat model, the actual ID of each threat model component in the example of FIG. 29 is the ID of the component that it has in the cloud computing environment.

FIG. 29 shows a DRIFT/SYNC area (sync input field) which includes two lists (available from dropdowns). The first list shows elements (not displayed in FIG. 29) that are included in the diagram but that are not included in the linked VPC or cloud computing environment. The second list (shown expanded in FIG. 29) shows elements which are included in the VPC or cloud computing environment which are not included in the diagram or threat model. For example, the user may, as with other diagrams described previously, drag a threat model component from the toolbox area onto the canvas to add it to the diagram and, therefore modify the threat model. In doing so, an element will be included in the diagram/model which is not included in the VPC. Additionally, the user may make some modification to the VPC itself and, until the diagram/model is updated, the VPC will then include an element which is not included in the diagram/model.

The system, however, may have a variety of functions to facilitate syncing the diagram/model with the VPC and/or viewing the differences between the two. The system may be set to automatically check the VPC (for example every 30 minutes, as an example), and using the new API pull the system may populate the aforementioned lists of items in one but not in the other. The user may select the calendar icon to the left of DRIFT/SYNC to bring up the VPC INFORMATION window shown in FIG. 29, which shows details of the VPC, when the last sync occurred, and when the next sync will occur. In implementations, as shown in FIG. 29, the user may also adjust the schedule by inputting a new value and selecting a time unit from a dropdown list (such as minutes, hours, days, etc.) and pressing SAVE to save the changes to the schedule or CANCEL to revert to the previous schedule. The user may at any time select the icon immediately to the right of the DRIFT/SYNC wording to initiate an immediate sync. In implementations this selection may only run a comparison to populate the aforementioned lists of what is in one but not the other. In other implementations, however, the selection of this icon may instead initiate matching the diagrammed system/model to the VPC environment—in other words updating the diagram and model to match the current state of the VPC. In other implementations another selector may initiate the automatic updating to the current environment, and the icon to the right of DRIFT/SYNC may simply do a comparison to populate the aforementioned lists. In implementations the user may select individual listed items in the lists of discrepancies to bring up one or more selectors to delete an item in the diagram/model that is not in the VPC (or keep it), or add an item to the diagram/model that is in the VPC (or leave it out). In implementations there may be one or more selectors or settings available using interface 2900 or another interface to allow the user to select for the diagram/model to automatically update to match the VPC each time another API pull is done, so that the diagram/model always reflects the latest version of the VPC environment.

Accordingly, the system may continuously validate the generated threat model against the connected VPC/cloud computing environment to help keep the diagram/model up to date. The threat report and any other reports may be accessed, such as the previously described mitigations interface, compensating control report, and so forth, and these can be dynamically and automatically updated as the VPC environment changes. Accordingly, the recommended security requirements, compensating controls, and so forth are based on the VPC architecture in real time, giving the user real time feedback of whether they are in compliance or not with certain requirements to mitigate threats.

It is described above how the diagram/model may include communication protocols. In some VPC environments the communication protocols between some elements may not be known, or may not be defined (it may simply be known, from the API pull, that there is a communication link between elements). In such cases the automatically generated threat model may simply include a communication line and, if the user desires, the user may select a communication protocol, such as HTTP, HTTPS, etc. In some implementations, however, the logic of the code/executable(s) may include logic which determines which communication protocol to use for some connections, so that when the automatically generated threat model is created, some or all of the communication protocols are shown/determined by the system.

The interfaces 2800/2900 show a REPORT tab at the top. This tab may be selected to show a compliance/non-compliance report provided by the VPC provider. In this case it would be an AWS report indicating compliance/non-compliance of aspects of the system. This is not necessarily the same information as is provided in the threat report and other interfaces of system 100, but it may be provided to the user for comparison and for additional security.

As described to some extent above, the systems and methods described herein allow for the removal/mitigation of threats of an existing computing environment without penetration testing. Accordingly, the systems and methods disclosed herein reflect improvements to the functioning of a computer/computing system itself.

If a given VPC provider updates its information or available components/services, the system 100 (for example its code/executable(s)) may be modified to reflect the changes. For example, in an AWS environment an EC2 component has one set of information, S3 has another set of information, etc. If AWS provides a new component it will have its own information and API, and an administrator of system 100 could include the new information in the code/executable(s) ahead of time (when it is released to AWS partners) so that end users using system 100 will always have fully updated information for threat modeling. The same may be true for other VPC providers, and the AWS description is only given as one example.

In some implementations the system 100 may allow the user to make some edits to elements as the threat model is being generated, for example providing one or more popups to the user to ask about one or more customizations or preferences before the threat model generation completes.

To describe further the automated threat model generation, as indicated above the ability to do this may be facilitated by the code used to generate the model. The logic would be along the lines of indicating that when element A is seen in the API call, threat model component X is pulled from a library of system 100 (for example in the one or more data stores). As indicated above, the communication protocols may be in the VPC-provided information from the API pull(s) or not. As indicated above, the VPC provider may only have around 100-150 components/services, which do not frequently change, though occasionally a new service/component may be rolled out. Accordingly, it is not overly difficult to indicate, in the code/executable for generating the threat model and diagram, which threat model component to pull from a library in response to seeing a specific element/service/component in the API pull.

The threat model itself, i.e., the diagram and the associations between elements that are created after the API pull, are stored in the one or more data stores of the system.

As implied above, the term "component" as it is used with respect to a VPC environment includes "resources." In VPC environments, such as in an AWS environment, every instance has a unique identifier. For example there is an external resource identifier (ID) (component ID) for each component/resource in AWS. AWS provides an SDK, and using that SDK the system 100 may be configured to do an API pull to know which components/services are included in the AWS environment and which component IDs are assigned to them. In the examples given herein the mapping is one-to-one, but in other implementations one-to-many or many-to-one mapping may be implemented. Again, the AWS examples given here are only for illustration, and there may be similar functionality for other VPC or cloud services providers.

In implementations the system 100 code/executable(s) for generating the threat model from the VPC environment includes logic to determine or guess the communication protocol (HTTPS, HTTP, etc.) between elements. For example if a content delivery network (CDN) is one of the components determined from the API pull the logic of the code/executable(s) may have a default communication protocol to use for connections between the CDN and other elements. In implementations the VPC/cloud services provider may provide communication protocols for some of the components/services, but not for all components/services. Accordingly, the system 100 may be configured to use the VPC-provided communication protocol, if one is provided in the API pull, and to use logic of the code/executable(s) for communication protocols that are not provided. Additionally, if the code/executable(s) cannot fully fill in the gaps, the user can manually indicate a communication protocol where an educated guess may be made or where the communication protocol is otherwise known by the user. In some cases a VPC provider allows the user to, for a VPC environment, select a port (such as a port opened on a load balancer). In this case, as an example, the user may know whether the communication protocol is TCP, HTTPS, etc., so the user could manually indicate this on the diagrammed threat model. In any case, because the system code/executable(s) may include logic to determine communication links (or to obtain them from the API pull(s)) and/or to determine some or all communication protocols on its own, the diagram as initially displayed may include one or more communication lines and/or communication protocols diagrammed between components (or all communication lines/protocols may be initially provided) without requiring manual addition of communication lines and/or manual identification of communication protocols from a user. In implementations in which the communication protocols are determined automatically by the system 100, once the diagram is automatically generated the diagram interface may display a plurality of distinct communication protocols for a plurality of communication lines without requiring manual identification of the communication protocols.

The systems and methods disclosed herein may include any details, features, elements, etc. of system and methods disclosed in the above-referenced U.S. patent application Ser. Nos. 16/946,853 and 16/664,679. For example, as discussed above the tasks interface on the bottom left of FIG. 28 could include tasks that are suggested based on rules that have been input previously by a user, using interfaces not shown in the drawings but which are shown in U.S. patent application Ser. No. 16/664,679. The '679 application gives many examples of rules that a user can provide to the system, for example that a certain threat model component needs to be connected to, or contained in, or needs to contain, another threat model component, and so forth. These rules may be set up in ways to ensure security of the modeled system and its individual components. Accordingly, based on the underlying rules, once the user generates a threat model based on the API pull(s), the system may suggest changes in the tasks interface, and in this way the user could be assisted to modify things in the actual cloud environment or VPC to increase the security of the cloud environment and/or its individual elements.

It is also pointed out that, in the cloud environment, the user may have set up some configurations. For example the user may have chosen to open some port and may have listed some back-end server listeners, and so forth. When the system 100 does the automated threat modeling the system may utilize such configurations to assist with the mapping of VPC elements to threat model components, and details such as these may be used in the logic of the code/executable(s).

Accordingly, in the AWS example the user first navigates to AWS dashboards to create a user and the like, then submits AWS credentials to the system 100 using one or more interfaces. When the user initiates automatic generation of a threat model the system uses the access credentials to read one or more configuration files or configuration information from an API pull, parses the information, creates a threat model based on the parsed information and translates that into a diagram, assigning threats, security requirements, compensating controls, and so forth.

To describe this in more detail, continuing with the AWS example, once the user selects to generate a threat model for a VPC, the system 100 calls the AWS API to get the inventory of all the cloud services in use. The system 100 then calls the individual APIs of each service to get detailed information on how each service is configured and which other services it communicates with and using what protocol (where available). Based on this information the system 100 uses matched components and threats within its data stores that correspond with all the services used in AWS, and using the matched components builds a threat model.

The AWS example is only for illustration, as the system may have an intelligent threat engine having intelligence of threats for different cloud services and also may have security requirements for every service. Accordingly, depending on the cloud services used in any architecture for any VPC provider, the system 100 may generate a threat model, threats, security requirements and compensating controls for the cloud architecture. Once the threat model is built automatically, the system repeatedly validates it and notifies a user, such as using the aforementioned lists, if the threat model has changed relative to the VPC environment. Once the architecture of the actual VPC environment is updated, the threat model and the associated threats, security requirements, compensating controls, and the like will be automatically updated. By this continual monitoring, the user is assisted to ensure that threats are mitigated by conforming to security requirements and/or using compensating controls based on the most up-to-date configuration of the actual cloud environment.

Although detailed discussions of threat modeling are described herein, it is pointed out that the systems and methods described herein could also be used simply for modeling a VPC environment, to map out elements of the cloud environment, without actually providing a threat model. The automated threat modeling is useful, however, for mitigating risks to the cloud environment.

The threat model generated automatically by the API pull(s) may have any of the functionality and characteristics of other threat models described herein. For example, the user may drag a component or visual representation from the toolbox area to the diagram canvas to automatically modify/ redefine the threat model and threat report by including in it the threats associated through the one or more data stores with the added component/visual representation, and/or may remove a component/visual representation from the diagram canvas to automatically modify/redefine the threat model and threat report by removing from it the threats associated with the removed component/visual representation, etc.

While some of the above examples of automated threat modeling of existing computing environments focus on computing networks, the systems and methods disclosed herein may also be used for automated threat modeling of an application, such as a software application. In some cases a data gathering tool or software may be used to gather information about the target software application and then the gathered information may be used by system 100 to perform automated threat modeling. For example, the AVOCADO application discovery tool may be used to gather information about a target software application, such as a mobile application, and the gathered information may be used for automated threat modeling. In order to do this the system 100 may include one or more interfaces similar to interface 2500 except configured for receiving access credentials associated with the data gathering tool or software. Interface 2500 may have fields for receiving AVOCADO credentials, as a non-limiting example, and for selecting a specific software/application (similar to selecting a specific VPC identifier for the network examples). The way this functions with AVOCADO is that there is a first API from which the list of all software applications is fetched and once the user selects a specific application a second API provides all of the information for that application (servers, databases, technologies, services, etc.). Once the credentials are input and the specific software application is selected, the system 100 accesses the scanned information of the software application. In an instance such as this, where a separate data gathering tool or software is used, the access credentials, even though directly associated with the data gathering tool/software, are nevertheless considered herein as also associated with the target software application (such as a mobile application) inasmuch as the access credentials of the data gathering tool/software provide system 100 with access to information/data regarding the target software applications and allow the user to select a specific software application. The AVOCADO application discovery tool is used herein only as an example, and other data gathering software/tools could be used in other implementations.

In implementations in which the data gathering software/ tool is used, the data gathering software/tool may scan the target application/system to provide system 100 with a list of services that the software application is using, components of the software application, processes such as JAVA and PYTHON, data stores such as a MYSQL database, a list of connections of the software application (or connections made with the software application or between elements of the software application) which may include a server internet protocol (IP) address, server location, process identification (ID), port, what packets were interchanged, and so forth. The data gathering tool/software may also gather information about detected threats/attacks and the like and communicate these to system 100. The gathered data may include information about connections to databases or data stores and the like. Once any or all of this data is gathered about the target application, system 100 may automatically generate a threat report, similar to the method detailed above for automated threat modeling of a computing network.

When system 100 is used for automated threat modeling of a software application (such as a mobile application), one or more interfaces may be used to display a diagram of the generated threat model. Interface 3000 of FIG. 30, for example, shows a representative example of a threat model automatically diagrammed for an application, which includes displays of communication protocols, a user, a web application, an IP address at which is hosted a web application which includes login details, and an IP address at which is hosted a database which is accessed using MYSQL. These details are only examples, and other software applications could have other layouts/details.

Figure 30:
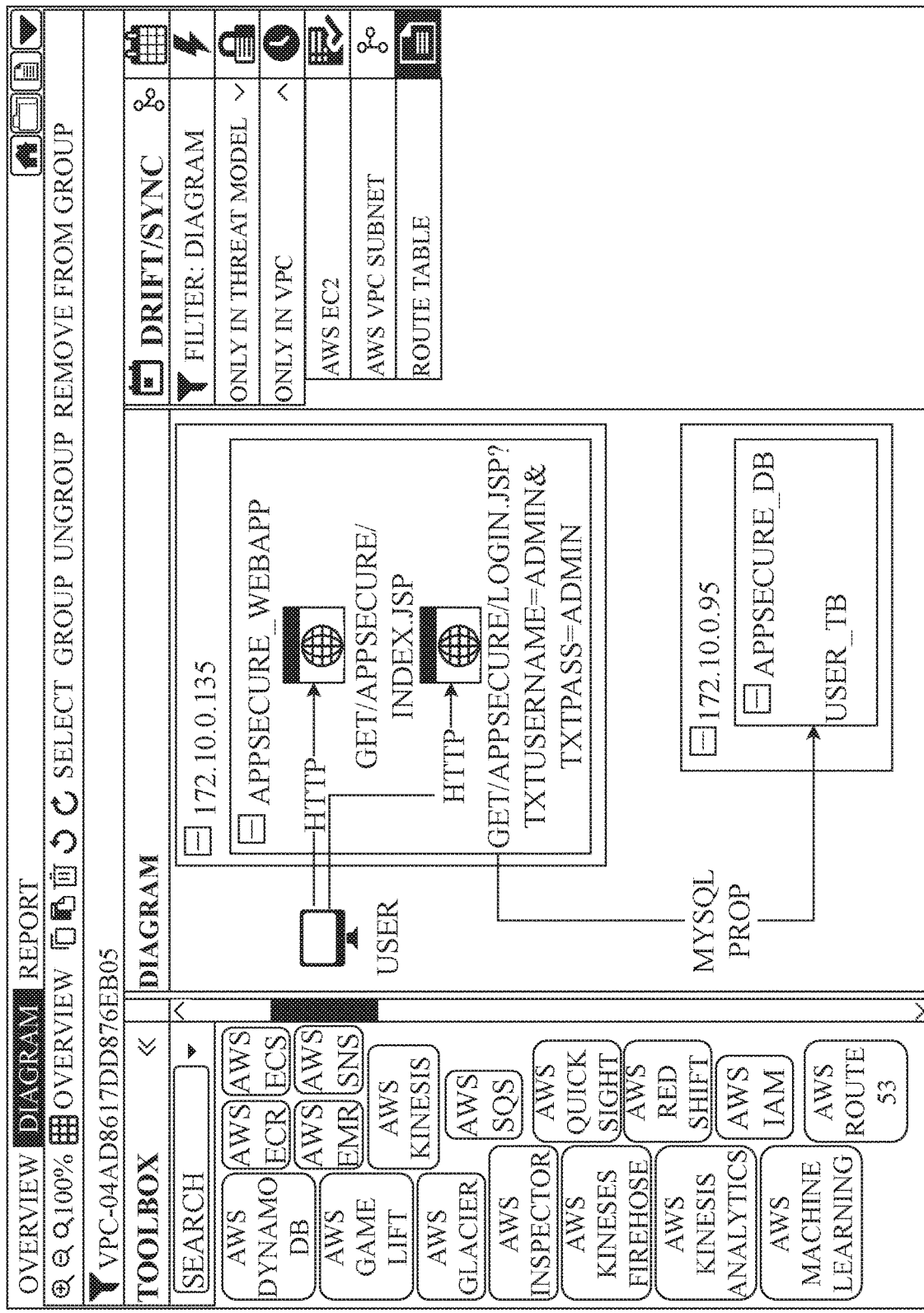
FIG. 30 is an implementation of an interface of the system of FIG. 1.

The automated threat modeling of a software application may or may not display a computing network. The example of FIG. 30 shows a computing network because the web application and the database are hosted on different machines (or different virtual machines) so that the software application may be said to be facilitated using a computing network. Nevertheless, in some implementations a single server or machine could facilitate the entire operation of a software application, so that it may not be seen as involving a computing network. Nevertheless, in such implementations the software application is still facilitated using a computing environment. A "computing network" is seen as a subset of a "computing environment" and, because the automated threat modeling systems and methods disclosed herein may be used to automatically generate threat models for complicated computing networks and, additionally, simpler software applications where no computing network is involved, the automated threat modeling herein is described in relation to the broader concept of a "computing environment," including in the claims. The phrase "computing environment" is, accordingly, meant to include computing networks and, additionally or alternatively, software applications (such as mobile applications) which in some cases may not necessarily involve or require a computing network.

When the systems and methods disclosed herein are used for automated threat modeling of a software application, the software application may or may not be a cloud application and may or may not be deployed in a cloud environment—it could be a software application deployed in a local computing environment or infrastructure. The initial automatically-generated threat model for the software application is a snapshot in time—it is a model of the software application as of a specific date and time (for example whenever it was last scanned). In implementations the system 100 may be configured to automatically update the automatically-generated threat model on an ongoing basis (such as on a schedule) or to simply show the user differences between the snapshot model and the latest scan of the software application (similar to what has been described above with respect to the DRIFT/SYNC functionality). The user may have options, using an interface similar to interface 3000, to sync the model with the current state of the software application (or the state of the software application as of the last scan). The user may also have options using interface 3000 to see a list of components that are in the threat model but not in the actual software application, and a list of components that are in the software application but not in the threat model, similar to what has been described above with respect to interface 2900. The automatically diagrammed threat model of a software application may include resource identifiers or component identifiers (such as the IP addresses or other identifiers/names).

In places where the description above refers to specific embodiments of systems and methods for automated threat modeling of an existing computing environment, one or more or many modifications may be made without departing from the spirit and scope thereof. Details of any specific embodiment/implementation described herein may, wherever possible, be applied to any other specific implementation/embodiment described herein.

What is claimed is:

1. A method for automated threat modeling of an existing computing environment, comprising:
   providing one or more servers;
   providing one or more data stores communicatively coupled with the one or more servers, the one or more data stores comprising:
      a plurality of stored threat model components stored therein; and
      a plurality of stored threats stored therein, wherein each stored threat is associated through the one or more data stores with at least one of the stored threat model components;
   receiving, using one or more input fields displayed on one or more computing devices communicatively coupled with at least one of the one or more servers, one or more inputs, the one or more inputs comprising:
      access credentials associated with an existing computing environment; and
      one or more inputs configured to initiate, using the one or more servers and using the access credentials, automatic generation of a relational diagram of the existing computing environment and automatic generation of a threat report;
   displaying the relational diagram on one or more user interfaces of the one or more computing devices, using diagrammed components, wherein the diagrammed components comprise visual representations of one or more of the stored threat model components corresponding with components that comprise the existing computing environment, the relational diagram defining a threat model; and
   displaying the threat report on the one or more user interfaces, the threat report displaying each stored threat that is associated through the one or more data stores with one of the diagrammed components.

2. The method of claim 1, wherein the automatic generation of the relational diagram comprises the one or more servers determining, using an application program interface associated with the existing computing environment, the components that comprise the existing computing environment.

3. The method of claim 2, wherein the automatic generation of the relational diagram further comprises the one or more servers determining relationships between the components that comprise the existing computing environment.

4. The method of claim 1, further comprising displaying, on the relational diagram, for one or more of the diagrammed components, a resource identifier obtained by the one or more servers using an application programming interface associated with the existing computing environment.

5. The method of claim 1, further comprising, in response to an alteration of the existing computing environment, automatically updating the relational diagram and the threat report to reflect an altered state of the existing computing environment.

6. The method of claim 1, further comprising automatically repeatedly updating the relational diagram and the threat report on a schedule to reflect a current state of the existing computing environment.

7. The method of claim 1, further comprising displaying, on the one or more user interfaces, a list of stored threat model components represented on the relational diagram that do not exist in the existing computing environment.

8. The method of claim 1, further comprising displaying, on the one or more user interfaces, a list of components comprising the existing computing environment that are not represented on the relational diagram.

9. The method of claim 1, further comprising displaying a sync input field on the one or more user interfaces, the sync input field configured to, in response to receiving a user input, initiate immediate updating of the relational diagram and the threat report to reflect a current state of the existing computing environment.

10. An automated threat modeling system, comprising:
one or more servers;
one or more data stores communicatively coupled with the one or more servers, the one or more data stores comprising:
a plurality of stored visual representations of threat model components stored therein; and
a plurality of stored threats stored therein, wherein each stored threat is associated through the one or more data stores with at least one of the stored visual representations;
one or more input fields displayed on one or more computing devices communicatively coupled with at least one of the one or more servers, the one or more input fields configured to receive:
access credentials associated with an existing computing environment; and
one or more inputs configured to initiate, using the one or more servers and using the access credentials, automatic generation of a relational diagram of the existing computing environment and automatic generation of a threat report;
a diagram interface displayed on the one or more computing devices, the diagram interface displaying the relational diagram, using diagrammed components, wherein the diagrammed components comprise a subset of the stored visual representations corresponding with components that comprise the existing computing environment, the relational diagram defining a threat model; and
a threat report interface displayed on the one or more computing devices, the threat report interface displaying each stored threat that is associated through the one or more data stores with one of the diagrammed components included in the threat model.

11. The system of claim 10, wherein the diagram interface further displays one or more communication lines connecting one or more of the diagrammed components.

12. The system of claim 10, wherein the system is configured to, in response to receiving one or more user inputs manually adding a stored visual representation to the diagram interface, automatically redefine the threat model by including in it one or more stored threats associated with the added stored visual representation.

13. The system of claim 10, wherein the system is configured to, in response to receiving one or more user inputs manually removing a stored visual representation from the diagram interface, automatically redefine the threat model by removing from it one or more stored threats associated with the removed stored visual representation.

14. The system of claim 10, wherein the diagram interface further displays, for one or more of the diagrammed components, a resource identifier obtained by the one or more servers using an application programming interface associated with the existing computing environment.

15. The system of claim 10, wherein the diagram interface further displays a list of stored visual representations represented on the relational diagram that do not exist in the existing computing environment.

16. The system of claim 10, wherein the diagram interface further displays a list of components comprising the existing computing environment that are not represented on the relational diagram.

17. The system of claim 10, further comprising a tasks interface displayed on the one or more computing devices, the tasks interface recommending one or more edits to the existing computing environment.

18. An automated modeling system, comprising:
one or more servers;
one or more data stores communicatively coupled with the one or more servers, the one or more data stores comprising a plurality of stored visual representations of computing environment components stored therein;
one or more input fields displayed on one or more computing devices communicatively coupled with at least one of the one or more servers, the one or more input fields configured to receive:
access credentials associated with an existing computing environment; and
one or more inputs configured to initiate, using the one or more servers and using the access credentials, automatic generation of a relational diagram of the existing computing environment; and
a diagram interface displayed on the one or more computing devices, the diagram interface displaying the relational diagram, using diagrammed components, wherein the diagrammed components comprise a subset of the stored visual representations corresponding with components that comprise the existing computing environment;
wherein the relational diagram as initially displayed includes communication lines diagrammed between the diagrammed components.

19. The system of claim 18, wherein the diagram interface further displays, for a plurality of communication lines, a plurality of distinct communication protocols, without requiring manual identification of the communication protocols.

20. The system of claim 18, wherein the diagram interface further displays, for one or more of the diagrammed components, a resource identifier obtained by the one or more servers using an application programming interface associated with the existing computing environment.

* * * * *

UNITED STATES PATENT AND TRADEMARK OFFICE
CERTIFICATE OF CORRECTION

PATENT NO. : 10,984,112 B2  
APPLICATION NO. : 16/947798  
DATED : April 20, 2021  
INVENTOR(S) : Anurag Agarwal Page 1 of 1

It is certified that error appears in the above-identified patent and that said Letters Patent is hereby corrected as shown below:

On the Title Page

In item (63), in the continued portion on page 2, in the Related U.S. Application Data, Line 7, "Pat. No. 1,025,549" should be changed to read -Pat. No. 10,255,439-.

In the Specification

Column 44, Line 53, "system" should be changed to -systems-.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*